United States Patent
Crabtree et al.

(10) Patent No.: US 12,536,213 B2
(45) Date of Patent: Jan. 27, 2026

(54) COMPOSITE SYMBOLIC AND NON-SYMBOLIC ARTIFICIAL INTELLIGENCE SYSTEM FOR ADVANCED REASONING AND AUTOMATION

(71) Applicant: QOMPLX LLC, Reston, VA (US)

(72) Inventors: Jason Crabtree, Vienna, VA (US); Richard Kelley, Woodbridge, VA (US); Jason Hopper, Halifax (CA); David Park, Fairfax, VA (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/668,137

(22) Filed: May 18, 2024

(65) Prior Publication Data

US 2025/0258852 A1  Aug. 14, 2025

Related U.S. Application Data

(63) Continuation-in-part of application No. 18/656,612, filed on May 7, 2024.

(60) Provisional application No. 63/551,328, filed on Feb. 8, 2024.

(51) Int. Cl.
*G06F 16/33* (2025.01)
*G06F 16/334* (2025.01)
*G06F 16/36* (2019.01)

(52) U.S. Cl.
CPC ...... *G06F 16/3347* (2019.01); *G06F 16/3344* (2019.01); *G06F 16/367* (2019.01)

(58) Field of Classification Search
CPC . G06F 16/3347; G06F 16/367; G06F 16/3344
See application file for complete search history.

(56) References Cited

U.S. PATENT DOCUMENTS

| | | | |
|---|---|---|---|
| 10,726,204 B2 | 7/2020 | Crudele et al. | |
| 11,645,526 B2 | 5/2023 | Yu et al. | |
| 11,651,605 B1 | 5/2023 | Horesh | |
| 2013/0103825 A1* | 4/2013 | Martikainen | H04L 43/08 709/224 |
| 2014/0075318 A1* | 3/2014 | Cheng | H04L 41/22 715/735 |

(Continued)

*Primary Examiner* — Loc Tran
(74) *Attorney, Agent, or Firm* — Galvin Patent Law LLC; Brian R. Galvin

(57) ABSTRACT

A composite AI system and method for advanced reasoning and automation that integrates symbolic knowledge graphs and algorithms with non-symbolic, or connectionist, models such as neural embeddings. A hierarchical architecture enables dynamically distributed, cooperative reasoning through layperson and expert-led challenge-based verification, model blending, model fitness and retraining and selection, comprehensive feedback loops at individual model or model blend or process flow with or without supervision, and specialized routing of processing to account for various operational risk, regulatory, legal, privacy, or economic considerations. Models, datasets, knowledge bases, simulations and simulation components, and embeddings are iteratively refined using knowledge graph elements and model, process, simulation or flow/process optimal hyperparameters which are recorded and tracked. Extraction of symbolic representations from connectionist models links them to curated ontologies of facts and principles.

16 Claims, 32 Drawing Sheets

(56) References Cited

U.S. PATENT DOCUMENTS

| | | | |
|---|---|---|---|
| 2018/0101767 A1* | 4/2018 | Huang | G06N 3/044 |
| 2018/0107940 A1* | 4/2018 | Lieberman | G06N 20/00 |
| 2022/0269858 A1 | 8/2022 | Sen et al. | |
| 2023/0342587 A1* | 10/2023 | McCreary | G06N 3/042 |
| 2024/0176958 A1* | 5/2024 | Raimondo | G06N 3/0455 |

* cited by examiner

COMPOSITE SYMBOLIC AND NON-SYMBOLIC ARTIFICIAL INTELLIGENCE SYSTEM FOR ADVANCED REASONING AND AUTOMATION

CROSS-REFERENCE TO RELATED APPLICATIONS

Priority is claimed in the application data sheet to the following patents or patent applications, each of which is expressly incorporated herein by reference in its entirety:
Ser. No. 18/656,612
63/551,328

BACKGROUND OF THE INVENTION

Field of the Art

The present invention is in the field of large-scale distributed computing, and more particularly to programmatically or declaratively constructed distributed graph-based computing platforms for artificial intelligence based decision-making and automation systems including those employing simulations, machine learning models, and artificial intelligence applications including large language models and associated services across heterogeneous cloud, large scale automation and control systems, managed data center, edge, and wearable/mobile devices.

Discussion of the State of the Art

Current artificial intelligence (AI) systems, including large language models (LLMs) and generative AI (GenAI), have limitations in their reasoning capabilities and integration of symbolic knowledge. Connectivist systems don't actually understand the information they model per se. There is a need for AI architectures that can bridge symbolic and non-symbolic representations to enable more advanced, contextual reasoning based on an understanding and domain expertise, while considering critical factors like security, traceability, and collaborative model development.

What is needed is a composite symbolic and non-symbolic artificial intelligence platform for advanced reasoning.

SUMMARY OF THE INVENTION

Accordingly, the inventor has conceived and reduced to practice, a composite AI system and method for advanced reasoning and automation that integrates symbolic knowledge graphs and algorithms with non-symbolic, or connectionist, models such as neural embeddings. A hierarchical architecture enables dynamically distributed, cooperative reasoning through layperson and expert-led (individual or panel) challenge-based verification, model blending, model fitness and retraining and selection, comprehensive feedback loops at individual model or model blend or process flow with or without supervision, and specialized routing of processing to account for various operational risk, regulatory, legal, privacy or economic considerations. Computational resources such as but not limited to GPU, CPU, RAM, and persistent storage can be dynamically allocated to each step as required to fulfill any given computation task. Models, data sets, knowledge bases, simulations and simulation components, and embeddings and model weights are iteratively refined using knowledge graph elements and model, process, simulation or flow/process optimal hyperparameters which are recorded and tracked. Extraction of system evolution information, both self-initiated and via supervised or semi-supervised feedback, along with symbolic representations of data, both extracted directly or inferred from connectionist models, links empirical and simulated and synthetic data elements to build curated ontologies and knowledge bases which allow for both symbolic and connectionist representations of facts and principles for ongoing modeling, simulation, decision-making, automation, and refinement.

According to a preferred embodiment, a computing system for composite artificial intelligence employing an advanced reasoning platform is disclosed, the computing system comprising: one or more hardware processors configured for: generating vector embeddings of input data using a plurality of neural network models trained on large datasets; storing and retrieving symbolic facts, entities, and relations into a knowledge base using an ontology or schema that defines the types of entities, relationships, and attributes relevant to a neural network model's domain; managing and routing processing tasks based on certainty thresholds and challenge-based verification; refining vector embeddings using contextual information by retrieving relevant facts, entities, and relationships from the knowledge base; updating the vector embeddings by incorporating the retrieved contextual information; combining the outputs of multiple models using expressive weighting schemes; aligning and harmonizing the vector embeddings across different data modalities; optimizing hyperparameters using information-theoretic; extracting symbolic knowledge from the vector embeddings; and mapping the extracted symbolic representations to existing concepts and relationships in the knowledge base.

According to another preferred embodiment, a computer-implemented method executed on an advanced reasoning platform for composite artificial intelligence is disclosed, the computer-implemented method comprising: generating vector embeddings of input data using a plurality of neural network models trained on large datasets; storing and retrieving symbolic facts, entities, and relations into a knowledge base using an ontology or schema that defines the types of entities, relationships, and attributes relevant to a neural network model's domain; managing and routing processing tasks based on certainty thresholds and challenge-based verification; refining vector embeddings using contextual information by retrieving relevant facts, entities, and relationships from the knowledge base; updating the vector embeddings by incorporating the retrieved contextual information; combining the outputs of multiple models using expressive weighting schemes; aligning and harmonizing the vector embeddings across different data modalities; optimizing hyperparameters using information-theoretic; extracting symbolic knowledge from the vector embeddings; and mapping the extracted symbolic representations to existing concepts and relationships in the knowledge base.

According to another preferred embodiment, a system for composite artificial intelligence employing an advanced reasoning platform is disclosed, comprising one or more computers with executable instructions that, when executed, cause the system to: generate vector embeddings of input data using a plurality of neural network models trained on large datasets; store and retrieve symbolic facts, entities, and relations into a knowledge base using an ontology or schema that defines the types of entities, relationships, and attributes relevant to a neural network model's domain; manage and route processing tasks based on certainty thresholds and challenge-based verification; refine vector embeddings using contextual information by retrieving relevant facts, entities, and relationships from the knowledge base; update the vector embeddings by incorporating the retrieved contextual information; combine the outputs of multiple models using expressive weighting schemes; align and harmonize the vector embeddings across different data modalities; optimize hyperparameters using information-theoretic; extract symbolic knowledge from the vector embeddings; and map the extracted symbolic representations to existing concepts and relationships in the knowledge base.

According to another preferred embodiment, non-transitory, computer-readable storage media having computer-executable instructions embodied thereon that, when executed by one or more processors of a computing system employing an advanced reasoning platform for composite artificial intelligence, cause the computing system to: generate vector embeddings of input data using a plurality of neural network models trained on large datasets; store and retrieve symbolic facts, entities, and relations into a knowledge base using an ontology or schema that defines the types of entities, relationships, and attributes relevant to a neural network model's domain; manage and route processing tasks based on certainty thresholds and challenge-based verification; refine vector embeddings using contextual information by retrieving relevant facts, entities, and relationships from the knowledge base; update the vector embeddings by incorporating the retrieved contextual information; combine the outputs of multiple models using expressive weighting schemes; align and harmonize the vector embeddings across different data modalities; optimize hyperparameters using information-theoretic; extract symbolic knowledge from the vector embeddings; and map the extracted symbolic representations to existing concepts and relationships in the knowledge base.

According to an aspect of an embodiment, the system is further caused to: define a hierarchy of reasoning tasks and subtasks; route data to appropriate models or knowledge sources based on predefined rules or learned policies; set certainty thresholds for each task; and design challenge-based verification mechanisms to test the robustness and reliability of an artificial intelligence (AI) model's decisions.

According to an aspect of an embodiment, updating the vector embeddings comprises applying attention mechanisms, graph convolutions, or knowledge-aware language models to combine the embeddings with the contextual data.

According to an aspect of an embodiment, the system is further caused to: design a model combination architecture that leverages the strengths of individual models; develop weighting schemes that dynamically adjust the contribution of each model based on various factors; and implement techniques such as Bayesian model averaging, mixture of experts, or ensemble learning to optimize the model combination process.

According to an aspect of an embodiment, the various factors comprise uncertainty, task complexity, or domain relevance.

According to an aspect of an embodiment, the system is further caused to ensure the security, licensing compliance, provenance tracking, and collaborative development of AI models by implementing secure communication protocols and access control mechanisms.

According to an aspect of an embodiment, aligning and harmonizing the vector embeddings comprises: developing algorithms that can synchronize and align the representations of multiple input modalities; applying techniques such as cross-modal attention, multi-modal fusion, or joint embedding spaces; and utilizing domain-specific knowledge to ensure the generated representations are consistent and realistic across modalities.

According to an aspect of an embodiment, mapping the extracted symbolic representations comprises ontology alignment and linking methods.

According to an aspect of an embodiment, the knowledge base comprises one or more knowledge graphs.

BRIEF DESCRIPTION OF THE DRAWING FIGURES

DETAILED DESCRIPTION OF THE INVENTION

Figure 1:
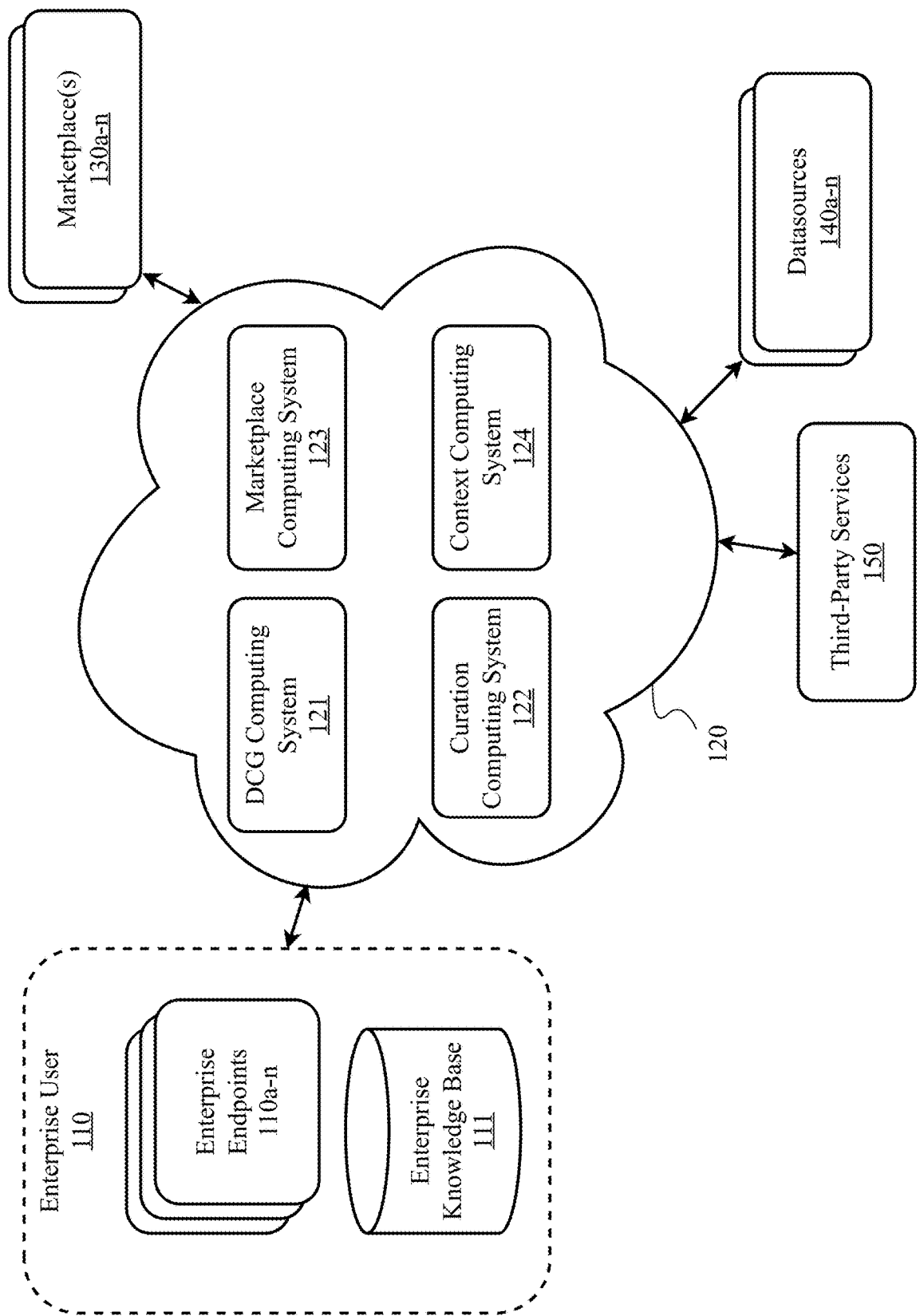
FIG. 1 is a block diagram illustrating an exemplary system architecture for a distributed generative artificial intelligence reasoning and action platform, according to an embodiment.

The inventor has conceived, and reduced to practice, a composite AI platform and method for advanced reasoning that integrates symbolic knowledge graphs with non-symbolic neural embeddings. A hierarchical architecture enables distributed, cooperative reasoning through challenge-based verification, model blending, comprehensive feedback loops, and specialized routing of processing. Embeddings are iteratively refined using knowledge graph elements and optimal hyperparameters. Extraction of symbolic representations from connectionist models links them to curated ontologies of facts and principles.

The composite AI platform comprises a set of neural network models that generate vector embeddings representing input data. The embeddings are stored in databases and iteratively refined using contextual information from knowledge graphs containing facts, entities, and relations.

Model orchestration is handled through a hierarchical process definition that allows routing of processing to specialized models based on certainty thresholds and challenge-based verification. Models are blended using expressive weighting schemes.

Comprehensive feedback loops integrate considerations of security, licensing, economic factors, data/model provenance and traceability. Collaborative model development is enabled.

For generative workflows such as scene creation, the system maintains consistency by aligning embeddings of entities across frames. Knowledge graph lookups supplement scene refinement. Multi-modal generation harmonizes senses like sound and smell.

Hyperparameter optimization explores ideal embedding generation techniques, training datasets, model architectures and other factors, guided by information theoretic metrics.

Symbolic knowledge extraction from embeddings enables linkage of the learned representations to structured ontologies, allowing neural and symbolic knowledge to be bridged for reasoning.

The platform emphasizes the importance of considering various types of semantics, including, but not limited to, symbolic, distributional, compositional distributional, and information-theoretic compositional distributional semantics. This consideration allows the platform to capture and represent meaning at different levels of abstraction and compositionality, enabling more comprehensive and nuanced understanding of the input data. By explicitly addressing these different types of semantics, the platform can leverage the strengths of each approach and combine them in a unified framework.

Symbolic semantics relies on explicit, structured representations of meaning using symbols and logical expressions. In this approach, the meaning of a concept is defined by its relationships to other concepts in a symbolic knowledge base, often represented using ontologies or logic-based formalisms. It is worth noting that the described denotational semantics provide mathematical descriptions of programming instructions independent of their operational behavior. This means that through techniques, such as extended lambda calculus, that underpin such approaches serve as a mathematical formalism, a metalanguage, for denotational definitions.

Symbolic semantics enables precise and interpretable reasoning, as the meaning is explicitly encoded in the symbols and their relationships. However, symbolic semantics can be brittle and struggle with handling ambiguity, context-dependence, and the open-ended nature of language.

Distributional semantics is based on the idea that the meaning of a word or concept can be inferred from its distribution across a large corpus of text data. This approach represents words as dense vectors (embeddings) in a high-dimensional space, where the proximity between vectors reflects their semantic similarity. Distributional semantics is driven by the statistical co-occurrence patterns of words in the data, capturing the idea that words with similar meanings tend to appear in similar contexts. While distributional semantics can capture rich semantic relationships and handle ambiguity, it lacks the explicit structure and interpretability of symbolic semantics.

Compositional distributional semantics aims to combine the strengths of distributional semantics with the compositionality of language, allowing for the construction of meaning from smaller units. In this approach, the meaning of a phrase or sentence is computed by composing the distributional representations (embeddings) of its constituent words or sub phrases. Compositional distributional semantics enables the generation of embeddings for novel or unseen phrases, based on the compositionality principle that the meaning of a complex expression is determined by the meanings of its parts and their mode of combination. Various compositional models have been proposed, such as additive models, multiplicative models, and neural network-based models (e.g., recursive neural networks, transformers).

Information-theoretic compositional or distributional semantics incorporates principles from information theory to quantify and optimize the information content, transmission, gain or loss in models such as in compositional distributional models. This approach aims to capture key elements such as the mutual information differences between the components of a compositional representation, ensuring that the composed meaning preserves the relevant information from the individual constituents. Information-theoretic measures, such as entropy, mutual information, and cross-entropy, are used to guide the learning and composition process, promoting representations that are informative, compact, and generalizable. By grounding compositional distributional semantics in information theory, this approach seeks to improve the interpretability, robustness, and efficiency of the resulting semantic representations mathematically. This can be furthered by blending such approaches at the information theoretical level and vector embedding representation with a formally curated knowledge graph or spatially or temporally enhanced or linked knowledge graph-noting that the spatial or temporal representations may be relative or absolute (e.g. GPS or a finite element mesh type analysis in the body or an entity for spatial resolution and temporally such as place during the life of a person based on age or absolute against our Gregorian calendar). The distinction and integration of these different types of semantics are important for the platform's goal of achieving advanced reasoning and understanding in AI systems. By considering symbolic semantics, the invention can leverage the structured and interpretable aspects of meaning representation. Distributional semantics allows for capturing the statistical patterns and relationships in large-scale text data. Compositional distributional semantics enables the construction of meaning from smaller units, while information-theoretic principles guide the optimization of the compositional process.

By combining these different mathematical analysis and knowledge and semantic representation approaches, the platform aims to create a more comprehensive and expressive semantic representation of knowledge, rules, or models that can handle the complexities of language and reasoning across both deterministic and heuristic exploration regimes and across extrapolative and generative modeling techniques to include simulation modeling. The integration of symbolic and distributional semantics, along with compositional and information-theoretic principles, allows for a richer and more robust understanding of the input data, models, simulations, and knowledge representation, leading to improved performance in various ML/AI tasks such as natural language understanding, knowledge representation, inference, and generation across text and other forms of representation or media (e.g. voice, video, sound, print, art, etc.).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

DEFINITIONS

As used herein, "explainability" (also referred to as "interpretability") is the concept that a machine learning model and its output can be explained in a way that "makes sense" to a human being at an acceptable level.

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall," "DOB Aug. 13, 1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected."

Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships and node types and subgraphs, which may be optionally stored, represented, or acted upon. It is also important to note that the resource topologies available at a given execution time for a given pipeline may be highly dynamic due to changes in available node or edge types or topologies (e.g. different servers, data centers, devices, network links, etc.) being available, and this is even more so when legal, regulatory, privacy and security considerations are included in a DCG pipeline specification or recipe in the DSL. Since the system can have a range of parameters (e.g. authorized to do transformation x at compute locations of a, b, or c) the JIT, JIC, JIP elements can leverage system state information (about both the processing system and the observed system of interest) and planning or modeling modules to compute at least one parameter set (e.g. execution of pipeline may say based on current conditions use compute location b) at execution time. This may also be done at the highest level or delegated to lower-level resources when considering the spectrum from centralized cloud clusters (i.e. higher) to extreme edge (e.g. a wearable, or phone or laptop). The examples given were chosen for illustrative purposes only and represent a small number of the simplest of possibilities. These examples should not be taken to define the possible graphs expected as part of operation of the invention.

As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "pipeline," as used herein and interchangeably referred to as a "data pipeline" or a "processing pipeline," refers to a set of data streaming activities and batch activities. Streaming and batch activities can be connected indiscriminately within a pipeline and compute, transport or storage (including temporary in-memory persistence such as Kafka topics) may be optionally inferred/suggested by the system or may be expressly defined in the pipeline domain specific language. Events will flow through the streaming activity actors in a reactive way. At the junction of a streaming activity to batch activity, there will exist a StreamBatchProtocol data object. This object is responsible for determining when and if the batch process is run. One or more of three possibilities can be used for processing triggers: regular timing interval, every N events, a certain data size or chunk, or optionally an internal (e.g. APM or trace or resource-based trigger) or external trigger (e.g. from another user, pipeline, or exogenous service). The events are held in a queue (e.g. Kafka) or similar until processing. Each batch activity may contain a "source" data context (this may be a streaming context if the upstream activities are streaming), and a "destination" data context (which is passed to the next activity). Streaming activities may sometimes have an optional "destination" streaming data context (optional meaning: caching/persistence of events vs. ephemeral). System also contains a database containing all data pipelines as templates, recipes, or as run at execution time to enable post-hoc reconstruction or re-evaluation with a modified topology of the resources (e.g. compute, transport or storage), transformations, or data involved.

Conceptual Architecture

Figure 21:
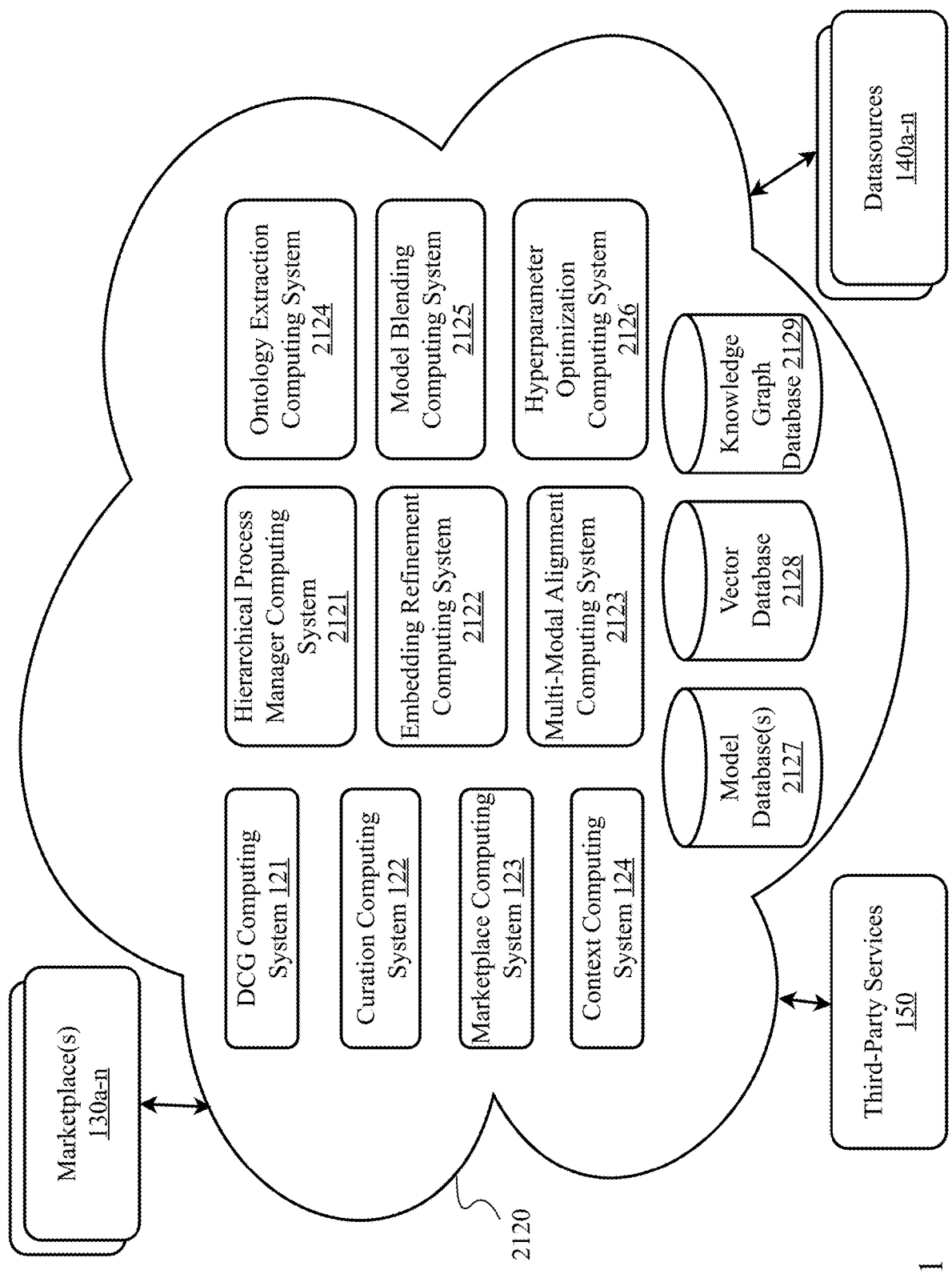
FIG. 21 is a block diagram illustrating an exemplary system architecture for a distributed, composite symbolic and non-symbolic AI platform for advanced reasoning, according to an embodiment.

FIG. 21 is a block diagram illustrating an exemplary system architecture for a distributed, composite symbolic and non-symbolic AI platform for advanced reasoning 2120, according to an embodiment. According to the embodiment, the platform 2120 aims to enable vast automation of modeling/analysis workflows by exploring large potential parameter combinations. Platform 2120 can be configured for extracting and curating knowledge into structured ontologies to complement neuro-symbolic AI capabilities. Platform 2120 can provide an iterative multi-dimensional optimization and evaluation process to explore the relative performance of the different techniques, datasets, and "fitness of purpose" definitions (e.g., security, licenses, traceability/provenance, etc.) associated with a plurality of AI models.

According to the embodiment, platform 2120 is configured as a cloud-based computing platform comprising various system or sub-system components configured to provide functionality directed to the execution of composite symbolic generative AI reasoning and action. Exemplary platform systems can include a distributed computational graph (DCG) computing system 121, a curation computing system 122, a marketplace computing system 123, and a context computing system 124, a hierarchical process manager computing system 2121, an embedding refinement computing system 2122, a multi-modal alignment computing system 2123, an ontology extraction computing system 2124, a model blending computing system 2125, and a hyperparameter optimization computing system 2126. Platform 2120 may further comprise various databases for storing a plurality of data sets, models 2127, vectors/embeddings 2128, and knowledge graphs 2129. In some embodiments, systems 121-124 and 2121-2126 may each be implemented as standalone software applications or as a services/microservices architecture which can be deployed (via platform 120 or 2120) to perform a specific task or functionality. In such an arrangement, services can communicate with each other over an appropriate network using lightweight protocols such as HTTP, gRPC, or message queues (e.g., AMQP or Kafka). This allows for asynchronous and decoupled communication between services. Services may be scaled independently based on demand, which allows for better resource utilization and improved performance. Services may be deployed using containerization technologies such as Docker or containerd and orchestrated using container orchestration platforms like Kubernetes. This allows for more flexible deployment and management of services.

The composite symbolic AI reasoning and action platform 2120 can enable a more flexible approach to incorporating machine learning (ML) or artificial intelligence (AI) models into the future of the Internet and software applications; all facilitated by a distributed computational graph (DCG) architecture capable of dynamically creating, persisting, retraining, augmenting, selecting, executing, decommissioning, and incorporating trained models with both internal and external data sources and marketplaces for data and algorithms and expertise (e.g. expert or layperson or user feedback or knowledge) at the data, model, knowledge, or process levels.

The platform 2120 emphasizes the importance of considering various types of semantics, including, but not limited to, symbolic, distributional, compositional distributional, and information-theoretic compositional distributional semantics. This consideration allows the platform to capture and represent meaning at different levels of abstraction and compositionality, enabling more comprehensive and nuanced understanding of the input data in its original, intermediate, or curated forms. By explicitly addressing these different types of semantics, the platform 2120 can leverage the strengths of each approach and combine them in a unified framework.

In some cases, platform may be configured to label non-textual data (e.g., images or scenes) with textual descriptions before computing embeddings. This labeling step converts the non-textual data into a textual representation (or other representations like image or domain similar to Fourier transforms), which can then be processed using language-based techniques that are more well-developed and understood or consistent or otherwise advantageous. By bridging the gap between non-textual and textual data through labeling, the platform can take advantage of the rich semantic information captured by language models and embeddings into text or alternative media or domain formats. After labeling non-textual data (if applicable), the platform computes numerical embedding representations of the input data in a given format. These embeddings capture the semantic properties and relationships of the data in a dense vector format, enabling efficient storage, retrieval, and comparison. The computed embeddings may then be persisted in memory or in a database such as a vector database, which allows for fast and scalable similarity search (e.g., cosine, dot product, Euclidean, etc.) and other vector operations or graph operations or hybrid representations depending on the data type, representation, and elements such as facts, spatial or temporal dynamics of the systems and/or entities of interest. The persisted embeddings serve as input features for downstream ML or AI models, such as neural networks or symbolic reasoning engines, or knowledge bases. By incorporating the embeddings or representations into these versioned models, the platform can leverage the information captured by the embeddings to improve the performance and generalization of the AI system under different operating environments or conditions and assess ongoing fitness for purpose using ongoing pipeline fitness evaluation functions executed on event or periodic basis. The integration of embeddings with downstream models allows for seamless knowledge accumulation and transfer and enables the AI system to make informed curation and event or context-based decisions based on the semantic understanding of observed input data, simulated input data, submitted user actions, submitted event data, ongoing system state information or operational information or simulated versions of potential versions of the aforementioned elements.

According to the embodiment, platform 2120 utilizes a plurality of neural network models that generate vector embeddings representing input data. The plurality of neural network models may be stored in model database 2126. Each of the plurality of neural network models may be associated with a specific type of AI system (e.g., gaming, medical diagnosis, sentiment analysis, LLM, recommendation system, virtual reality, autonomous vehicle, etc.). As such, models and AI systems may be used interchangeably throughout this specification. Platform can use various neural network architectures as previously detailed such as Transformers, Long Short-Term Memory (LSTM), or convolutional neural networks (CNNs) to process different types of input data (text, images, audio, video, 3d or 4-d models, etc.). In some implementations, platform can train these models on large datasets to learn meaningful vector or graph or sql or nosql representations that capture the properties and relationships of the input data—ideally based on semantified representations of the data but also on unstructured, structured, schematized, normalized or partially semantified basis. Platform may leverage techniques like transfer learning, fine-tuning, or multi-task learning to improve the quality and generalizability of the embeddings. For example, a text classification system that uses a BERT model to generate embeddings for input documents, and a CNN model to generate embeddings for images associated with the documents. The embeddings may then be concatenated and fed into a final classification layer.

Embeddings are dense vector representations that capture the semantic meaning and relationships of data points. Vector databases 2128 store and index these embeddings for efficient retrieval and similarity search. Platform 2120 can facilitate iterative refinement which updates the embeddings based on new data or feedback to improve their quality and representational power. For example, a recommendation AI system uses embeddings to represent user preferences and item characteristics. As users interact with the system, their feedback is used to iteratively refine the embeddings, making them more accurate predictors of user interests. The refined embeddings are stored in a vector database for fast retrieval during recommendation generation.

According to the embodiment, a knowledge graph database 2129 is present comprising symbolic facts, entities, and relations. Platform may use an ontology or schema for the knowledge graph that defines the types of entities, relationships, and attributes relevant to the a given AI system's domain. Platform populates the knowledge graph with data from structured sources (e.g., databases) and unstructured sources (e.g., text documents) using information extraction techniques like named entity recognition, relation extraction, and/or co-reference resolution. Knowledge graph database 2129 may be implemented as a graph database (e.g., Neo4j, ArangoDB) or a triple store (e.g., Apache Jena) to efficiently store and query the knowledge graph. Knowledge graph database 2129 may comprise a plurality of knowledge graphs, wherein knowledge graphs may be associated with a specific domain. For example, a biomedical knowledge graph that contains entities such as drugs, diseases, and genes, and relationships like "treats", "causes", and "interacts_with". This exemplary knowledge graph is populated from structured databases like DrugBank and UniProt, as well as from unstructured sources like publications.

According to the embodiment, hierarchical process manager computing system 2121 is present and configured to route processing based on certainty thresholds (e.g., certification) and challenge-based verification. Platform may define a hierarchy of reasoning tasks and subtasks that break down the AI system's (e.g., models) decision-making process into manageable steps. Process manager 2121 orchestrates the execution of these tasks and routes data to the appropriate models or knowledge sources based on predefined rules or learned policies. Process manager 2121 or an administrator may set certainty thresholds for each task to determine when the system should proceed to the next step or seek additional information/verification. Process manager 2121 can design and leverage challenge-based verification mechanisms (e.g., adversarial examples, counterfactual reasoning, etc.) to test the robustness and reliability of the AI system's decisions. For example, a fraud detection system that first uses a rule-based model to flag potentially fraudulent transactions based on simple heuristics. If the certainty of the rule-based model is below a threshold, the transaction is routed to a more complex machine learning model for further analysis. The final decision is then verified through a challenge-response mechanism that asks the user to provide additional authentication.

Hierarchical process definitions break down complex reasoning tasks into smaller, more manageable steps. System may note decomposable workflows which can be independently evaluated and also evaluations which require coordination or contextualization based on ongoing feedback from aggregated data or evaluation results and therefore require intermediate state sharing across resources at the actor, virtual or physical resource level. Specialized routing dynamically selects the most appropriate AI models or knowledge sources for each subtask based on their capabilities and performance. For example, an autonomous vehicle AI system uses a hierarchical process to handle different driving situations. At a top level, the platform decides whether to use models specialized for highway driving, city navigation, or parking. Within each specialization, further routing occurs to handle specific challenges like merging, pedestrian detection, or parallel parking.

Certification involves validating the performance and reliability of AI models through rigorous testing and evaluation. Challenge-based verification sets up specific test cases or benchmarks that models must pass to be considered certified for a given task. Model blending combines the outputs of multiple models using weighted averaging or more sophisticated methods to improve overall performance. For example, a financial forecasting AI system blends the predictions of several certified models, each specializing in different asset classes or market conditions. The blending weights are adjusted based on each model's historical performance and current market challenges.

According to the embodiment, embedding refinement computing system 2122 is present and configured to incorporate data from one or more knowledge graphs. Embedding refinement 2122 may utilize algorithms that can query the knowledge graph to retrieve relevant facts, entities, and relationships based on the input data and the current reasoning context. Retrieved knowledge may be used to refine the vector embeddings generated by the neural networks models, incorporating symbolic information into the distributed representations (embeddings). In some implementations, techniques like attention mechanisms, graph convolutions, and/or knowledge-aware language models to effectively combine the embeddings with the knowledge graph data. For example, consider a recommendation system that generates initial embeddings for users and items based on their interaction history. The platform then queries a knowledge graph of user demographics, item categories, and contextual factors (e.g., time, location) to retrieve relevant information. This information can be used to refine the user and item embeddings through, for example, a graph attention network, incorporating the contextual knowledge into the recommendations.

A Graph Attention Network (GAT) is a type of neural network architecture designed to operate on graph-structured data. It leverages the concept of self-attention to compute the importance of neighboring nodes in a graph, allowing the network to focus on the most relevant information when making predictions or generating representations. The key advantage of GATs is their ability to capture the importance of neighboring nodes based on their feature compatibility, allowing the network to focus on the most relevant information. This attention mechanism enables GATs to effectively handle graph-structured data and learn meaningful representations of nodes and their relationships.

According to the embodiment, model blending computing system 2125 is present and configured to apply expressive weighting schemes to model combinations. Platform may leverage a model blending architecture that can combine the outputs of multiple neural network models based on their individual strengths and weaknesses. Such a system may use weighting schemes that can dynamically adjust the contribution of each model based on factors like uncertainty, task complexity, or domain relevance. Techniques such as Bayesian model averaging, mixture of experts, and/or ensemble learning may be implemented to optimally blend the model outputs. For example, consider a sentiment analysis system that combines the outputs of three models: a Naive Bayes model, an LSTM model, and a BERT model. Model blending 2125 assigns weights to each model based on their confidence scores and the complexity of the input text. The weights are learned through a reinforcement learning approach that optimizes the overall sentiment classification performance.

According to the embodiment, platform 2120 implements feedback loops considering security, licensing, provenance, and collaborative development. Feedback loops allow the AI system to learn and adapt based on real-world performance and user feedback. Security considerations ensure that the AI system is protected against malicious attacks or misuse. For example, implementing secure communication protocols and access controls mechanisms to protect sensitive data and prevent unauthorized access to the AI system. Economic factors optimize the cost-benefit trade-offs of different model configuration and deployment strategies. Licensing takes into account the legal rights and restrictions associated with using certain datasets or model components. Platform 2120 can monitor and ensure compliance with the terms and conditions of licensing of datasets, models, and tools used by platform. Traceability/provenance keeps track of the lineage of data sources, training processes, and model versions used in each output. Model collaboration enables different teams or organizations to jointly develop, test, deploy, and improve AI models while maintaining security and provenance. For example, a healthcare AI system incorporates feedback from doctors and patients to continually refine its diagnosis and treatment recommendations. The system logs each decision's provenance and securely shares performance data with research partners under appropriate licensing terms. As another example, consider a federated learning system for medical image analysis that allows multiple hospitals to collaboratively train a deep learning model without sharing raw patient data. The system uses secure multi-party computation and differential privacy techniques to protect patient privacy. The model's provenance is tracked using a blockchain-based ledger, ensuring transparency and accountability. The system also includes a licensing management component that enforces usage restrictions based on each hospital's data sharing agreements.

According to the embodiment, multi-modal computing system 2123 is present and configured to algin and synchronize representations across different data modalities (e.g., text, images, audio, etc.) to create a unified and consistent representation of the input data. Multi-modal system 2123 may implement techniques such as cross-modal attention, multi-modal fusion, and/or joint embedding spaces to effectively combine information from different modalities. Platform can utilize domain-specific knowledge (e.g., physics, psychology) (from knowledge graphs) to ensure the generated representations are consistent and realistic across modalities. For example, consider a virtual assistant that can process user queries in the form of text, speech, and images. The multi-modal system 2123 uses cross-modal attention to align the representations of the different input modalities, creating a unified query representation. For example, if the user asks, "What is the breed of the dog in this picture?", the engine aligns the image embedding with the relevant parts of the text embedding to understand that the query is about identifying the dog breed.

According to the embodiment, hyperparameter optimization computing system 2126 is present and configured to use information theoretic guidance for optimization tasks. System 2126 may implement an automated hyperparameter optimization framework (e.g., Bayesian optimization, evolutionary algorithms, etc.) to search for the best combination of model architectures, training settings, and embedding techniques. System 2126 can use information-theoretic measures (e.g., mutual information, Kullback-Leibler divergence) to guide the optimization process and select hyperparameters that maximize the information content and generalization ability of the learned representations. In some implementations, platform 2120 may develop efficient parallel computing strategies to speed up the hyperparameter search process and explore a larger space of configurations. For example, consider a natural language generation system that uses a variational autoencoder (VAE) to generate diverse and coherent sentences. The hyperparameter optimization system 2126 uses Bayesian optimization to search for the best combination of latent space dimensionality, regularization strength, and decoder architecture. The optimization is guided by an information-theoretic objective that maximizes the mutual information between the latent space and the generated sentences, ensuring that the VAE captures meaningful and interpretable representations.

In some embodiments, hyperparameters may also be defined by expert judgment via experts and made available via a hyperparameter expert judgment marketplace.

Embedding generation techniques convert raw data into dense vector representations. Different technique (e.g., Word2Vec, GloVe, BERT, etc.) have different strengths and weaknesses. Training data selection and processing impact the quality and generalizability of the learned embeddings. Model type (e.g., perceptron, feedforward, radial basis network, deep feed forward, recurrent, long-short term memory, gated recurrent unit, auto encoder, variational autoencoder, denoising auto encoder, sparse autoencoder, Markov chain, Hopfield network, Boltzmann machine, restricted Boltzmann machine, deep belief network, deep convolutional network, convolutional network, deconvolutional network, deep convolutional inverse graphics network, general adversarial network, liquid state machine, extreme learning machine, echo state network, deep residual network, Kohonen network, support vector machine, neural tuning machine etc.) and architecture (e.g., number of hidden layers, hidden units, etc.) influence the embedding learning process. Hyperparameter optimization searches and explorations for the best combination of embedding generation technique, training data, model type, and architecture to maximize the embedding quality and downstream task performance. For example, a sentiment analysis AI system experiments with different embedding generation techniques (Word2Vec, GloVe) and model architectures (long short-term memory, convolutional neural network) and dimensionality reduction techniques (e.g., none vs PCA vs ICA vs information sieve) to find the best combination for the specific domain and language as well as different system states (e.g. based on clustering algorithms for different operational modalities). The platform also tunes hyperparameters such as, for example, embedding dimensionality, context window size, randomness/temperature and learning rate to further improve performance or other measures of efficacy based on a narrow or system-wide or process-wide objective or fitness function.

Information theory provides another exemplary mathematical framework for quantifying and understanding the properties of embeddings, such as their information content or gain when compared to an alternative, compression, and generalization ability. Theoretical analysis may apply information-theoretic concepts and measures to study the effectiveness of different embedding methods and guide their development or data set or model or parameter or encoding/serialization/compression. For example, platform 2120 analyzes the mutual information between word embeddings and their context to quantify the amount of semantic information captured or gained. Platform may then use this analysis to propose a new embedding method that maximizes mutual information while minimizing redundancy, resulting in more informative and compact representations on either a marginal or absolute basis, or both.

According to the embodiment, ontology extraction computing system 2124 is present and configured to link data elements, facts, or embeddings to symbolic knowledge graphs or ontological entities. Connectionist models (e.g., neural networks) learn distributed representations that capture patterns and relationships in data, but these representations are not directly interpretable as symbolic knowledge. Extracting symbolic representations involves techniques like rule extraction, decision tree induction, or clustering to distill the learned knowledge into a symbolic form in terms of both allowed elements in an ontology or instances of such elements. Linking the extracted symbolic representations to existing knowledge graphs (or extending or amending underlying ontologies dynamically based on accumulated data or experiences) enables the integration of the learned knowledge with or without prior domain expertise, facilitating more comprehensive and explainable reasoning for both connectionist and symbolic modeling regimes as well as for simulation based modeling initiatives supporting synthetic data generation for simulation-based and empirical real-world observation and refinement. For example, a medical diagnosis AI system based on a deep neural network learns to classify diseases from patient data. The platform bb extracts symbolic rules or representations from data of interest via a model (e.g., a trained network), expressing the learned decision boundaries in terms of interpretable clinical features. These rules are then linked to a medical knowledge graph consisting of both an ontological framework, a corresponding query formalism, and a data set consisting of allowed ontology instances and characteristics, allowing the system to explain both its available reasoning in terms of known disease mechanisms and treatment guidelines. It is important to note that every version of such composite knowledge corpus may be numbered or uniquely identified as an element of a given decision, model training, or other system action for its stated purpose or for administrative or maintenance/system operation functions.

Ontology extraction system 2124 can leverage algorithms that can analyze the learned vector embeddings and extract symbolic representations (e.g., entities, relationships, rules, etc.) that capture the underlying semantic structure. In some implementations, techniques such as, for example, clustering, dimensionality reduction, and/or rule mining may be used to capture the underlying semantic structure. Ontology alignment and linking methods can be used to map the extracted symbolic representations to existing concepts and relationships in the knowledge graph, enabling seamless integration of the learned knowledge with prior domain expertise. For example, consider a legal case analysis system that uses a BERT model to generate embeddings for legal documents. The ontology extraction system can use hierarchical clustering to group the embeddings into semantically related clusters, and then apply association rule mining to discover relationships between the clusters. The extracted ontology is then linked to a legal knowledge graph that contains concepts like laws, precedents, and jurisdictions, enabling the system to reason about legal cases using both the learned embeddings and the symbolic knowledge.

Symbolic knowledge represents facts, rules, and relationships using structured formalisms like ontologies or knowledge graphs. Connectionist models, such as neural networks, learn distributed representations from data with explicit symbolic structure. Retrieval augmented generation (RAGs) enhance language models by incorporating an external knowledge retrieval mechanism. During the generation process, the model queries a knowledge base to retrieve relevant information and condition its outputs on both the input context and the retrieved knowledge. Expressive weightings allow the platform to dynamically adjust the influence of different knowledge sources based on their relevance to the current context. For example, a customer support AI system uses a knowledge graph of product information and troubleshooting procedures (symbolic) alongside a neural language model trained on past support interactions (connectionist). When generating responses to customer inquiries, the system employs RAG to retrieve relevant information form the knowledge graph and the language model to condition the responses on both the customer's input and the retrieved knowledge. The system assigns higher weights to knowledge sources that are more pertinent to the specific inquiry, ensuring accurate and context-appropriate responses.

According to the embodiment, platform 2120 can implement scene generation with knowledge graph elements for contextual refinement. Scene generation creates realistic images, videos, or three-dimensional (3D) environments based on textual descriptions or other input data. Knowledge graph elements, such as object properties, relationships, and constraints, can be leveraged to guide the scene generation process to ensure consistency and realism. Contextual refinement adjusts the generated scene based on the specific context and purpose of the AI application. For example, a virtual reality AI system generates immersive scenes for training simulations. The platform can use a knowledge graph of object properties (e.g., materials, size, physics) and relationships (e.g., spatial constraints) to ensure physically plausible layouts. The generated scenes may be refined based on the specific training scenario and user interactions.

In addition to visual and textual data, platform 2120 incorporates other sensory modalities like sound and smell to create more immersive and realistic experiences. Harmonizing multiple senses involves aligning and synchronizing the different modalities to create a coherent and consistent output. For example, a gaming AI system generates realistic soundscapes and ambient scents to match the visual environment. The platform 2120 ensures that the sound of footsteps matches the character's movement and the smell of a forest scene includes the scent of pine trees and damp moss.

According to some embodiments, platform 2120 can be leveraged to develop enterprise-specific or domain-specific models, which can be "small models" that are more efficient, accurate, or predictable in specific contexts and prompts. These small models can be integrated into platform 2120 as specialized components that are selected and deployed based on the specific domain or task at hand. Hierarchical process manager 2121 can route the input data to the appropriate small model based on the context, ensuring optimal performance and efficiency.

Furthermore, platform 2120 can provide effective orchestration, selection, and management of small models, particularly in restricted or regulated domains such as medicine, investing, law, insurance, and banking. Platform's model blending system 2125 and feedback loops can be extended to incorporate the orchestration and management of small models, taking into account factors such as data nutrition labels, model labels, and administrative processes. The system can leverage existing system/platforms, and ML ops to facilitate the effective deployment and governance of small models.

In some implementations, the platform can train and deploy hybrid models that combine foundational connectionist models with additional symbolic models, simulations, or datasets and training processes to generate explanations, estimations, and specialized model combinations with different performance characteristics or fitness regimes or envelopes based on their provenance, included data or modeling elements, or even the people or other algorithms or AI agents involved in their creation or execution. The platform can incorporate these hybrid models as part of its model blending and composition capabilities, leveraging the strengths of different models for tasks such as explainability, auditing, and ML ops training/supervision. The ontology extraction system 2124 can help in generating explanations and traces from these hybrid models, enhancing the interpretability and transparency of the system's reasoning process.

The platform addresses the security and intellectual property concerns associated with foundational models, which are considered core IP and may be less likely to be exposed due to their immense cost, time, and sensitivity. The platform can utilize small models as a means of model obfuscation, where the sensitive foundational models are distilled into smaller, more focused models that can be deployed with less risk of information leakage. The platform can also incorporate techniques for model theft detection, such as using vector similarity scoring and hash-based functions to identify potential infringement of small models derived from foundational models.

The platform can leverage the use of ML ops optimization routines for model selection, training, classification, and dynamic deployment based on fitness for purpose. The platform can integrate these optimization techniques to dynamically select and deploy the most suitable small models based on the specific task, context, and performance requirements. The platform can also optimize model hyperparameters, such as temperature and token length, to balance performance, efficiency, and the generation of hallucinations or other undesired outputs.

By integrating the concepts and techniques related to small models, the platform can achieve greater efficiency, specialization, explainability, security, and adaptability. The use of domain-specific small models allows the system to tailor its reasoning and decision-making processes to specific contexts, while the orchestration and management capabilities ensure the effective deployment and governance of these models. The hybrid models and explainability techniques enhance the interpretability and transparency of the platform, enabling users to understand and trust its reasoning process. Simulations and uncertainty quantification routines to isolate the factors influencing deviation between expected and actual observations in empirical and synthetic data sets may be handled by the system, to include via DCG specified processes, to guide ongoing model and simulation training and fitness and selection routines and to guide AI agent and or human decision makers in the evaluation of data, ontology, model, simulation or process level decisions or fitness for a given situation or task. The model obfuscation and theft detection mechanisms may help protect the intellectual property and sensitive information associated with the core foundational models. Overall, the integration of small models into platform 2120 aligns with the broader goals of achieving advanced reasoning, adaptability, explainability, and security in AI systems. By leveraging the strengths of small models and incorporating them into the various components and processes of the system, the platform aims to push the boundaries of AI capabilities while addressing the practical challenges and requirements of real-world applications.

In some implementations, platform 2120 can be configured to provide capabilities directed to automatic error identification and correction, such as those provided by a self-healing neural graph AI. This AI system continuously monitors the operation of the computing device's hardware and software components, identifying anomalies, errors, or suboptimal performance. Upon detecting an issue, the self-healing neural graph AI dynamically reconfigures the system's resources, reroutes data flows, and adapts the computing graph to mitigate the problem and maintain optimal performance. This autonomous error identification and correction mechanism enhances the computing device's reliability, resilience, and ability to operate in demanding or unpredictable environments without the need for manual intervention.

Figure 22:
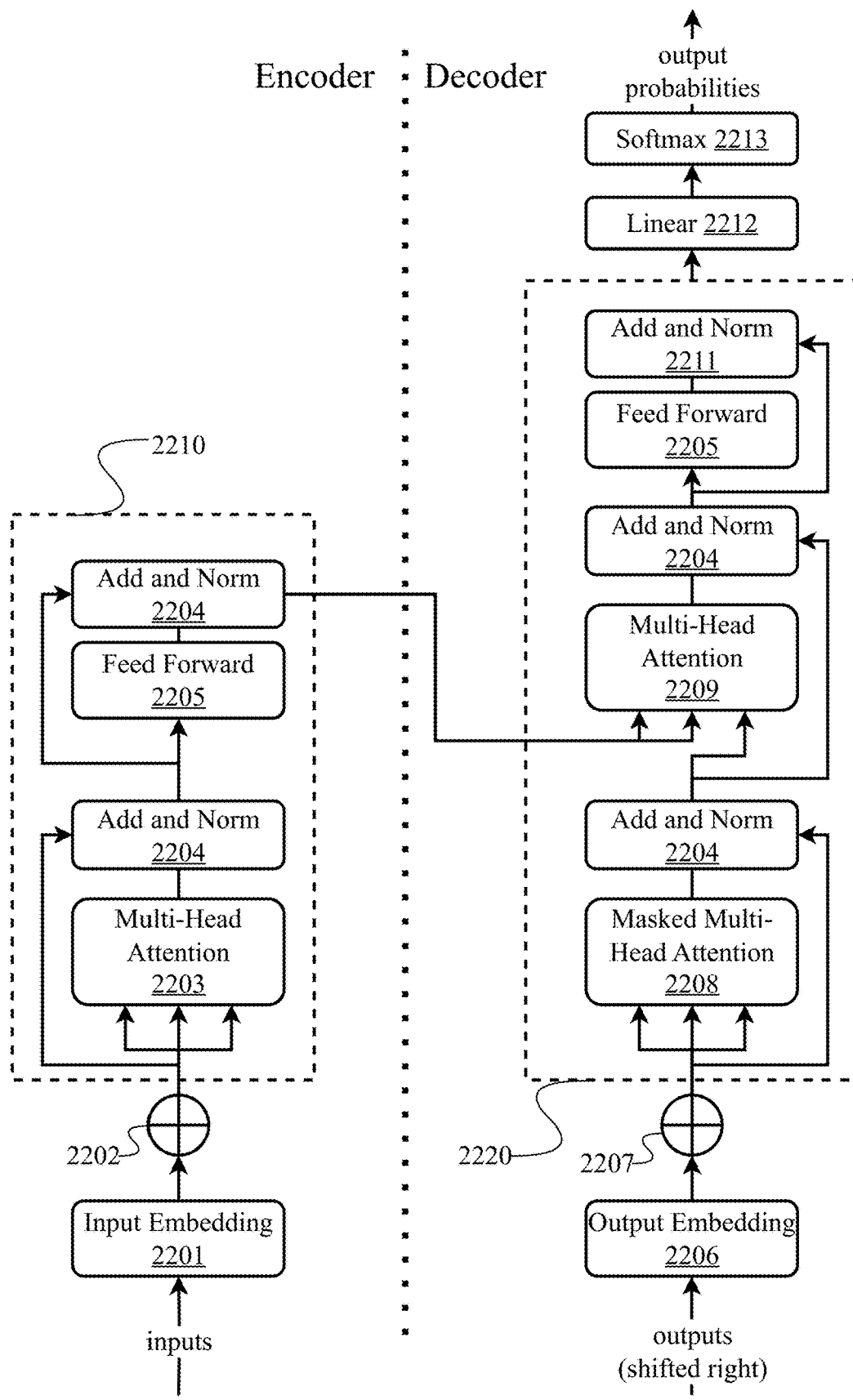
FIG. 22 is a block diagram illustrating an exemplary model architecture of the Transformer, consisting of an Encoder and a Decoder.

FIG. 22 is a block diagram illustrating an exemplary model architecture of the Transformer, consisting of an Encoder (the components on the left side of the illustration) and a Decoder (the components on the right side of the illustration). Transformers form the backbone of large language models. A large language model (LLM) is a type of artificial intelligence algorithm that utilizes deep learning techniques and massively large datasets to understand, summarize, generate and predict new content. The term generative AI is also closely connected to LLMs, which are a type of generative AI that has been specifically architected to help generate text-based content. All language models are first trained on a set of data, and then they make use of various techniques to infer relationships and then generate new content based on the trained data. Language models are commonly used in natural language processing (NLP) applications where a user inputs a query in natural language to generate a result.

An LLM is the evolution of the language model concept in AI that dramatically expands the data used for training and inference. In turn, it provides a massive increase in the capabilities of the AI model. While there isn't a universally accepted figure for how large the data set for training needs to be, an LLM typically has at least one billion or more parameters. Parameters are a machine learning term for the variables present in the model on which it was trained that can be used to infer new content.

Modern LLMs that have emerged within the last decade are based on transformer models, which are neural networks commonly referred to as transformers. With a large number of parameters and the transformer model, LLMs are able to understand and generate accurate responses rapidly, which makes the AI technology broadly applicable across many different domains. Some LLMs are referred to as foundation models, a term coined by the Stanford Institute for Human-Centered Artificial Intelligence in 2021. A foundation model is so large and impactful that it serves as the foundation for further optimizations and specific use cases.

LLMs take a complex approach that involves multiple components. At the foundational layer, an LLM needs to be trained on a large volume, sometimes referred to as a corpus, of data that is typically petabytes in size. The training can take multiple steps, usually starting with an unsupervised learning approach. In that approach, the model is trained on unstructured data and unlabeled data. The benefit of training on unlabeled data is that there is often vastly more data available. At this stage, the model begins to derive relationships between different words and concepts.

The next step for some LLMs is training and fine-tuning with a form of self-supervised learning. Here, some data labeling has occurred, assisting the model to more accurately identify different concepts.

Next, the LLM undertakes deep learning as it goes through the transformer neural network process. The transformer model architecture enables the LLM to understand and recognize the relationships and connections between words and concepts using a self-attention mechanism. That mechanism is able to assign a score, commonly referred to as a weight, to a given item (called a token) in order to determine the relationship.

Once an LLM has been trained, a base exists on which the AI can be used for practical purposes. By querying the LLM with a prompt, the AI model inference can generate a response, which could be an answer to a question, newly generated text, summarized text or a sentiment analysis report.

LLMs have become increasingly popular because they have broad applicability for a range of NLP tasks, including but not limited to, text generation, translation, content summary, rewriting content, classification and categorization, sentiment analysis, and conversational AI and chatbots.

There are numerous advantages that LLMs provide to organizations and users including, for example, extensibility and adaptability, flexibility, performance, accuracy, and ease of training. LLMs can serve as a foundation for customized use cases. Additional training on top of an LLM can create a finely tuned model for an organization's specific needs. One LLM can be used for many different tasks and deployments across organizations, users and applications. Modern LLMs are typically high-performing, with the ability to generate rapid, low-latency responses. As the number of parameters and the volume of trained data grow in an LLM, the transformer model is able to deliver increasing levels of accuracy. Many LLMs are trained on unlabeled data, which helps to accelerate the training process.

While there are many advantages to using LLMs, there are also several challenges and limitations such as, development costs (e.g., LLMs generally require large quantities of expensive graphics processing unit hardware and massive data sets), operational costs, bias, hallucination (e.g., AI hallucination occurs when an LLM provides an inaccurate response that is not based on trained data), complexity (e.g., with billions, or more, of parameters, modern LLMs are exceptionally complicated technologies that can be particularly complex to troubleshoot), and glitch tokens which are maliciously designed prompts to cause the LLM to malfunction.

There is an evolving set of terms to describe the different types of large language models. Among the common types are zero-shot model, fine-tuned or domain-specific models, language representation models, and multimodal model. A zero-shot model is a large, generalized model trained on a generic corpus of data that is able to give a fairly accurate result for general use cases, without the need for additional training. GPT-3 is often considered a zero-shot model. Fine-tuned/domain-specific models require additional training on top of a zero-shot model and can lead to a fine-tuned, domain-specific model. One example is OpenAI Codex, a domain-specific LLM for programming based on GPT-3. One example of a language representation model is Bidirectional Encoder Representations from Transformers (BERT), which makes use of deep learning and transformers well suited for NLP. Originally LLMs were specifically tuned just for text, but with the multimodal approach it is possible to handle both text and images. GPT-4 is an example of this type of model.

There are multiple important components significantly influencing the architecture of LLMs. The size of an LLM, often quantified by the number of parameters, greatly impacts its performance. Larger models tend to capture more intricate language patterns but require increased computational resources for training and inference. Effective input representations, like tokenization, are vital as they convert text into formats that the model can process. Special tokens, like [CLS] and [September] in BERT, enable the model to understand sentence relationships and structure. Pre-training objectives define how a model learns from unlabeled data. For instance, predicting masked words in BERT helps the model learn contextual word relationships, while autoregressive language modeling in GPT-3 teaches coherent text generation. The computational demands of LLMs can be mitigated through techniques like knowledge distillation, model pruning, and quantization. These methods maintain model efficiency without sacrificing performance. How a model generates output is essential. Greedy decoding, beam search, and nucleus sampling are techniques used in LLMs for coherent and diverse output generation. These methods balance between accuracy & creativity, while creating a significant difference between LLMs and traditional language models.

The illustrated Transformer comprises an Encoder and a Decoder. The Encoder takes input embeddings and processes them through a stack of layers (represented as dashed box 2210). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The input embedding 2201 to the Encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"−"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 2202 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The Encoder utilizes a multi-head attention mechanism 2203 which is a key component of the Transformer architecture. It allows the Encoder to attend to different parts of the input sequence and capture dependencies between tokens. The attention mechanism computes three matrices: Query (Q), Key (K), and Value (V). The Query, Key, and Value matrices are obtained by linearly projecting the input embeddings using learned weight matrices. The attention scores are computed by taking the dot product of the Query matrix with the transpose of the Key matrix, followed by scaling and applying a softmax function. The attention scores determine the importance of each token in the input sequence for a given position. The Value matrix is then multiplied with the attention scores to obtain the weighted sum of the values, which forms the output of the attention mechanism. Multi-Head Attention splits the Query, Key, and Value matrices into multiple heads, allowing the model to attend to different aspects of the input simultaneously. The outputs from each head are concatenated and linearly projected to obtain the final output of the Multi-Head Attention layer 2203.

After the Multi-Head Attention layer, a residual connection is applied, followed by Layer Normalization at add and norm 2204. The residual connection adds the input embeddings to the output of the attention layer, helping the model learn faster and deeper. Layer Normalization normalizes the activations across the features, stabilizing the training process.

The Feed Forward layer 2205 is a fully connected neural network applied to each position of the Encoder's hidden states. It consists of two linear transformations with a Rectified Linear Unit (ReLU) activation function in between. The purpose of the Feed Forward layer is to introduce non-linearity and increase the model's capacity to learn complex representations. The output of the Feed Forward layer has the same dimensionality as the input embeddings. A residual connection and Layer Normalization 2204 are applied after the Feed Forward layer.

The Encoder layers 2210 are stacked Nx times, where N is a hyperparameter that determines the depth of the Encoder. Each layer follows the same structure: Multi-Head Attention, Add & Norm, Feed Forward, and Add & Norm. By stacking multiple Encoder layers, the model can capture hierarchical and long-range dependencies in the input sequence. The output of the final Encoder layer represents the encoded input sequence, which is then passed to the Decoder for generating the output sequence.

The Decoder generates the output probabilities. It has a similar structure to the Encoder, with a few additions. The Decoder takes output embeddings and processes them through a stack of layers (represented as dashed box 2220). The output embedding layer 2206 takes the previous output tokens (shifted right by one position) and converts them into dense vectors. Each token is mapped to a learnable embedding vector of a fixed size. The embedding vectors capture semantic and syntactic relationships between tokens.

Positional encoding 2207 is added to the output embedding to provide position information to the model. Since the Transformer architecture does not have inherent recurrence or convolution, positional encodings help capture the order and relative positions of tokens. The positional encodings are typically sine and cosine functions of different frequencies, allowing the model to learn relative positions.

The masked multi-head attention 2208 mechanism prevents the model form attending to future tokens. This layer performs self-attention on the Decoder's input sequence. It allows the Decoder to attend to different parts of its own input sequence. The attention is "masked" to prevent the Decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 2204. The residual connection adds the input to the output of the attention layer, helping the model learn faster and deeper. Layer normalization normalizes the activations across the features, stabilizing the training process.

The multi-head attention 2209 layer performs attention between the Decoder's hidden states and the Encoder's output. It allows the Decoder to attend to relevant parts of the input sequence based on the Encoder's representations. The attention weights are computed based on the compatibility between the Decoder's hidden states and Encoder's outputs.

Another add and norm 2204 layer is then followed by feed forward network 2205. This fully connected feed-forward network may be applied to each position of the Decoder's hidden states. It consists of two linear transformations with a Rectified Linear Unit (ReLU) activation in between. The feed forward layer helps the model capture non-linear interactions and increases the model's capacity.

Another add and norm 2204 layer is followed by linear 2212 and softmax 2213 layers. The final hidden states of the Decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the Decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the Decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the Decoder as input for the next step, until a stopping criterion is met (e.g., reaching a maximum length or generating an end-of-sequence token). The size and composition of the vocabulary can vary depending on the specific task and the data the model is trained on. It can include words, subwords, or even characters, depending on the tokenization strategy used.

The Decoder layers 2220 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that enable different LLMs. A first variation comprises Auto-Encoding Models. In autoencoders, the decoder portion of the transformer is discarded after pre-training and only the encoder is used to generate the output. The popular BERT and RoBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Auto-regressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x\_t|x\_1, x\_2, \ldots, x\_\{t-1\})$, where $x\_t$ is the element at position t, and $x\_1, x\_2, \ldots, x\_\{t-1\}$ are the previously generated elements. The Transformer architecture, particularly the Decoder component, is well-suited for auto-regressive modeling. The Decoder generates the output sequence one element at a time, conditioned on the previously generated elements and the encoded input sequence from the Encoder. In the Transformer Decoder, the self-attention mechanism is masked to prevent the model from attending to future positions during training. This masking ensures that the model relies only on the previously generated elements to make predictions, following the auto-regressive property. During training, the Transformer Decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the Transformer Decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the Transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 23:
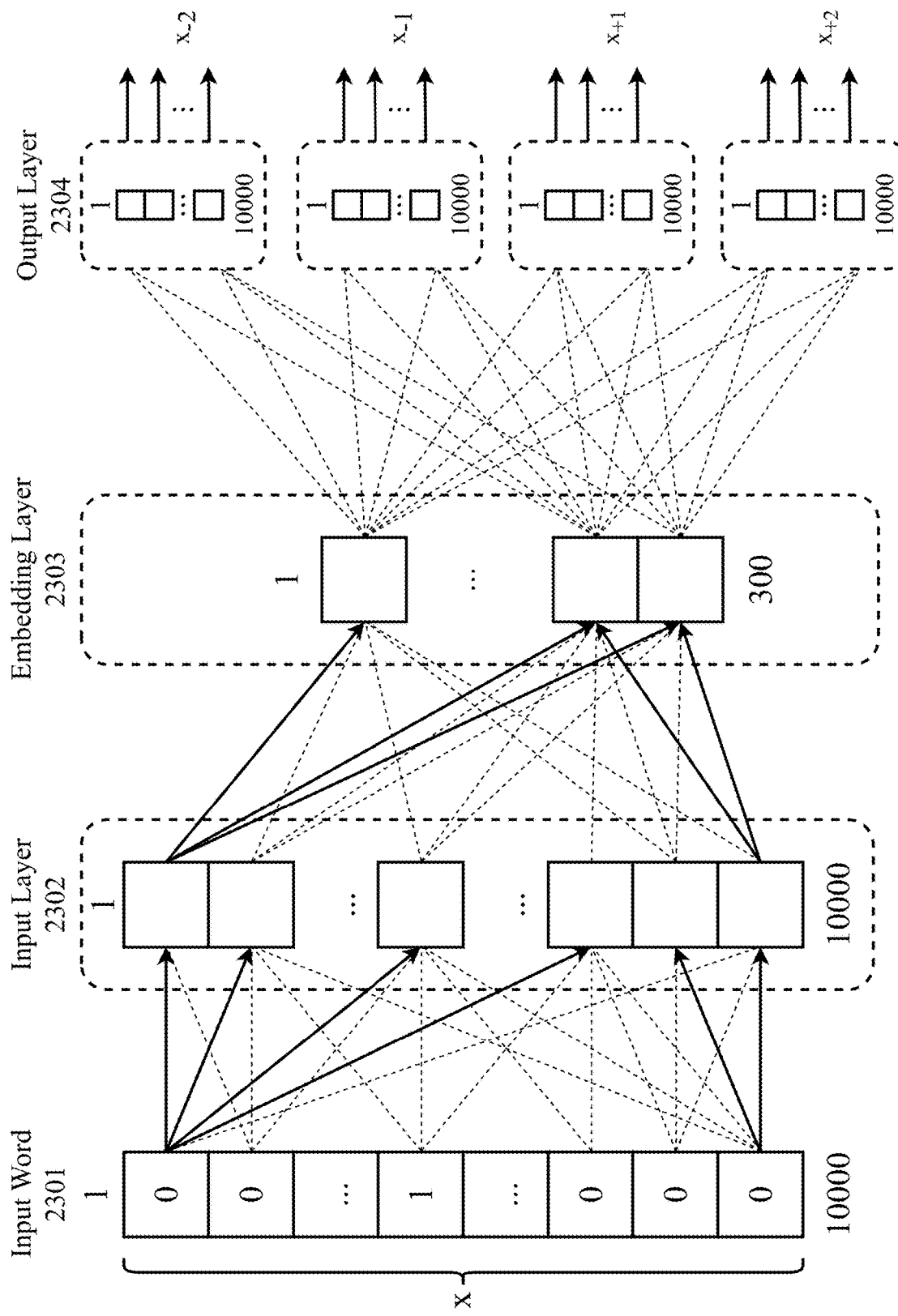
FIG. 23 is a block diagram illustrating an exemplary basic embedding layer generation process, according to an embodiment.

FIG. 23 is a block diagram illustrating an exemplary basic embedding layer generation process, according to an embodiment. The illustration shows the basic structure of an embedding layer, which is commonly used in natural language processing tasks to convert input words into dense vector representations. The diagram shows an input word 2301, an input word layer 2302, an embedding layer 2303, and an output layer 2304. As shown, the input word 2301 is represented as one-hot encoded vectors, where each word is represented by a vector of size 10,000 (i.e., the vocabulary size). One-hot encoding is a common technique used to represent categorical variables, such as words in a vocabulary, as binary vectors. In one-hot encoding, each word is represented by a vector with a length equal to the size of the vocabulary. The vector consists of zeros in all positions except for a single position, which is set to one, indicating the presence of the corresponding word. The input word is one-hot encoded with a 1 at the corresponding word index and 0s elsewhere. For example, if a vocabulary of 10,000 words exists, each word will be represented by a vector of size 10,000. If the input word is the 5th word in the vocabulary, its one-hot encoded vector will have a 1 at the 5th position and 0s everywhere else. It is important to note that the one-hot encoding is just one way to represent input words. Other techniques, such as integer encoding or using pre-trained word embeddings (e.g., Word2Vec or GloVe), can also be used depending on the specific requirements of the task and the available resources.

The input layer 2302 takes the one-hot encoded input word vectors and passes them to the embedding layer 2303. The input layer in the embedding generation process is responsible for handling the initial representation of the input words before they are passed to the embedding layer. The one-hot encoding ensures that each word has a unique representation, but it also results in sparse and high-dimensional vectors. The embedding layer 2303 then transforms these sparse vectors into dense, lower-dimensional representations (embeddings) that capture semantic and syntactic relationships between words. The embedding layer 2303 is a fully connected layer without an activation function. It maps the one-hot encoded input vectors to dense vector representations of a specified dimension (in this case, 300). The embedding layer has a weight matrix of size (vocabulary_size, embedding_dimension), which is learned during training. In the given example, the vocabulary size is 10,000, and the embedding dimension is 300. Each row in the weight matrix corresponds to a word in the vocabulary, and the columns represent the dimensions of the embedding space. When a one-hot encoded vector is passed to the embedding layer, it performs an embedding lookup. Since the one-hot vector has a single 1 at the position corresponding to the input word, the embedding lookup effectively selects the corresponding row from the weight matrix, which represents the embedding vector for that word.

The embedding size (dimension) is a hyperparameter that determines the size of the dense vector representations. In the example, the embedding size is 300, meaning each word is represented by a vector of length 300. The choice of embedding size depends on the complexity of the task, the size of the vocabulary, and the available computational resources. Larger embedding sizes can capture more fine-grained semantic information but also require more memory and computation. The embedding layer's weights (the embedding vectors) are learned during the training process through backpropagation. The model adjusts these weights based on the downstream task's objective, such as minimizing a loss function. As a result, the learned embeddings capture semantic and syntactic relationships between words, with similar words having similar vector representations. Once the embeddings are learned, they can be reused for various downstream tasks. The learned embeddings can be used as input features for other models, such as recurrent neural networks (RNNs) including echo state network (ESN) and graph neural network (GNN) variants or convolutional neural networks (CNNs), in tasks like text classification, sentiment analysis, or language translation.

The output layer 2304 consists of the dense word embeddings generated by the embedding layer. In this example, there are four output embedding vectors, each of size 300, corresponding to different words in the vocabulary. The embedding layer allows the model to learn meaningful representations of words in a lower-dimensional space, capturing semantic and syntactic relationships between words. These embeddings can then be used as input to downstream tasks such as text classification, sentiment analysis, or language modeling.

FIG. 1 is a block diagram illustrating an exemplary system architecture for a distributed generative artificial intelligence reasoning and action platform 120, according to an embodiment. According to the embodiment, platform 120 is configured as a cloud-based computing platform comprising various system or sub-system components configured to provide functionality directed to the execution of neuro-symbolic generative AI reasoning and action. Exemplary platform systems can include a distributed computational graph (DCG) computing system 121, a curation computing system 122, a marketplace computing system 123, and a context computing system 124. In some embodiments, systems 121-124 may each be implemented as standalone software applications or as a services/microservices architecture which can be deployed (via platform 120) to perform a specific task or functionality. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker and orchestrated using container orchestration platforms like Kubernetes. This allows for easier deployment and management of services.

The distributed generative AI reasoning and action platform 120 can enable a more flexible approach to incorporating machine learning (ML) models into the future of the Internet and software applications; all facilitated by a DCG architecture capable of dynamically selecting, creating, and incorporating trained models with external data sources and marketplaces for data and algorithms.

According to the embodiment, DCG computing system 121 provides orchestration of complex, user-defined workflows built upon a declarative framework which can allow an enterprise user 110 to construct such workflows using modular components which can be arranged to suit the use case of the enterprise user. As a simple example, an enterprise user 110 can create a workflow such that platform 120 can extract, transform, and load enterprise-specific data to be used as contextual data for creating and training a ML or AI model. The DCG functionality can be extended such that an enterprise user can create a complex workflow directed to the creation, deployment, and ongoing refinement of a trained model (e.g., LLM). For example, in some embodiments, an enterprise user 110 can select an algorithm from which to create the trained model, and what type of data and from what source they wish to use as training data. DCG computing system 121 can take this information and automatically create the workflow, with all the requisite data pipelines, to enable the retrieval of the appropriate data from the appropriate data sources, the processing/preprocessing of the obtained data to be used as inputs into the selected algorithm(s), the training loop to iteratively train the selected algorithms including model validation and testing steps, deploying the trained model, and finally continuously refining the model over time to improve performance.

A context computing system 124 is present and configured to receive, retrieve, or otherwise obtain a plurality of context data from various sources including, but not limited to, enterprise users 110, marketplaces 130*a-n*, third-party sources 150, and other data sources 140*a-n*. Context computing system 124 may be configured to store obtained contextual data in a data store. For example, context data obtained from various enterprise endpoints 110*a-n* of a first enterprise may be stored separately from the context data obtained from the endpoints of a second enterprise. In some embodiments, context data may be aggregated from multiple enterprises within the same industry and stored as a single corpus of contextual data. In such embodiments, contextual data may be transformed prior to processing and storage so as to protect any potential private information or enterprise-specific secret knowledge that the enterprise does not wish to share.

A curation computing system 122 is present and configured to provide curated (or not) responses from a trained model (e.g., LLM) to received user queries. A curated response may indicate that it has been filtered, such as to remove personal identifying information or to remove extraneous information from the response, or it may indicate that the response has been augmented with additional context or information relevant to the user. In some embodiments, multiple trained models (e.g., LLMs) may each produce a response to a given prompt, which may include additional contextual data/elements, and a curation step may include selecting a single response of the multiple responses to send to a user, or the curation may involve curating the multiple responses into a single response. The curation of a response may be based on rules or policies that can set an individual user level, an enterprise level, or at a department level for enterprises with multiple departments (e.g., sales, marketing, research, product development, etc.).

According to the embodiment, an enterprise user 110 may refer to a business organization or company. An enterprise may wish to incorporate a trained ML model into their business processes. An enterprise may comprise a plurality of enterprise endpoints 110*a-n* which can include, but are not limited to, mobile devices, workstations, laptops, personal computers, servers, switches, routers, industrial equipment, gateways, smart wearables, Internet-of-Things (IoT) devices, sensors, and/or the like. An enterprise may engage with platform 120 to create a trained model to integrate with its business processes via one or more enterprise endpoints. To facilitate the creation of purpose-built, trained model, enterprise user 110 can provide a plurality of enterprise knowledge 111 which can be leveraged to build enterprise specific (or even specific to certain departments within the enterprise) ML/AI models. Enterprise knowledge 111 may refer to documents or other information important for the operation and success of an enterprise. Data from internal systems and databases, such as customer relationship management (CRM) systems, enterprise resource planning (ERP) systems, rules and policies databases, and transactional databases, can provide information about the operational context of an enterprise. For example, product knowledge, market knowledge, industry trends, regulatory knowledge, business processes, customer knowledge, technology knowledge, financial knowledge, organization knowledge, and risk management knowledge may be included in enterprise knowledge base 111.

According to the embodiment, platform 120 is configured to retrieve, receive, or otherwise obtain a plurality of data from various sources. A plurality of marketplaces 130a-n may be present and configured to provide centralized repositories for data, algorithms, and expert judgment, which can be purchased, sold, or traded on an open marketplace. External data sourced from various marketplaces 130a-n can be used as a training data source for creating trained models for a particular use case. A marketplace computing system 123 is present and configured to develop and integrate various marketplaces 130a-n. Marketplace computing system 123 can provide functionality directed to the registration of experts or entities. An expert may be someone who has a deep understanding and knowledge of a specific industry, including its trends, challenges, technologies, regulations, and best practices. Industry experts often have many years of experience working in the industry and have developed a reputation for their expertise and insights. Examples of experts can include, but are not limited to, consultants, analysts, researchers, academics, or professionals working in the industry. In some embodiments, experts and/or entities can register with platform 120 so that they may become verified experts/entities. In such an embodiment, an expert/entity profile may be created which can provide information about expert judgment, scored data and algorithms, and comparisons/statistics about the expert's/entity's scores and judgment with respect to other expert/entities. Marketplace computing system 123 may further provide functionality directed to the management of the various marketplaces and the data/algorithms provided therein.

According to some embodiments, platform 120 can communicate with and obtain data from various third-party services 150. For example, third-party services can include LLM services such as APIs and LLM hosting platforms, which platform 120 can interface with to obtain algorithms or models to use as starting points for training a neuro-symbolic generative AI reasoning and action model to be deployed at the enterprise or individual level. As another example, social media platforms can provide data about trends, events, and public sentiment, which can be useful for understanding the social context of a situation. Exemplary data sources 140a-n can include, but are not limited to, sensors, web data, environmental data, and survey and interviews.

Figure 2:
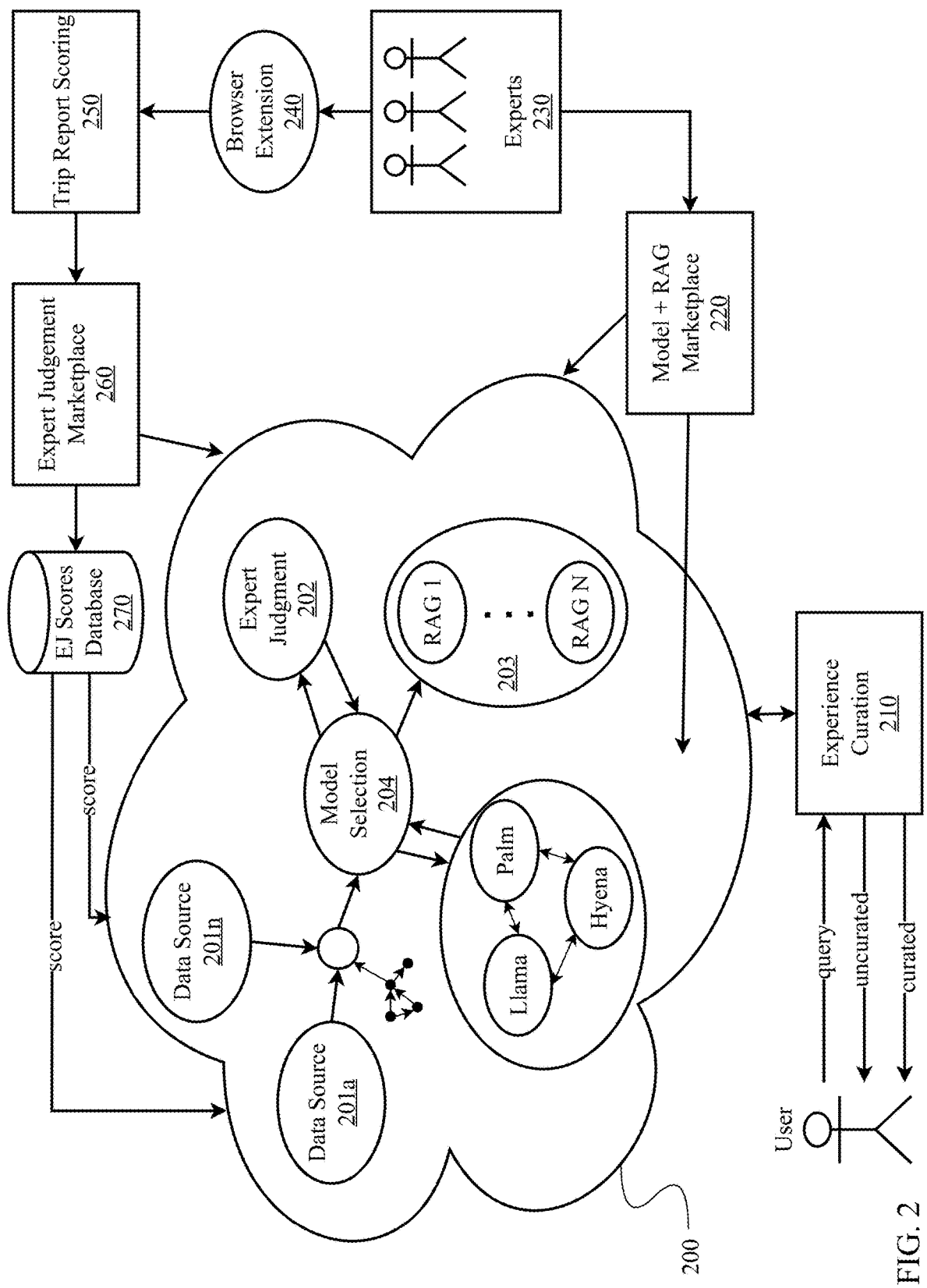
FIG. 2 is a block diagram illustrating an exemplary aspect of a distributed generative AI reasoning and action platform incorporating various additional contextual data.

FIG. 2 is a block diagram illustrating an exemplary aspect of a distributed generative AI reasoning and action platform incorporating various additional contextual data. According to the aspect, a plurality of contextual data from various data sources may be integrated into platform 120. A simple exemplary directed computational graph 200 is illustrated within the cloud and utilizing the plurality of contextual data to create and train a model. Various marketplaces 130a-n are shown which can provide contextual data to platform 120 including an expert judgment marketplace 260 and a model and retrieval augmented generation (RAG) marketplace 220. According to the aspect, DCG 200 orchestrates model (and model weight) selection 204, including multi-model usage in series or parallel (i.e., feed output of one model into another, or compare and choose outputs across multiple models), based on multiple data sources (both trained and external), input from crowdsourced expert judgment, training or tuning data set corpora, and RAG libraries.

Expert judgment will become increasingly important in the world of proprietary or otherwise blackbox ML or AI models where hallucinations and training data quality may produce misleading or otherwise incorrect results. The expert judgment marketplace 260 provides a way for experts 230 to weigh-in on the correctness of data whether that is training data or model output, and can be facilitated by a browser extension 240, for example, to score things like data sources during their daily "trip around web". This trip report scoring 250 concept allows experts to score data sources. In an implementation, a browser extension 240 is developed with an accuracy score input where the user can rank a news article they are reading as they consume it. Expert judgment marketplace 260 allows for consumers to pick and rank "experts" based on how well their judgment helps or hinders their overall consumption of model output. For example, experts that routinely highly rank data sources, like news sites, that are known to spread false information should likewise be less trusted over time compared to their peers, and any models trained on that data similarly less trusted. Ultimately a database 270 of data sources and schemas scored by algorithms or experts could be used as input into the DCG 200 for more accurate and real-time inference based on ongoing rating of preferred data set and data format combinations (e.g. the same data might be purchased in unstructured, structured, schematized, normalized, or semantified formats) which may introduce different types of bias or impacts on performance, results, or processing costs.

Accordingly, a RAG marketplace 220 may be implemented to further refine model output. RAG information may be included as additional context which can be supplied to a GenAI model in addition to a prompt (engineered, or otherwise). This is especially important where companies may want to sell access to their proprietary dataset through the form of a RAG. For example, a medical research company may have valuable information they could sell to other institutions in the form of a RAG to augment related research without specifically providing access to the raw training data. Retrieval-augmented generation is a framework that combines elements of retrieval-based and generative models to improve the performance of natural language processing tasks. In RAG, a retriever component is used to select relevant information from a large corpus, and a generator component is used to produce a final output based on both the retrieved information and the input query. RAG marketplace 220 may be scored by experts for accuracy and effectiveness across domains.

According to the aspect, a user experience curation engine 210 is needed that is able to curate output whether that is in the form of filtering out sensitive data or simply customizing results in a way the user prefers (which may be based on user-/entity-defined rules or policies). A user can submit a query to experience curation engine 210 which can send the query to the DCG trained model to obtain a response. Experience curation 210 may then process the received response to curate it (or not) to meet the preferences of the user.

As illustrated, DCG 200 shows a simple example of a directed computational graph which can be used to create a complex workflow to create and train an MI/AI model (e.g., variations of or standard transformer architecture). A shown, the DCG comprises multiple sources of information for training the selected models(s) including multiple data sources 201a-n which may or may not be scored by experts, expert judgment 202, and one or more RAGs 203 which may be obtained from RAG marketplace 220 or may be obtained directly from enterprise knowledge. DCG may have access to stored models or variants thereof. In the illustration, LLAMA (Learned Layer-wise Attention Metric for Transformers), PALM (Permuted Adaptive Lateral Modulation), and HYENA (Hyperbolic Encoder for Efficient Attention) are shown as possible examples of the types of models which can be selected by the DCG to create and train a GenAI model. Furthermore, the "model parameters" and mathematical techniques or assumptions used in each model may be cataloged and included in a model-specific template which may be stored in cloud-based storage on platform 120. In some embodiments, platform 120 may store a hierarchical representation of transformer models (e.g., as a graph), which may represent a lineage of the evolution of transformer models. In an implementation, model selection or exploration involves selections based on the evolutionary tree of one or more model types and use said tree (e.g., graph) for selections in heuristic search for best algorithm/ data combinations, licensing costs/explorations, etc. It should be appreciated that certain aspects of the invention may be tailored based on what kind of mathematical approach underpins a specific model.

In operation, DCG 200 obtains the various contextual data from the connected data sources, creates training, validation, and test datasets from the obtained data, and uses the various datasets to train, validate, and test the model as it undergoes a model training loop that iteratively trains the model to generate responses based on the plurality of contextual data.

Figure 3:
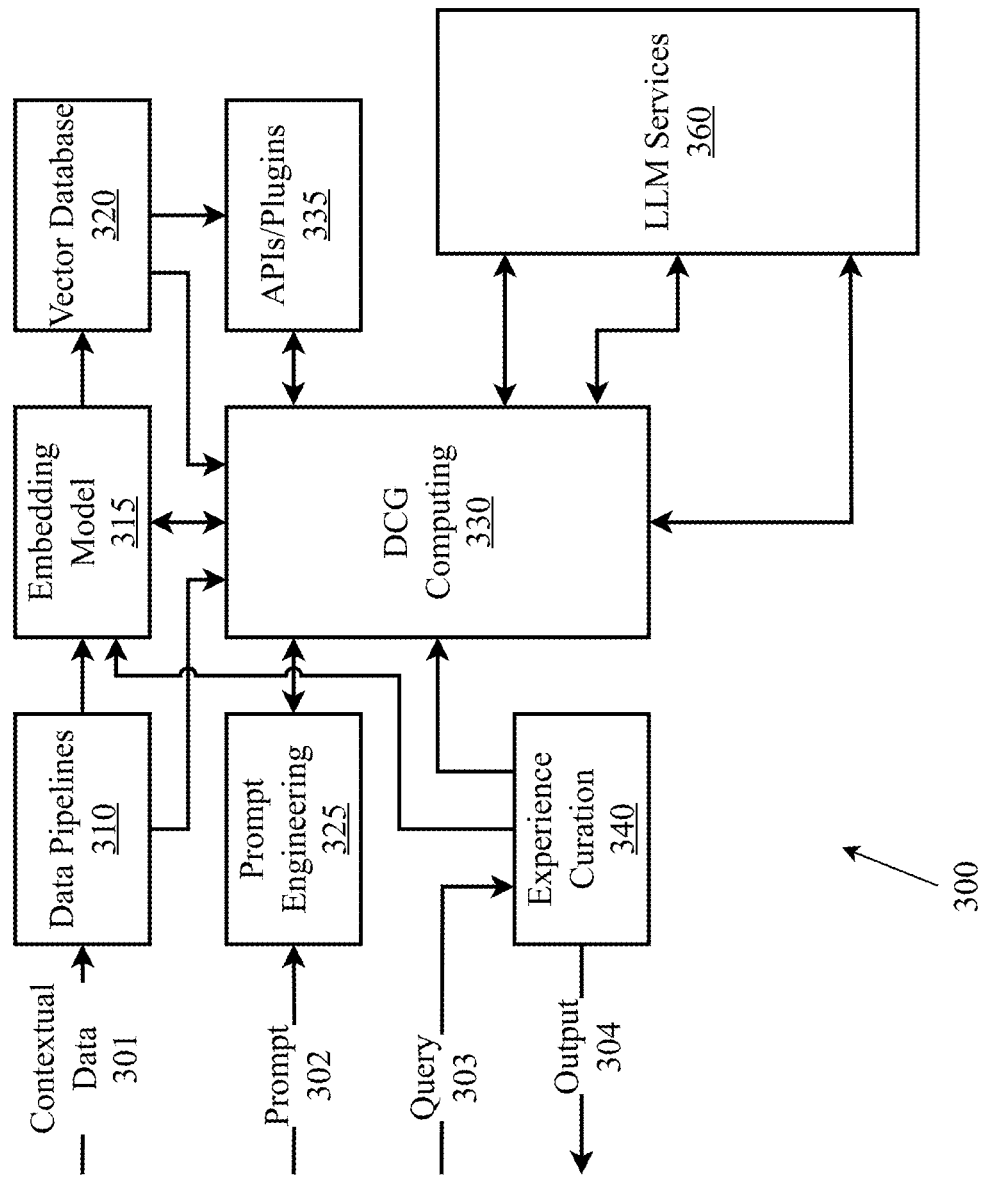
FIG. 3 is a diagram illustrating incorporating symbolic reasoning in support of LLM-based generative AI, according to an aspect of a neuro-symbolic generative AI reasoning and action platform.

FIG. 3 is a diagram illustrating incorporating symbolic reasoning in support of LLM-based generative AI, according to an aspect of a neuro-symbolic generative AI reasoning and action platform. According to the aspect, platform 120 can incorporate symbolic reasoning and in-context learning to create and train off the shelf models (e.g., an LLM foundational model or narrow model) through clever prompting and conditioning on private data or very situation specific "contextual" data. Platform 120 can obtain contextual data 301 and preprocess the data for storage. Contextual data 301 may refer to data obtained from marketplaces 130*a-n*, third-party services 150, and enterprise knowledge 111, as well as other types of contextual data that may be obtained from other sources. DCG 330 is responsible for orchestrating the entire process and can create data pipelines 310 as needed to facilitate the ingestion of contextual data 301. Contextual data can include text documents, PDFs, and even structure formats like CSV (comma-separated values) or SQL tables or other common generic data formats like OWL or RDF or domain specific content such as the Financial Industry Business Ontology (FIBO) or Open Graph of Information Technology (OGIT). This stage involves storing private data (e.g., context data) to be retrieved later.

Typically, the context data 301 is broken into chunks, passed through and embedding model 315, then stored in a specialized database called a vector database 320. Embedding models are a class of models used in many tasks such as natural language processing (NLP) to convert words, phrases, or documents into numerical representations (embeddings) that capture similarity which often correlates semantic meaning. Exemplary embedding models can include, but are not limited to, text-embedding-ada-002 model (i.e., OpenAI API), bidirectional encoder representations form transformers, Word2Vec, FastText, transformer-based models, and/or the like. The vector database 315 is responsible for efficiently storing, comparing, and retrieving a large plurality of embeddings (i.e., vectors). Vector database 315 may be any suitable vector database system known to those with skill in the art including, but not limited to, open source systems like Pinecone, Weaviate, Vespa, and Qdrant. According to the embodiment, embedding model 315 may also receive a user query from experience curation 340 and vectorize it where it may be stored in vector database 320. This provides another useful datapoint to provide deeper context when comparing received queries against stored query embeddings.

A user may submit a query 303 to an experience curation engine 340 which starts the prompt construction and retrieval process. The query is sent to DCG 330 which can send the query to various components such as prompt engineering 325 and embedding model 315. Embedding model 315 receives the query and vectorizes it and stores it in vector database 320. The vector database 320 can send contextual data (via vectors) to DCG 330 and to various APIs/plugins 335. Prompt engineering 325 can receive prompts 302 from developers to train the model on. These can include some sample outputs such as in few-shot prompting. The addition of prompts via prompt engineering 325 is designed to ground model responses in some source of truth and provide external context the model wasn't trained on. Other examples of prompt engineering that may be implemented in various embodiments include, but are not limited to, chain-of-thought, self-consistency, generated knowledge, tree of thoughts, directional stimulus, and/or the like.

During a prompt execution process, experience curation 340 can send user query to DCG 330 which can orchestrate the retrieval of context and a response. Using its declarative roots, DCG 330 can abstract away many of the details of prompt chaining; interfacing with external APIs 335 (including determining when an API call is needed); retrieving contextual data from vector databases 330; and maintaining memory across multiple LLM calls. The DCG output may be a prompt, or series of prompts, to submit to a language model via LLM services 360 (which may be potentially prompt tuned). In turn, the LLM processes the prompts, contextual data, and user query to generate a contextually aware response which can be sent to experience curation 340 where the response may be curated, or not, and returned to the user as output 304.

Figure 4:
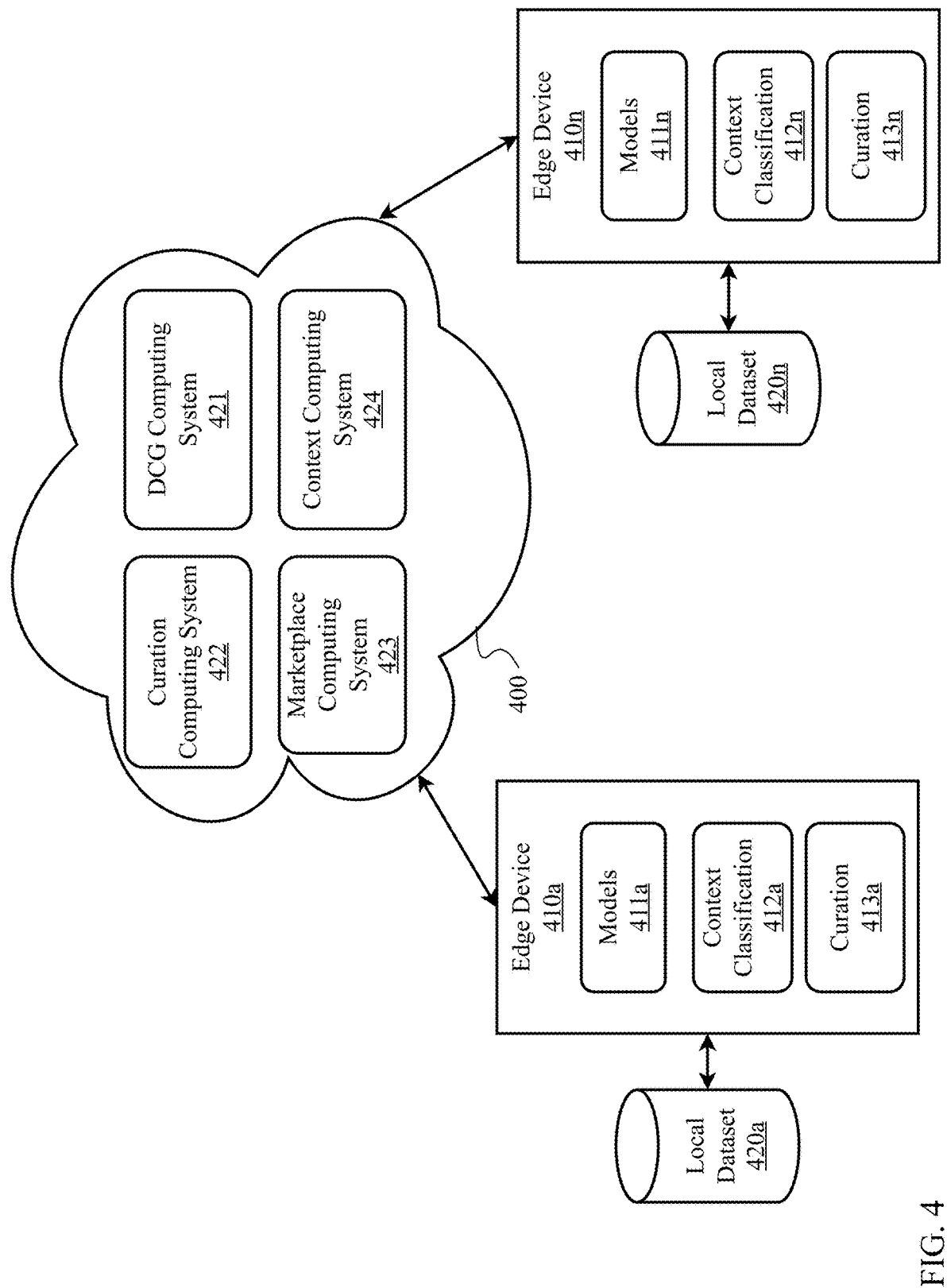
FIG. 4 is a block diagram illustrating an exemplary architecture for a neuro-symbolic generative AI reasoning and action platform configured for federated learning at a plurality of edge devices, according to an embodiment.

FIG. 4 is a block diagram illustrating an exemplary architecture for a neuro-symbolic generative AI reasoning and action platform 400 configured for federated learning at a plurality of edge devices 410*a-n*, according to an embodiment. According to the embodiment, platform 400 comprises DCH computing system 421, curation computing system 422, marketplace computing system 423, and context computing system 424. According to an embodiment, edge devices 410*a-n* may represent various enterprise endpoints. In other embodiments, edge devices 410*a-n* may represent various endpoints from two or more separate enterprises. In an embodiment, an edge device 410*a-n* may be a computing device associated with a platform user, such as someone who engages with the platform for experience curation or an expert who provides expert judgment scores to platform 400 via, for example, expert judgment marketplace 260 or some other mechanism.

As shown, each edge device 410*a-n* may comprise instances of local models 411*a-n*, context classification processes 412-*n*, and experience curation processes 413*a* operating on the device. Each edge device may have access to a local data or knowledge base 420*a-n* and which is only accessible by its associated edge device. Edge devices 410*a-n* may utilize these components to perform various computations wherein the processing of data and execution of algorithms happens locally on the device, rather than relying on the systems and services provided by platform 400. In some embodiments, a plurality of edge devices 410a-n may be implemented as individual computing nodes in a decentralized federated system, wherein tasks and data may be distributed across multiple nodes, allowing for parallel processing and potentially faster computation. Federated systems are often used in scenarios where data privacy and security are important, as data can remain on local nodes and only aggregated or processed results are shared more widely.

In some implementations, the platform 400 may leverage federated learning, where machine learning models 411a-n are trained across multiple decentralized edge devices 410a-n, with the models' updates being aggregated centrally. This approach allows for the training of models without the need to centrally store sensitive data from individual devices. For example, each edge device 410a-n could train local instances of neuro-symbolic GenAI reasoning and action models and local instances of context classification models 412a-n. According to an embodiment, context classification models 412a-n may be configured to select relevant passages from a knowledge base 420a-n or corpus given a query. This can be done using various techniques such as BM25, TF-IDF, or neural retrieval models like dense passage retrieval. The retrieved passages serve as context or input to a generator (e.g., a transformer-based model).

Federated learning can occur at the edge device wherein the context classification model 412a is trained locally. Periodically, (e.g., hourly, daily, weekly, etc.) platform 400 may collect (e.g., aggregate) model parameters, encrypted data, and/or the like from all of, or a subset of, edge devices 410a-n and apply the aggregated model parameters as an update to a master or global model (e.g., context classification, neuro-symbolic GenAI model, etc.). The updated global model or just its parameters, may be transmitted to all of, or a subset of, the edge devices 410a-n where they may be applied to the local models operating thereon. Similarly, platform 400 can aggregate obtained training data, which may or may not be encrypted, and apply the training data to global models. These updated models may be transmitted to edge devices as described above.

As shown, edge devices 410a-n may further comprise a curation application 413a-n operating on the device. Curation application 413a may be configured to act as an intermediary between a user who can submit a query and models 411a which receive the query and generate a response back. Curation 413a-n may receive a response from a locally stored model and curate the response based on user (or entity) defined rules or preferences. For example, a response may first be filtered of any personal information by curation 413a prior to the being relayed back to the user. As another example, curation 413a may transform the response into specific format, style, or language based on user defined preferences. This allows the edge device 410a user to have their experience with the local models curated to fit any criteria they deem important.

Figure 5:
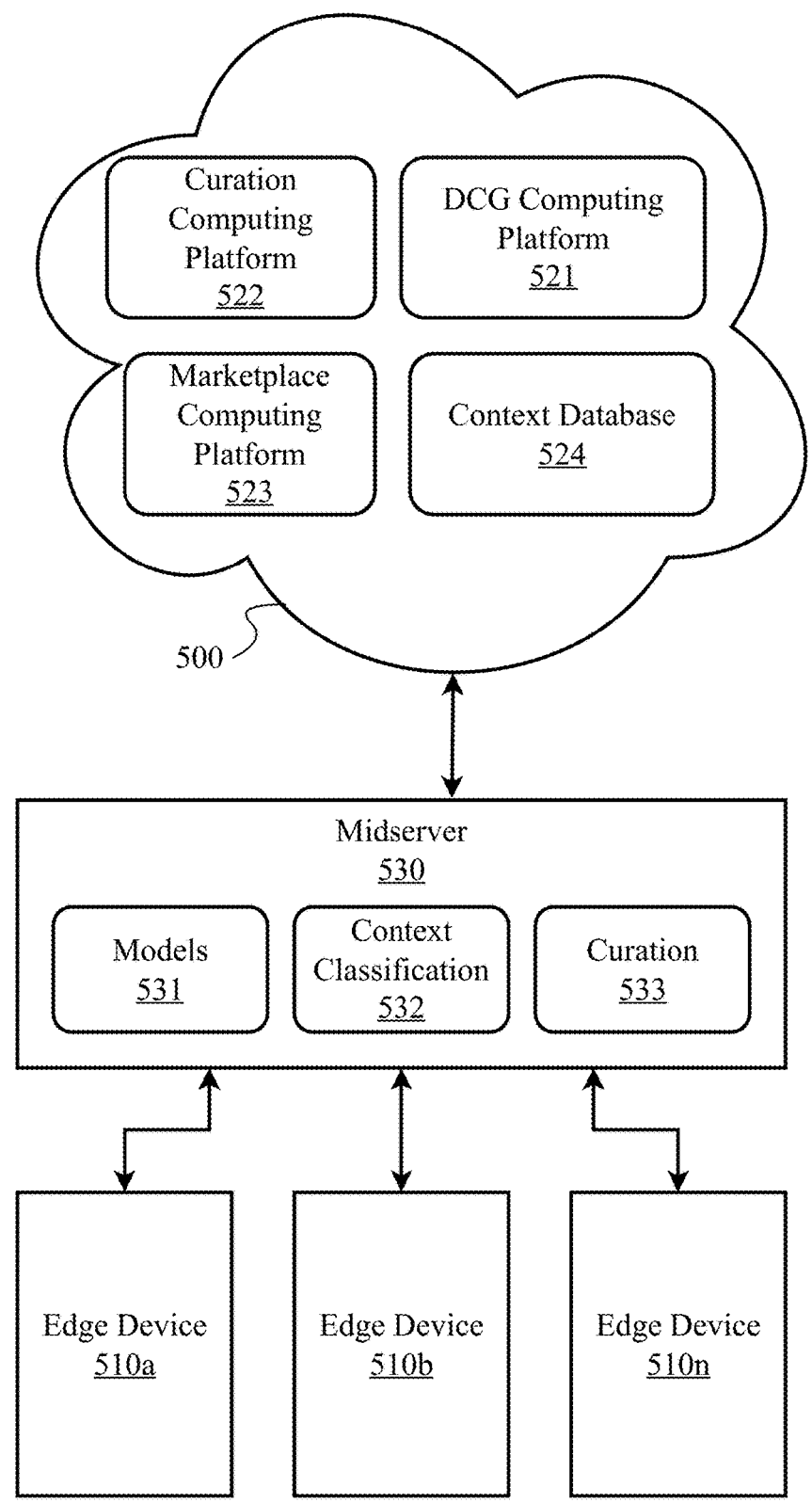
FIG. 5 is a block diagram illustrating an exemplary architecture for a neuro-symbolic generative AI reasoning and action platform configured to utilize a midserver to act as a computing intermediary between a plurality of edge devices and the platform.

FIG. 5 is a block diagram illustrating an exemplary architecture for a neuro-symbolic generative AI reasoning and action platform 500 configured to utilize a midserver 530 to act as a computing intermediary between a plurality of edge devices 510a-n and the platform. According to the embodiment, midserver 530 facilitates communication between edge devices 510a-n and the backend systems 521, 522, 523, 524 provided by platform 500. According to the embodiment, midserver 530 may have stored and operating on it one or more neuro-symbolic GenAI reasoning and action models 531, context classification processes 532, and curation processes 533. Midserver 530 can be configured to periodically receive data (e.g., context data) and state information from each of the connected edge devices 510a-n. Midserver 530 may use this information to train/update the models 531, 532. Additionally, midserver 530 can be configured to receive user-submitted queries from edge devices via curation 533, obtain relevant context associated with the received query via context classification 532, and use a neuro-symbolic GenAI model 531 to process the query and context data to generate a response to the user. The generated response may be curated (or not) and transmitted back to the user of the edge device.

In some implementations, edge devices 510a-n may have stored upon them local models as described in FIG. 4, and midserver 530 may store global, models or even mid-tier models associated with the local models. In such an implementation, midserver can aggregate model parameters and update the global/mid-tier models accordingly.

Figure 6:
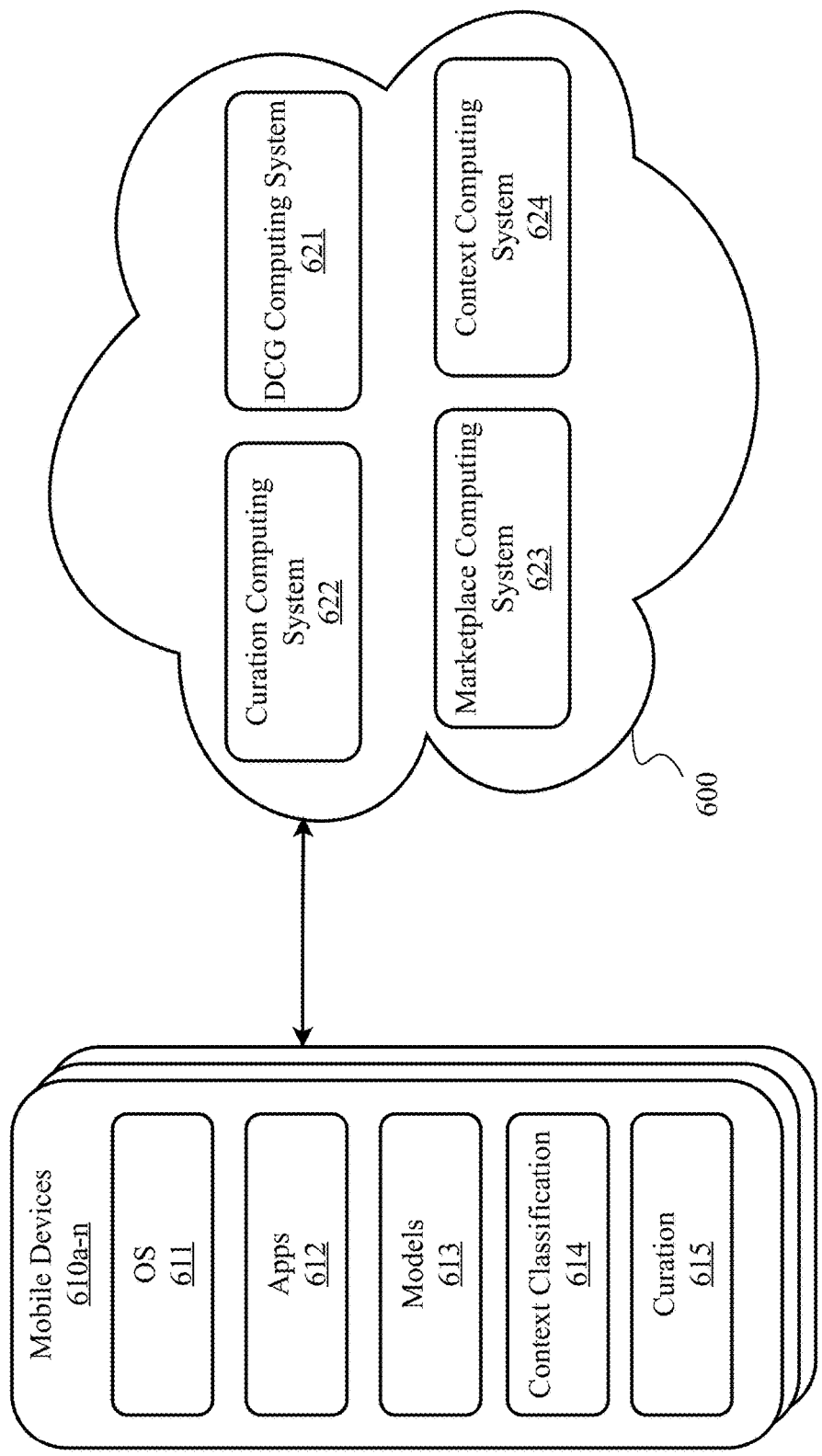
FIG. 6 is a block diagram illustrating an exemplary mobile device configured for experience curation using embedded capabilities and functionality provided by a neuro-symbolic generative AI reasoning and action platform, according to an embodiment.

FIG. 6 is a block diagram illustrating an exemplary mobile device 610a-n configured for experience curation using embedded capabilities and functionality provided by a neuro-symbolic generative AI reasoning and action platform 600, according to an embodiment. According to the embodiment, a mobile device 610a may comprise an operating system 611, various software applications 612 (e.g., text messaging application, social media application, mobile games, music streaming applications, etc.), a local instance of a neuro-symbolic GenAI model 613, a context classification model 614, and an experience curation application 615. Mobile devices 610a-n may further comprise a processor, memory, sensors, storage, wireless communication modules, a display, audio components, and various other components to enable the functionality of a mobile computing device. Mobile devices 610a-n may connect to platform 600 via a suitable communication network such as the Internet. In some embodiments, mobile device may utilize the systems and services 621, 622, 623, 624 provided by platform to facilitate query-response interactions with a neuro-symbolic GenAI model.

According to the embodiment, mobile device 610a stores and operates local models 613, 614 and a curation application 615 which can be leveraged during instances when mobile device 610a is unable to connect with platform 600 or otherwise has an intermittent connection thereby making data transmission difficult, slow, or impossible. In such situations, mobile device 610a can leverage the local components to perform computation at the edge. A user of mobile device 610a can use curation application 615 to submit a query to the local neuro-symbolic GenAI model 613, along with any aggregated context retrieved via context classification 614. The model 613 can generate a response and send it to curation application 615 where it may be curated (or not) based on the mobile device user's preferences or rules.

In some embodiments, when there is only an intermittent connection to platform 600, such as when a mobile device is in an area with poor network coverage, various strategies may be implemented to provide functionality to the mobile device user. For example, data (e.g., a user submitted query or prompt) can be temporarily stored in a buffer on the device until a connection to platform 600 is available. Once the connection is reestablished, the buffered data can be transmitted. Likewise, frequently accessed data or recently transmitted data can be cached on the device. This allows the device to access the data locally when a connection to platform 600 is not available. In some implementations, data can be compressed before transmission to reduce the amount of data that needs to be transmitted. This can help to minimize the impact of intermittent connections on data transmission. In some embodiments, mobile device 610a-n may use protocols that are designed to handle intermittent connections, such as MQTT (Message Queuing Telemetry Transport) or CoAP (Constrained Application Protocol), can help to ensure that data is successfully transmitted even in challenging network conditions. Finally, some use cases may implement an offline mode that allows users to continue using the application (or local instances) and storing data locally until a connection to platform 600 is available again.

Figure 7:
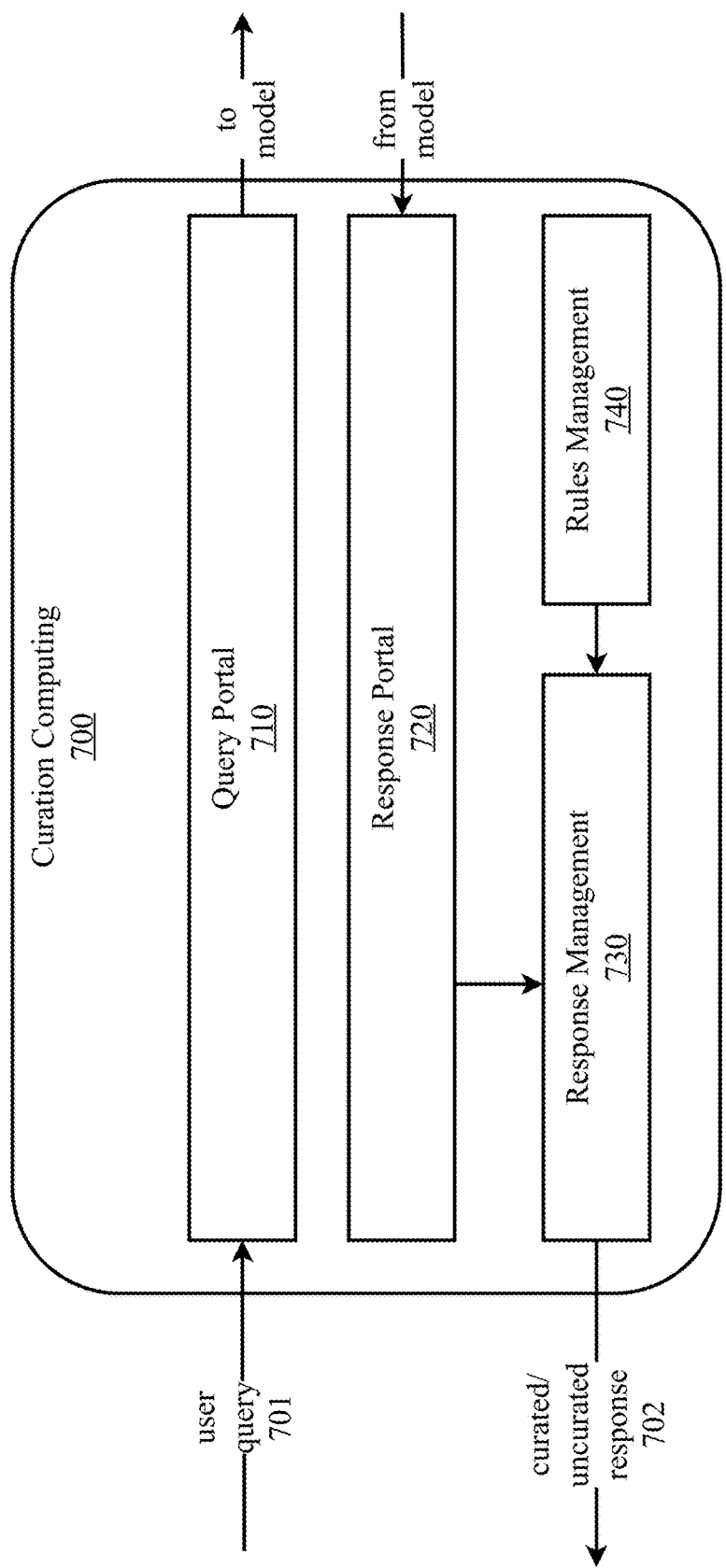
FIG. 7 is a block diagram illustrating an exemplary aspect of a distributed generative artificial intelligence reasoning and action platform, a curation computing system.

FIG. 7 is a block diagram illustrating an exemplary aspect of a distributed generative artificial intelligence reasoning and action platform, a curation computing system 700. According to the aspect, curation computing system 700 is configured to provide curated (or not) responses from a trained model (e.g., transformer-based model) to received user queries. A curated response may indicate that the response has been filtered, such as to remove personal identifying information or to remove extraneous information from the response, or it may indicate that the response has been augmented with additional context or information relevant to the user. The curation of a response may be based on rules or policies that can be set at an individual user level, an enterprise level, or at a department level for enterprises with multiple departments (e.g., sales, marketing, research, product development, etc.). User/entity rules and/or preferences may be stored in a data storage system of platform 120 and retrieved by a rules management component 740 during experience curation processes.

In operation, curation computing 700 receives a user query 701 directed to a neuro-symbolic GenAI model. A query portal 710 may be present and configured to receive a query 701 and prepare it for processing by a GenAI model. For example, a query may be split into tokens, (e.g., words or sub words) which are basic units of the language model. As another example, a text-based query may undergo normalization (e.g., converting to lowercase, removing punctuation, handling special characters, etc.) to ensure consistency and improve model performance. As yet another example, for models that use attention mechanisms, an attention mask may be applied to the input to indicate which tokens should be attended to and which should be ignored. In some implementations, a query portal 710 may be configured to send received queries to an embedding model which can vectorize the received query and store it in a vector database. In such embodiments, stored query embeddings may be used as a form of contextual data which may be retrieved and transmitted with the query to a GenAI model which generates a response based on the received query and contextual data.

According to the aspect, a response portal 720 is present and configured to receive a response from one a GenAI model and a response management system 730 determines if the received response needs to be curated or not. If the response does not need to be curated, then it may be sent as an uncrated response 702 to the user who submitted the query. Response management 730 can determine if there are any user/entity defined rules or preferences available such as stored in a user/entity profile in a data storage system of platform 120. Rules management 740 can retrieve said rules and response management can curate or otherwise augment the received response based on the user/entity rules or preferences. The result is a curated response 702 which can be transmitted back to the user who submitted the query.

Figure 8:
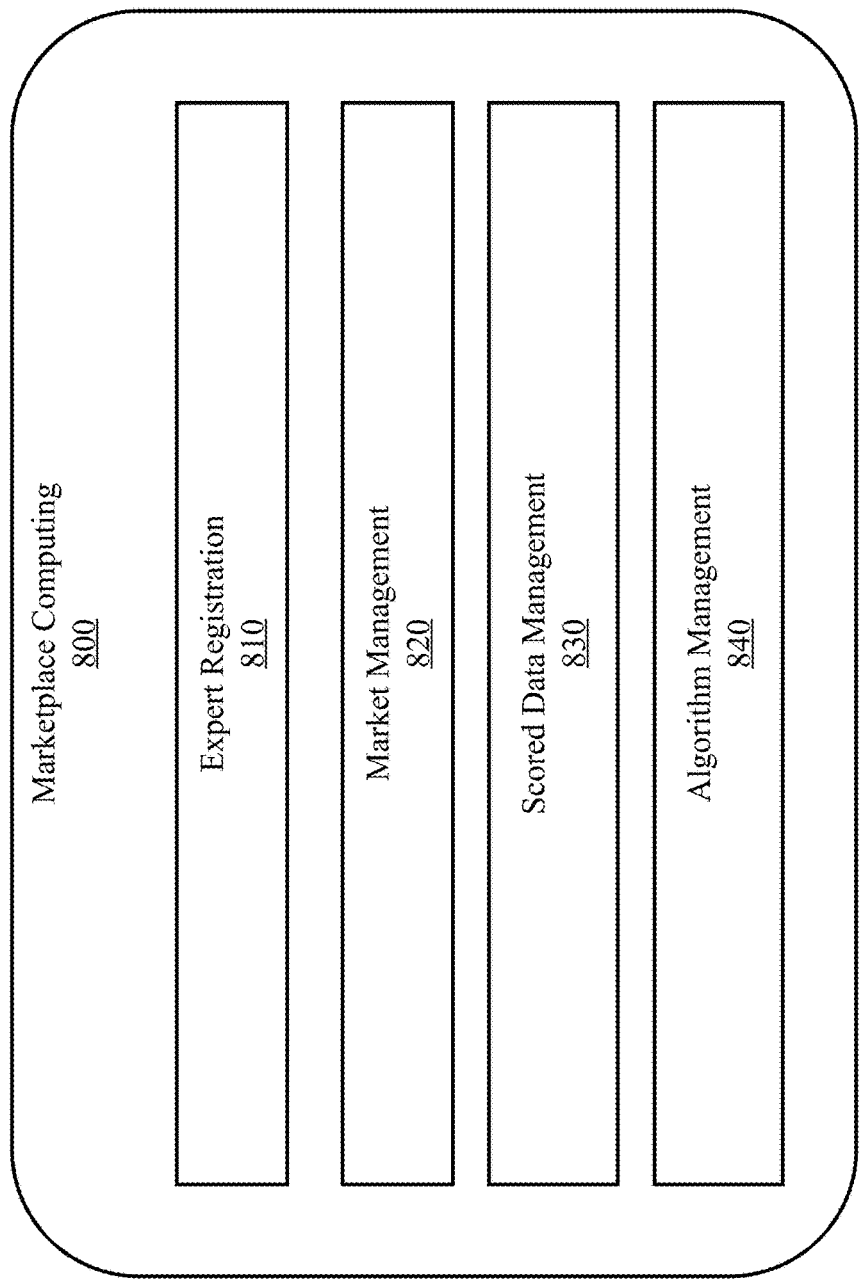
FIG. 8 is a block diagram illustrating an exemplary aspect of a distributed generative artificial intelligence reasoning and action platform, a marketplace computing system.

FIG. 8 is a block diagram illustrating an exemplary aspect of a distributed generative artificial intelligence reasoning and action platform, a marketplace computing system 800. According to the aspect, marketplace computing system 800 is present and configured to develop and integrate various marketplaces 130a-n for data, algorithms, and RAGs into platform 120. Marketplace computing system 800 can provide functionality directed to the registration of experts 810 or entities. An expert may be someone who has a deep understanding and knowledge of a specific industry, including its trends, challenges, technologies, regulations, and best practices. Industry experts often have many years of experience working in the industry and have developed a reputation for their expertise and insights. An expert may be registered by providing proof of identity and qualifications, and creating an expert profile which can store a variety of information about the expert such as their name, industry, credentials, scores (e.g., scores that the expert has assigned to data sources, models/algorithms, model outputs, and/or the like), and reputation. For example, a university professor who specializes in transformer-based algorithms can register as an expert in the realm of generative algorithms. As another example, a virologist could register as an expert and provide scores for academic papers which disclose a new methodology for viral spread modelling. Marketplace computing system 800 may further comprise a market management component 820 which can interface with a plurality of markets 130a-n to integrate information contained therein. A scored data management component 830 may be configured to interface with a browser extension 240 or expert judgment marketplace 260 to retrieve expert scores and store them in an expert judgment score database 270. According to the aspect, an algorithm management component 840 is present and configured to acquire algorithms from algorithm marketplaces to be used in the construction and configuration of neuro-symbolic GenAI models.

Figure 9:
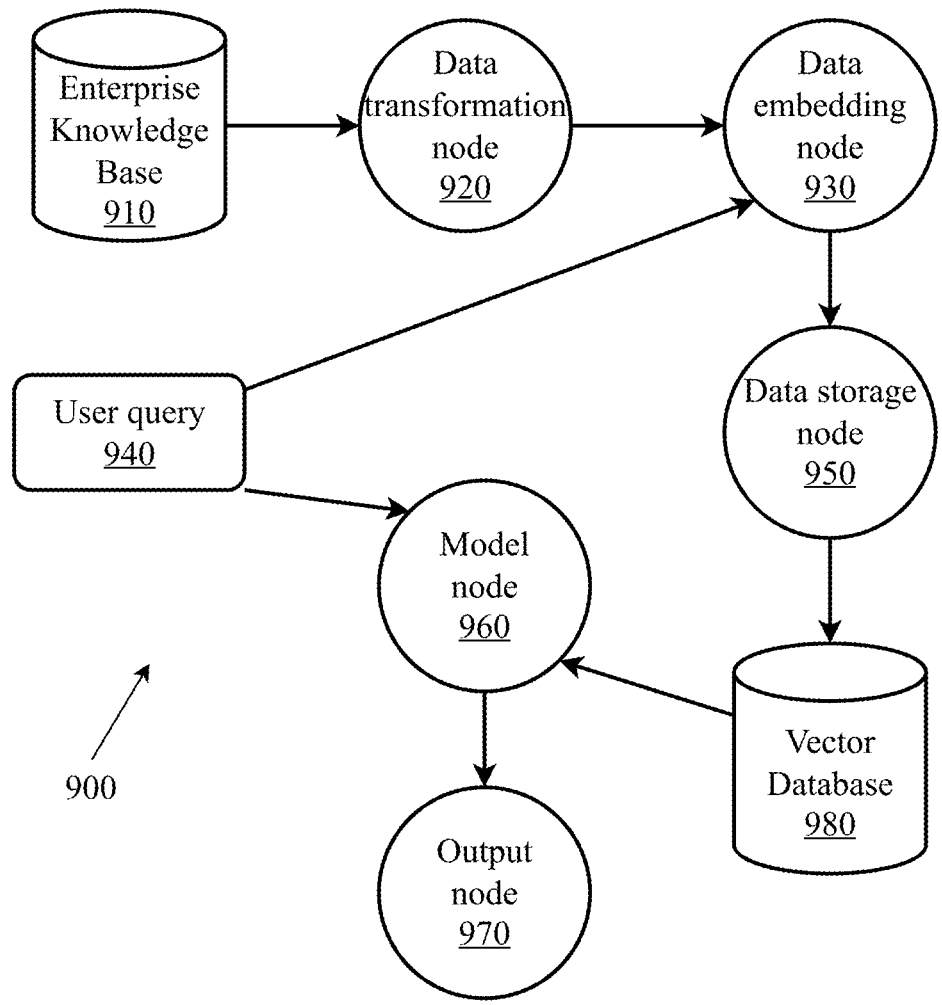
FIG. 9 is a block diagram illustrating a simple example of a distributed computational graph representation for providing neuro-symbolic GenAI capabilities, according to an aspect.

FIG. 9 is a block diagram illustrating a simple example of a distributed computational graph 900 representation for providing neuro-symbolic GenAI capabilities, according to an aspect. According to the aspect, the DCG may be represented as a series of nodes which represent discrete computational or data processing functions, and a series of edges connecting the nodes which represent information or data messages being sent between processing nodes. A DCG can be used to acquire a plurality of context data in the form of an enterprise knowledge base 910. A data transformation node 920 is created to handle the ingestion and transformation of acquired context data. Obtained data may then be sent to a data embedding node 930 which can vectorize the received context data. The vectorized data may flow from the embedding node 930 to a data storage node 950. Data storage node 950 may select the appropriate vector database 980 in which to store the vectorized context data. An input node 940 may allow for a user to submit a query to the workflow. The user query can be sent to data embedding node 930 where it may be vectorized and sent to data storage node 950 for storage in the vector database. The user query can also be sent to a model node 960 which contains the selected model(s) which will process the user query along with any relevant context data obtained from data storage node vector database 980. Model node 960 then processes this information to generate a response which can be sent to output node 970. In some instances, output node 970 may output the response directly to the user. In other instances, output node 970 may be configured to transform the response into a curated response based on user/entity defined rules or preferences.

FIGS. 10-14 illustrate various exemplary aspects of system architectures of distributed computational graph computing environments. For more detailed information regarding the operation of the various components and aspects described herein with respect to FIGS. 10-14, please refer to U.S. patent application Ser. No. 15/931,534 which is incorporated herein by reference.

Figure 10:
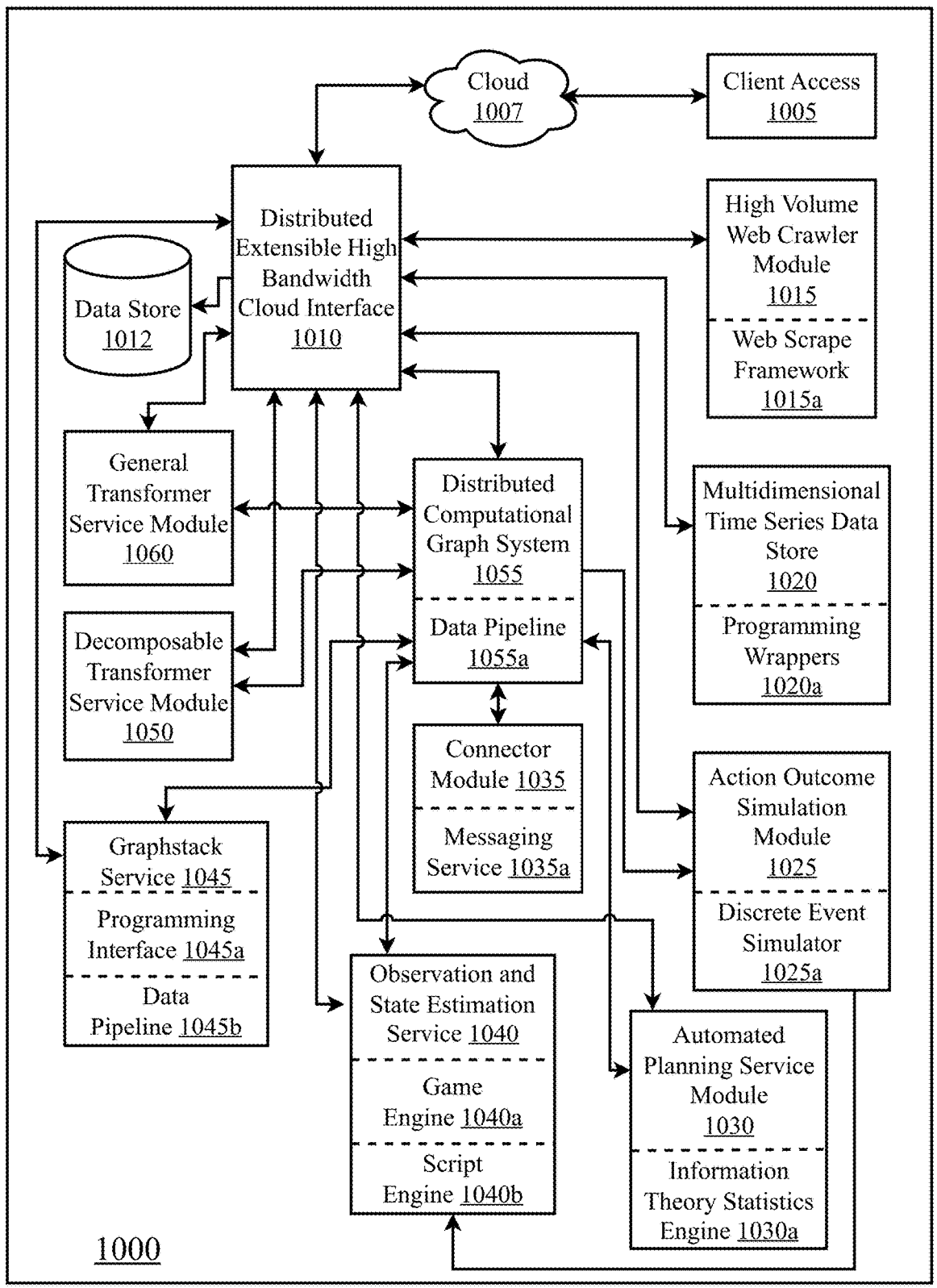
FIG. 10 is a block diagram illustrating an exemplary aspect of an embodiment of a distributed computational graph computing system utilizing an advanced cyber decision platform (ACDP) for external network reconnaissance and contextual data collection.

FIG. 10 is a block diagram illustrating an exemplary aspect of an embodiment of a distributed computational graph computing system utilizing an advanced cyber decision platform (ACDP) for external network reconnaissance and contextual data collection. Client access to the system 1005 for specific data entry, system control and for interaction with system output such as automated predictive decision making and planning and alternate pathway simulations, occurs through the system's distributed, extensible high bandwidth cloud interface 1010 which uses a versatile, robust web application driven interface for both input and display of client-facing information via network 1007 and operates a data store 1012 such as, but not limited to MONGODB™, COUCHDB™ CASSANDRA™ or REDIS™ according to various arrangements. Much of the enterprise knowledge/context data analyzed by the system both from sources within the confines of the enterprise business, and from cloud based sources, also enter the system through the cloud interface 1010, data being passed to the connector module 1035 which may possess the API routines 1035a needed to accept and convert the external data and then pass the normalized information to other analysis and transformation components of the system, the directed computational graph module 1055, high volume web crawler module 1015, multidimensional time series database (MDTSDB) 1020 and the graph stack service 1045. The directed computational graph module 1055 retrieves one or more streams of data from a plurality of sources, which includes, but is in no way not limited to, enterprise knowledge, RAGs, expert judgment/scores, a plurality of physical sensors, network service providers, web based questionnaires and surveys, monitoring of electronic infrastructure, crowdsourcing campaigns, and human input device information. Within the directed computational graph module 1055, data may be split into two identical streams in a specialized pre-programmed data pipeline 1055a, wherein one sub-stream may be sent for batch processing and storage while the other sub-stream may be reformatted for transformation pipeline analysis. The data is then transferred to the general transformer service module 1060 for linear data transformation as part of analysis or the decomposable transformer service module 1050 for branching or iterative transformations that are part of analysis. The directed computational graph module 1055 can represent all data as directed graphs where the transformations are nodes and the result messages between transformations edges of the graph. The high volume web crawling module 1015 uses multiple server hosted preprogrammed web spiders, which while autonomously configured are deployed within a web scraping framework 1015a of which SCRAPY™ is an example, to identify and retrieve data of interest from web based sources that are not well tagged by conventional web crawling technology. Data persistence stores such as the multiple dimension time series data store module 1020 may receive streaming data from a large plurality of sensors that may be of several different types. The multiple dimension time series data store module may also store any time series data encountered by the system such as but not limited to enterprise network usage data, component and system logs, environmental context, edge device state information, performance data, network service information captures such as, but not limited to news and financial feeds, and sales and service related customer data. The module is designed to accommodate irregular and high volume surges by dynamically allocating network bandwidth and server processing channels to process the incoming data. Inclusion of programming wrappers 1020a for languages examples of which are, but not limited to C++, PERL, PYTHON, Rust, GoLang, and ERLANG™ allows sophisticated programming logic to be added to the default function of the multidimensional time series database 1020 without intimate knowledge of the core programming, greatly extending breadth of function. Data retrieved by various data stores such as SQL, graph, key-value, or the multidimensional time series database (MDTSDB) 1020 and the high volume web crawling module 1015 may be further analyzed and transformed into task optimized results by the directed computational graph 1055 and associated general transformer service 1050 and decomposable transformer service 1060 modules. Alternately, data from the multidimensional time series database and high volume web crawling modules may be sent, often with scripted cuing information determining important vertexes 1045a, to the graph stack service module 1045 which, employing standardized protocols for converting streams of information into graph representations of that data, for example, open graph internet technology although the invention is not reliant on any one standard. Through the steps, the graph stack service module 1045 represents data in graphical form influenced by any predetermined scripted modifications 1045a and stores it in a graph-based data store 1045b such as GIRAPH™ or a key value pair type data store REDIS™, or RIAK™, among others, all of which are suitable for storing graph-based information.

Results of the transformative analysis process may then be combined with further client directives, and additional business rules and practices relevant to the analysis and situational information external to the already available data in the automated planning service module 1030 which also runs powerful information theory 1030a based predictive statistics functions and machine learning algorithms to allow future trends and outcomes to be rapidly forecast based upon the current system derived results and choosing each a plurality of possible business decisions. Using all available data, the automated planning service module 1030 may propose business decisions most likely to result is the most favorable business outcome with a usably high level of certainty. Closely related to the automated planning service module in the use of system derived results in conjunction with possible externally supplied additional information (i.e., context) in the assistance of end user business decision making, the action outcome simulation module 1025 with its discrete event simulator programming module 1025a coupled with the end user facing observation and state estimation service 1040 which is highly scriptable 1040b as circumstances require and has a game engine 1040a to more realistically stage possible outcomes of business decisions under consideration, allows business decision makers to investigate the probable outcomes of choosing one pending course of action over another based upon analysis of the current available data.

Figure 11:
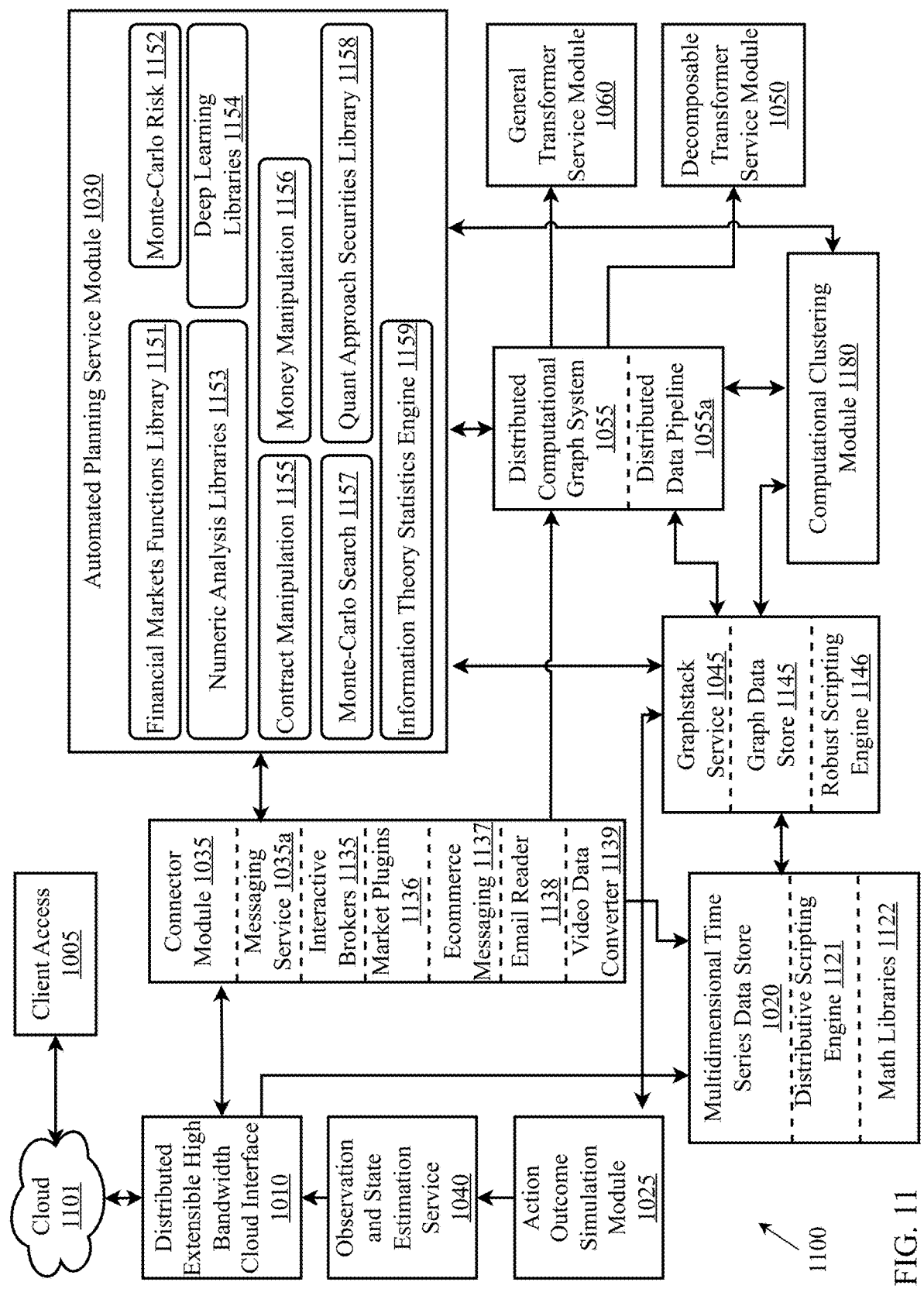
FIG. 11 is a block diagram illustrating another exemplary aspect of an embodiment of a distributed computational graph computing systems utilizing an advanced cyber decision platform.

FIG. 11 is a block diagram illustrating another exemplary aspect of an embodiment 1100 of a distributed computational graph computing systems utilizing an advanced cyber decision platform. According to the aspect the integrated platform 1100, is very well suited to perform advanced predictive analytics and predictive simulations to produce investment predictions. Much of the trading specific programming functions are added to the automated planning service module 1030 of the modified advanced cyber decision platform 1100 to specialize it to perform trading analytics. Specialized purpose libraries may include but are not limited to financial markets functions libraries 1151, Monte-Carlo risk routines 1152, numeric analysis libraries 1153, deep learning libraries 1154, contract manipulation functions 1155, money handling functions 1156, Monte-Carlo search libraries 1157, and quant approach securities routines 1158. Pre-existing deep learning routines including information theory statistics engine 1159 may also be used. The invention may also make use of other libraries and capabilities that are known to those skilled in the art as instrumental in the regulated trade of items of worth. Data from a plurality of sources used in trade analysis are retrieved, much of it from remote, cloud resident 1101 servers through the system's distributed, extensible high bandwidth cloud interface 110 using the system's connector module 135 which is specifically designed to accept data from a number of information services both public and private through interfaces to those service's applications using its messaging service 135a routines, due to ease of programming, are augmented with interactive broker functions 1135, market data source plugins 1136, e-commerce messaging interpreters 1137, business-practice aware email reader 1138 and programming libraries to extract information from video data sources 1139.

Other modules that make up the advanced cyber decision platform may also perform significant analytical transformations on trade related data. These may include the multidimensional time series data store 1020 with its robust scripting features which may include a distributive friendly, fault-tolerant, real-time, continuous run prioritizing, programming platform such as, but not limited to Erlang/OTP 1121 and a compatible but comprehensive and proven library of math functions of which the $C^{++}$ math libraries are an example 1122, data formalization and ability to capture time series data including irregularly transmitted, burst data; the GraphStack service 145 which transforms data into graphical representations for relational analysis and may use packages for graph format data storage such as Titan 1145 or the like and a highly interface accessible programming interface an example of which may be Akka/Spray, although other, similar, combinations may equally serve the same purpose in this role 1146 to facilitate optimal data handling; the directed computational graph module 155 and its distributed data pipeline 155a supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 1005 in formats best suited to convey both important results for analysts to make highly informed decisions and, when needed, interim or final data in summary and potentially raw for direct human analysis. Simulations which may use data from a plurality of field spanning sources to predict future trade conditions these are accomplished within the action outcome simulation module 1025. Data and simulation formatting may be completed or performed by the observation and state estimation service 1040 using its ease of scripting and gaming engine to produce optimal presentation results.

In cases where there are both large amounts of data to be ingested, schematized, normalized, semantified or otherwise cleansed, enriched or formalized and then intricate transformations such as those that may be associated with deep machine learning, predictive analytics and predictive simulations, distribution of computer resources to a plurality of systems may be routinely required to accomplish these tasks due to the volume of data being handled and acted upon. The advanced cyber decision platform employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module 1180 to allow the configuration and management of such clusters during application of the advanced cyber decision platform. While the computational clustering module is drawn directly connected to specific co-modules of the advanced cyber decision platform these connections, while logical, are for ease of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

Figure 12:
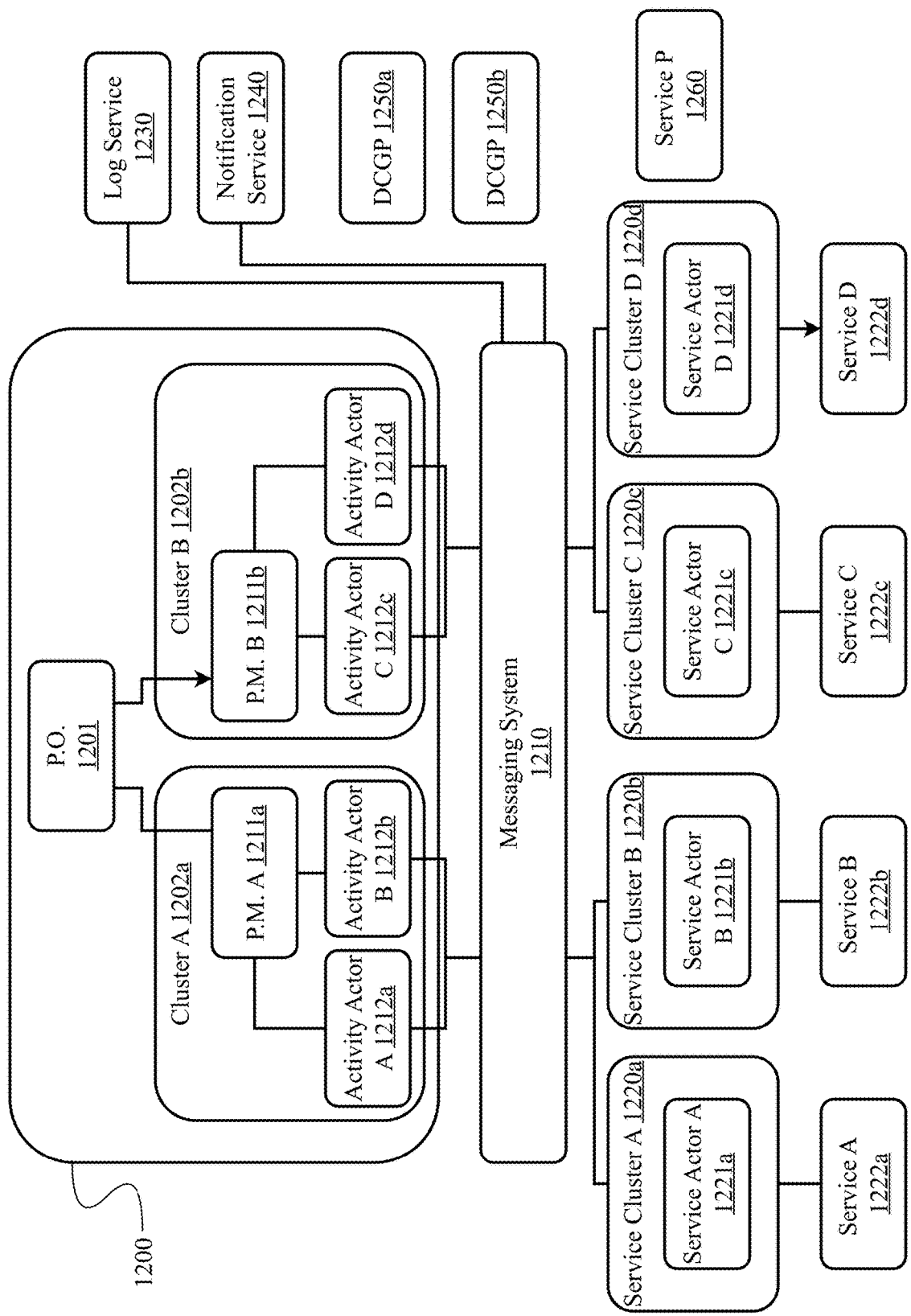
FIG. 12 is a diagram of an exemplary architecture for a system for rapid predictive analysis of very large data sets using an actor-driven distributed computational graph, according to one aspect.

FIG. 12 is a diagram of an exemplary architecture for a system for rapid predictive analysis of very large data sets using an actor-driven distributed computational graph 1200, according to one aspect. According to the aspect, a DCG 1200 may comprise a pipeline orchestrator 1201 that may be used to perform a variety of data transformation functions on data within a processing pipeline, and may be used with a messaging system 1210 that enables communication with any number of various services and protocols, relaying messages and translating them as needed into protocol-specific API system calls for interoperability with external systems (rather than requiring a particular protocol or service to be integrated into a DCG 1200).

Pipeline orchestrator 1201 may spawn a plurality of child pipeline clusters 1202a-b, which may be used as dedicated workers for streamlining parallel processing. In some arrangements, an entire data processing pipeline may be passed to a child cluster 1202a for handling, rather than individual processing tasks, enabling each child cluster 1202a-b to handle an entire data pipeline in a dedicated fashion to maintain isolated processing of different pipelines using different cluster nodes 1202a-b. Pipeline orchestrator 1201 may provide a software API for starting, stopping, submitting, or saving pipelines. When a pipeline is started, pipeline orchestrator 1201 may send the pipeline information to an available worker node 1202a-b, for example using AKKA™ clustering. For each pipeline initialized by pipeline orchestrator 1201, a reporting object with status information may be maintained. Streaming activities may report the last time an event was processed, and the number of events processed. Batch activities may report status messages as they occur. Pipeline orchestrator 1201 may perform batch caching using, for example, an IGFS™ caching filesystem. This allows activities 1212a-d within a pipeline 1202a-b to pass data contexts to one another, with any necessary parameter configurations.

A pipeline manager 1211a-b may be spawned for every new running pipeline, and may be used to send activity, status, lifecycle, and event count information to the pipeline orchestrator 1201. Within a particular pipeline, a plurality of activity actors 1212a-d may be created by a pipeline manager 1211a-b to handle individual tasks, and provide output to data services 1222a-d. Data models used in a given pipeline may be determined by the specific pipeline and activities, as directed by a pipeline manager 1211a-b. Each pipeline manager 1211*a-b* controls and directs the operation of any activity actors 1212*a-d* spawned by it. A pipeline process may need to coordinate streaming data between tasks. For this, a pipeline manager 1211*a-b* may spawn service connectors to dynamically create TCP connections between activity instances 1212*a-d*. Data contexts may be maintained for each individual activity 1212*a-d*, and may be cached for provision to other activities 1212*a-d* as needed. A data context defines how an activity accesses information, and an activity 1212*a-d* may process data or simply forward it to a next step. Forwarding data between pipeline steps may route data through a streaming context or batch context.

A client service cluster 1230 may operate a plurality of service actors 1221*a-d* to serve the requests of activity actors 1212*a-d*, ideally maintaining enough service actors 1221*a-d* to support each activity per the service type. These may also be arranged within service clusters 1220*a-d*, in a manner similar to the logical organization of activity actors 1212*a-d* within clusters 1202*a-b* in a data pipeline. A logging service 1230 may be used to log and sample DCG requests and messages during operation while notification service 1240 may be used to receive alerts and other notifications during operation (for example to alert on errors, which may then be diagnosed by reviewing records from logging service 1230), and by being connected externally to messaging system 1210, logging and notification services can be added, removed, or modified during operation without impacting DCG 1200. A plurality of DCG protocols 1250*a-b* may be used to provide structured messaging between a DCG 1200 and messaging system 1210, or to enable messaging system 1210 to distribute DCG messages across service clusters 1220*a-d* as shown. A service protocol 1260 may be used to define service interactions so that a DCG 1200 may be modified without impacting service implementations. In this manner it can be appreciated that the overall structure of a system using an actor-driven DCG 1200 operates in a modular fashion, enabling modification and substitution of various components without impacting other operations or requiring additional reconfiguration.

Figure 13:
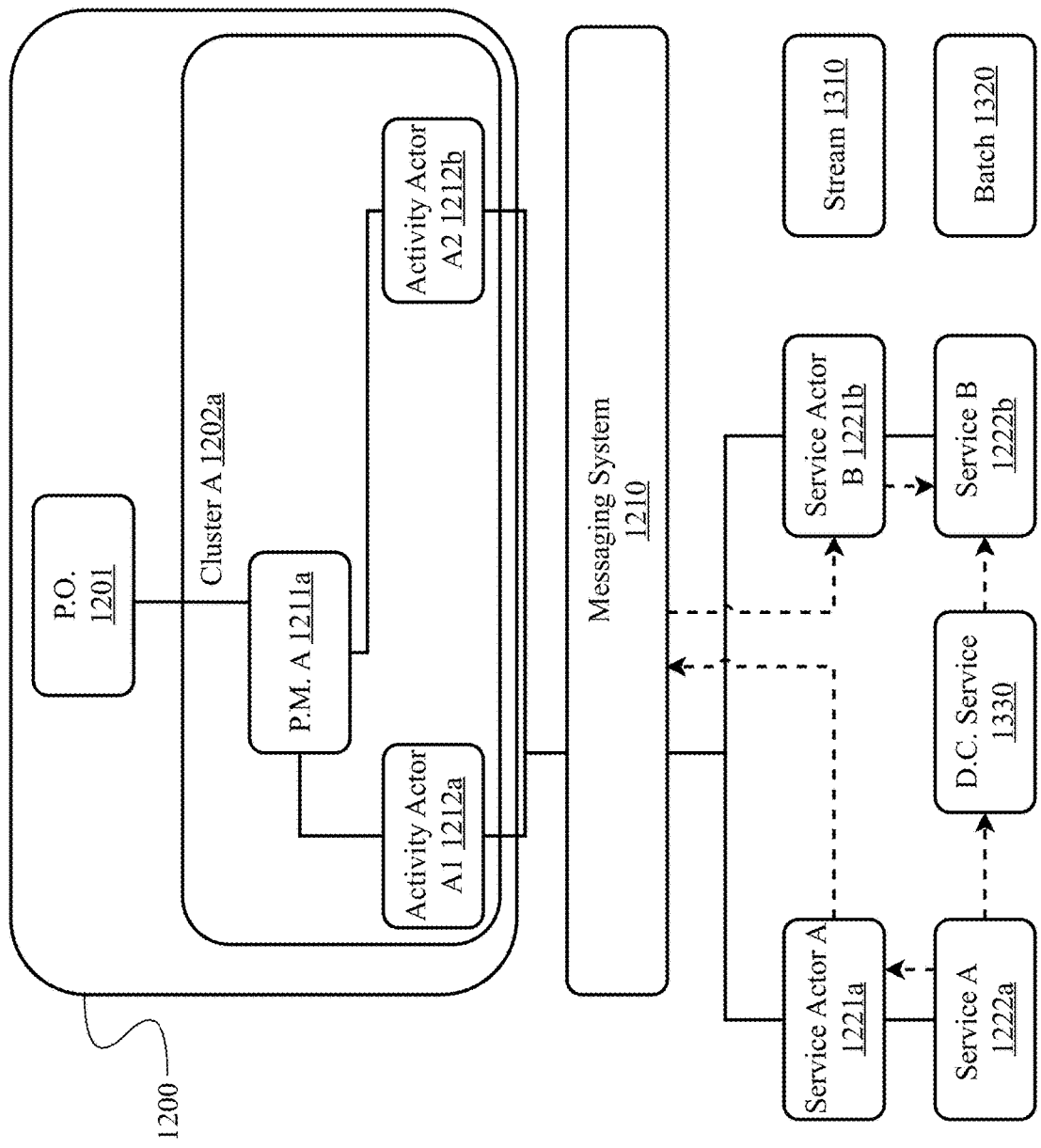
FIG. 13 is a diagram of an exemplary architecture for a system for rapid predictive analysis of very large data sets using an actor-driven distributed computational graph, according to one aspect.

FIG. 13 is a diagram of an exemplary architecture for a system for rapid predictive analysis of very large data sets using an actor-driven distributed computational graph 1200, according to one aspect. According to the aspect, a variant messaging arrangement may utilize messaging system 1210 as a messaging broker using a streaming protocol 1310, transmitting and receiving messages immediately using messaging system 1210 as a message broker to bridge communication between service actors 1221*a-b* as needed. Alternately, individual services 1222*a-b* may communicate directly in a batch context 1320, using a data context service 1330 as a broker to batch-process and relay messages between services 1222*a-b*.

Figure 14:
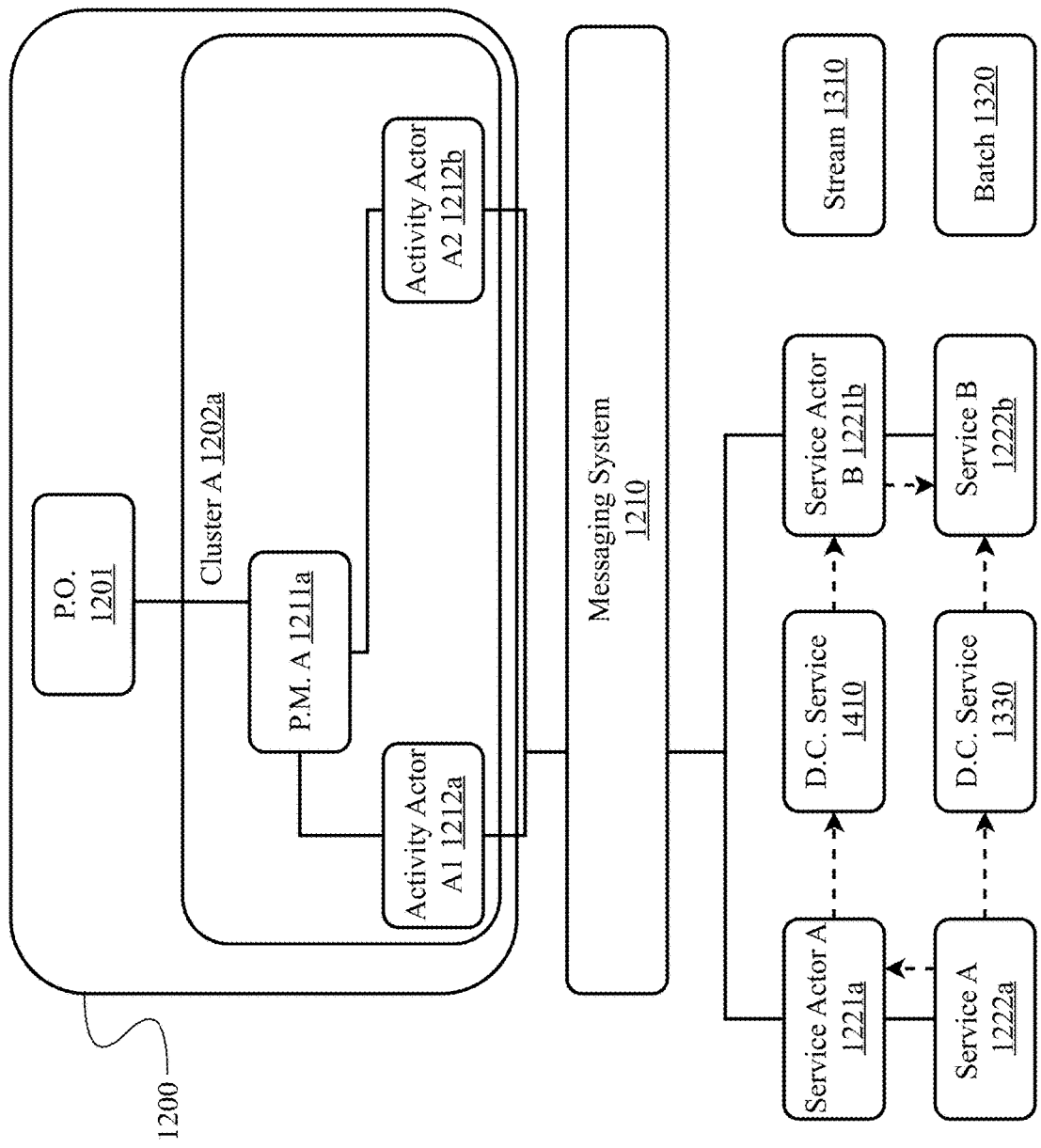
FIG. 14 is a diagram of an exemplary architecture for a system for rapid predictive analysis of very large data sets using an actor-driven distributed computational graph, according to one aspect.

FIG. 14 is a diagram of an exemplary architecture for a system for rapid predictive analysis of very large data sets using an actor-driven distributed computational graph 1200, according to one aspect. According to the aspect, a variant messaging arrangement may utilize a service connector 1410 as a central message broker between a plurality of service actors 1221*a-b*, bridging messages in a streaming context 1310 while a data context service 1330 continues to provide direct peer-to-peer messaging between individual services 1222*a-b* in a batch context 1320.

It should be appreciated that various combinations and arrangements of the system variants described above (referring to FIGS. 10-14) may be possible, for example using one particular messaging arrangement for one data pipeline directed by a pipeline manager 1211*a-b*, while another pipeline may utilize a different messaging arrangement (or may not utilize messaging at all). In this manner, a single DCG 1200 and pipeline orchestrator 1201 may operate individual pipelines in the manner that is most suited to their particular needs, with dynamic arrangements being made possible through design modularity as described above in FIG. 12.

Figure 15:
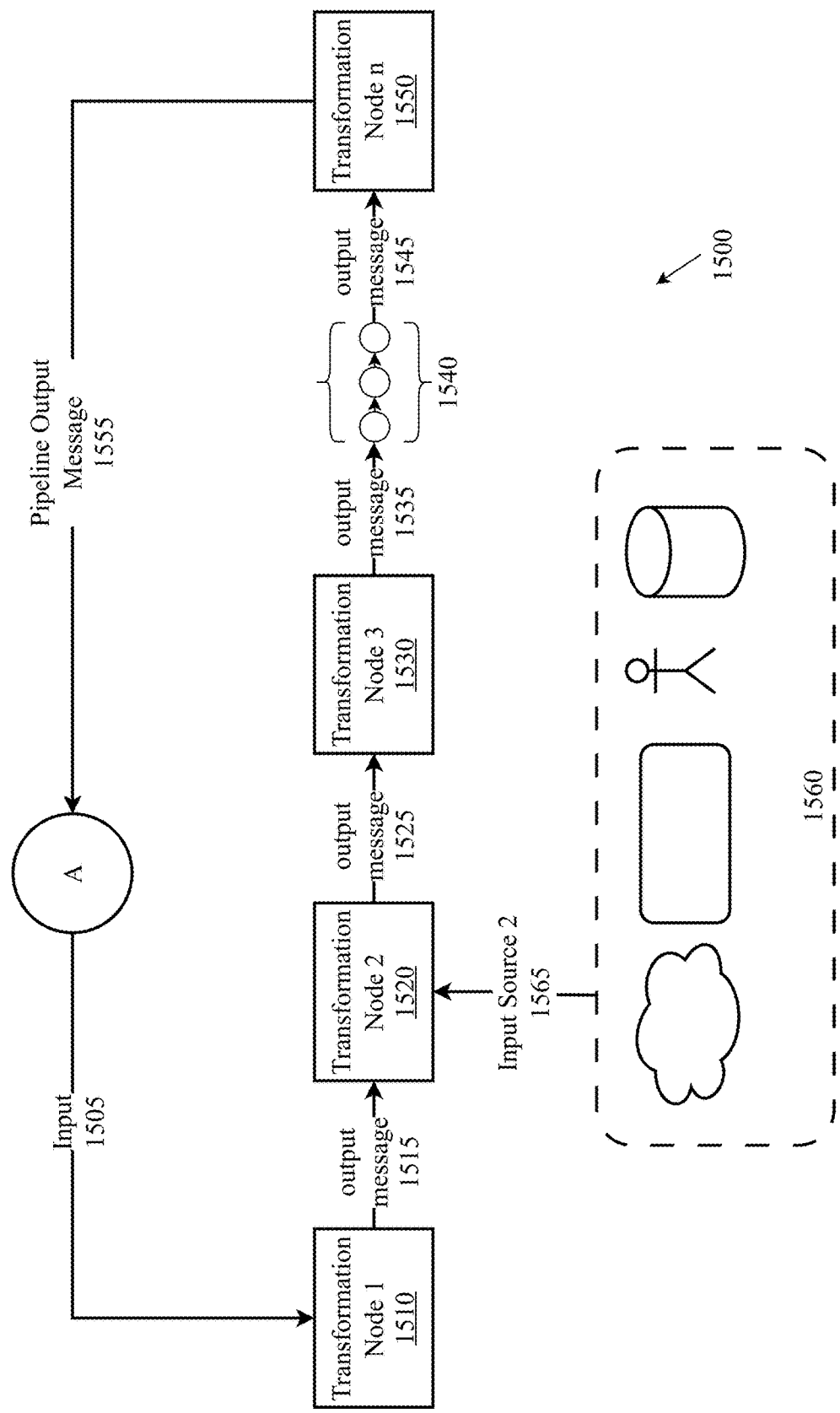
FIG. 15 is a block diagram of an architecture for a transformation pipeline within a system for predictive analysis of very large data sets using distributed computational graph computing system.
Figure 16:
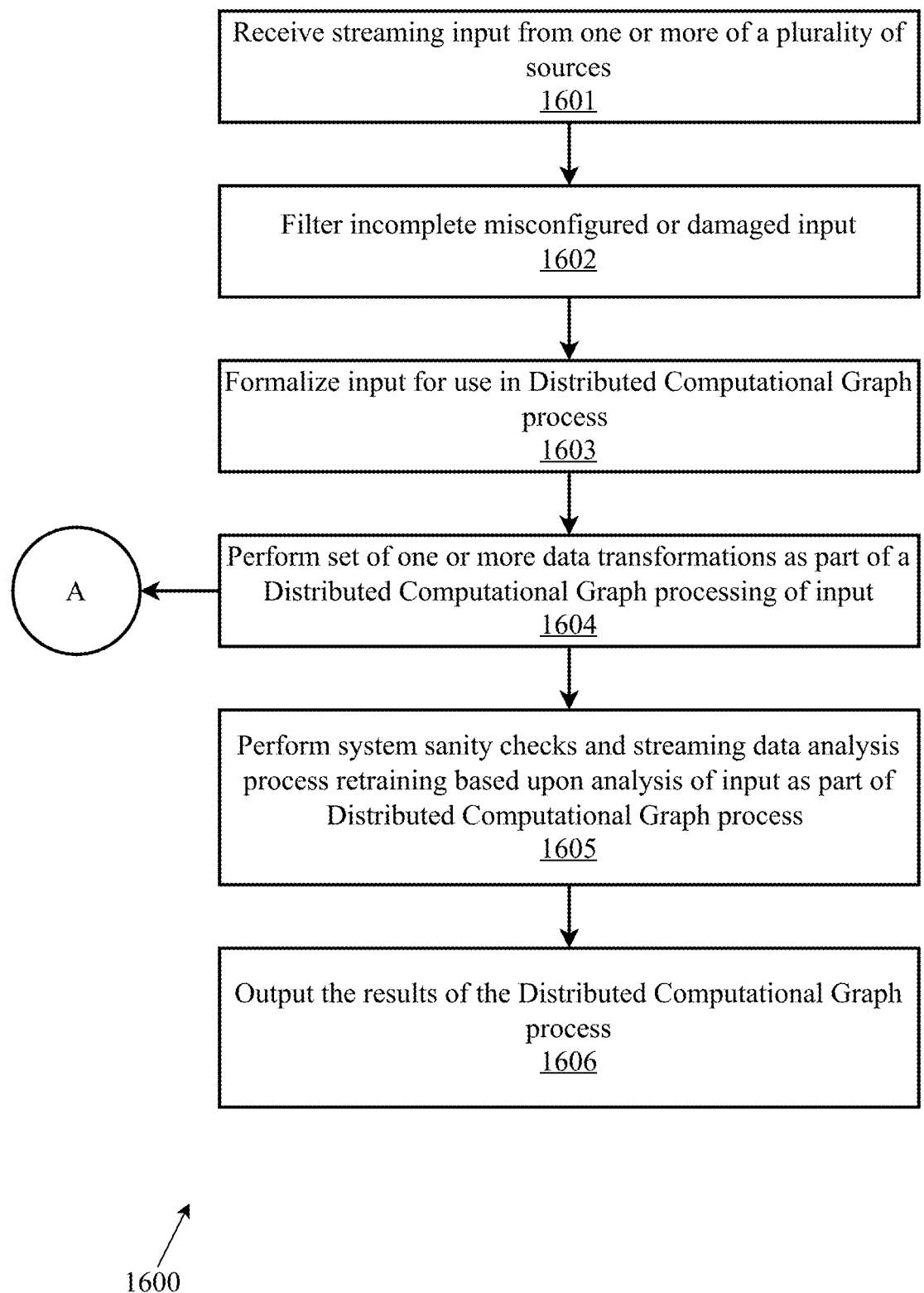
FIG. 16 is a process flow diagram of a method for predictive analysis of very large data sets using the distributed computational graph.
Figure 17:
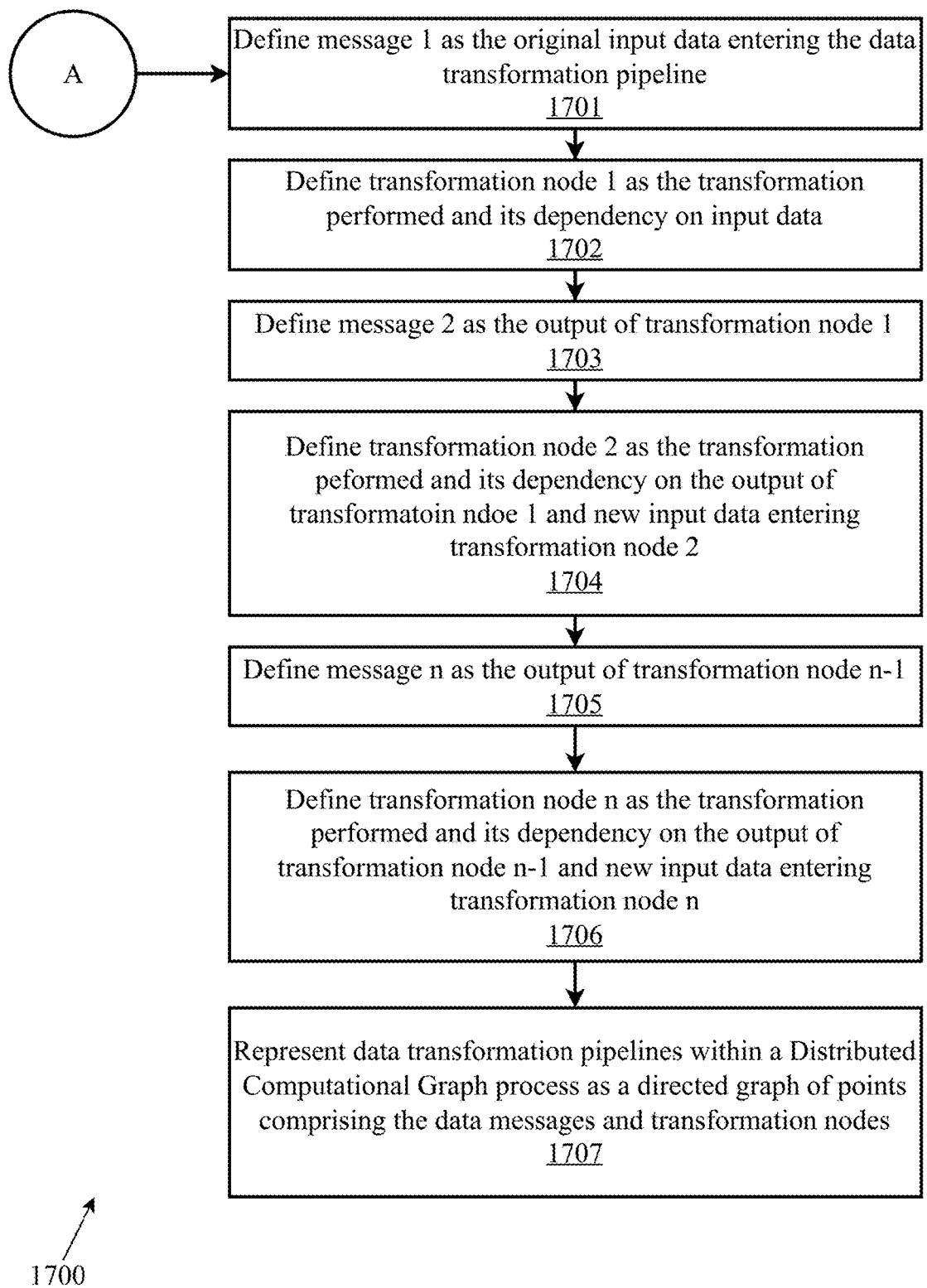
FIG. 17 is a process flow diagram of a method for an aspect of modeling the transformation pipeline module as a directed graph using graph theory.

FIGS. 15-17 illustrate various exemplary aspects of system architectures and methods of distributed computational graph computing environments. For more detailed information regarding the operation of the various components and aspects described herein with respect to FIGS. 15-17, please refer to U.S. patent application Ser. No. 15/616,427 which is incorporated herein by reference.

FIG. 15 is a block diagram of an architecture for a transformation pipeline within a system for predictive analysis of very large data sets using distributed computational graph computing system 1500. According to the aspect, streaming input from a data filter software module, 1505 serves as input to the first transformation node 1510 of the transformation pipeline. Each transformation node's function 1510, 1520, 1530, 1540, 1550 is performed on input data stream and transformed output message 1515, 1525, 1535, 1545, 1555, 1565 is sent to the next step. In this aspect, transformation node 2 1520 has a second input stream 1560. The specific source of this input is inconsequential to the operation of the invention and could be another transformation pipeline software module, a data store, human interaction, physical sensors, monitoring equipment for other electronic systems or a stream from the internet as from a crowdsourcing campaign, just to name a few possibilities 1560. For example, a first input stream may comprise enterprise knowledge and a second input stream may comprise RAG data from a RAG marketplace. Functional integration of a second input stream into one transformation node requires the two input stream events be serialized. The illustrated system can perform this serialization using a decomposable transformation software module. While transformation nodes are described according to various aspects as uniform shape, such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. For example, engines may be singletons (composed of a single activity or transformation). Furthermore, leveraging the architecture in this way allows for versioning and functional decomposition (i.e. embedding entire saved workflows as single nodes in other workflows). Further according to the aspect, individual transformation nodes in one pipeline may represent function of another transformation pipeline. It should be appreciated that the node length of transformation pipelines depicted in no way confines the transformation pipelines employed by the invention to an arbitrary maximum length 1510, 1520, 1530, 1540, 1550, as, being distributed, the number of transformations would be limited by the resources made available to each implementation of the invention. It should be further appreciated that there need be no limits on transform pipeline length. Output of the last transformation node and by extension, the transform pipeline, 1550 may be sent back to messaging software module 562 for pre-decided action.

Detailed Description of Exemplary Aspects

Figure 24:
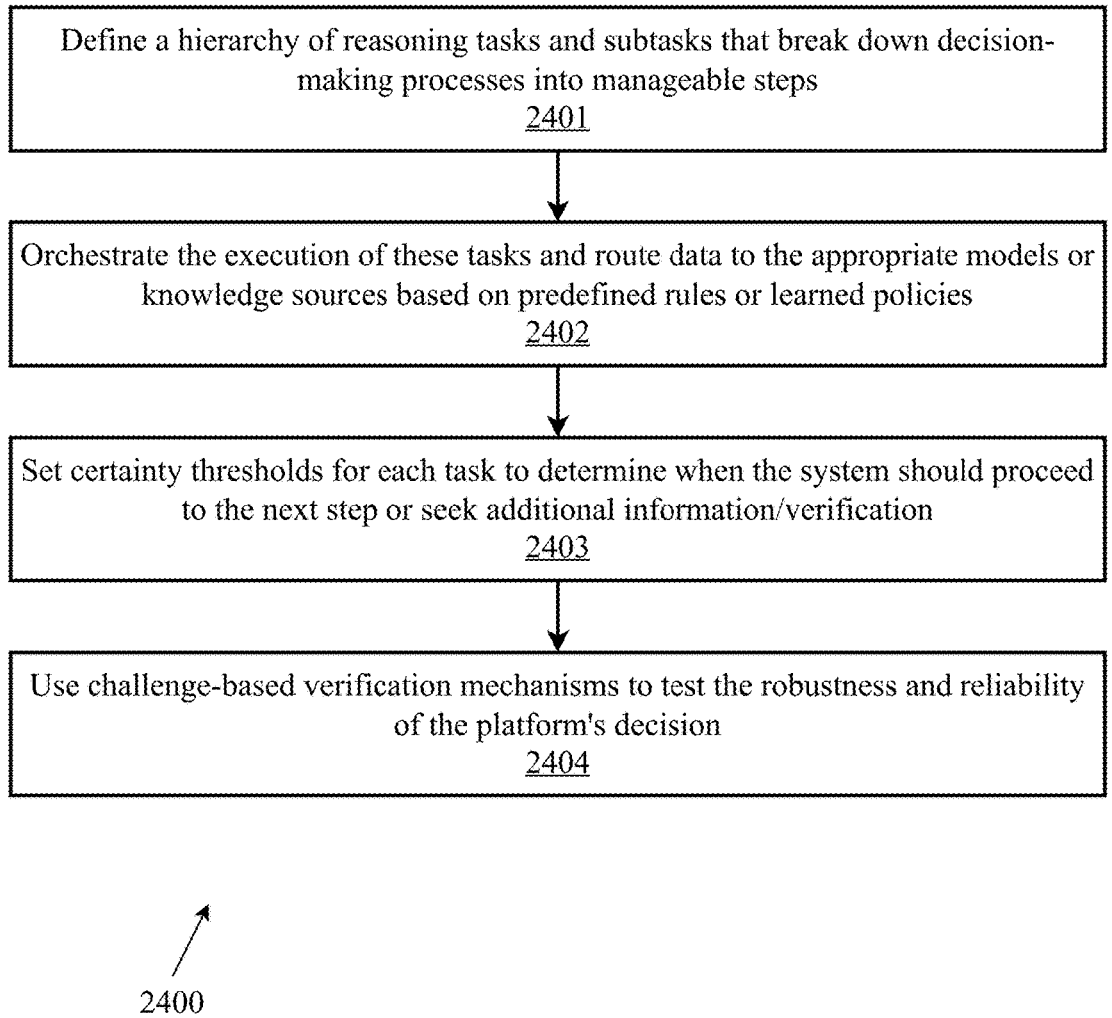
FIG. 24 is a flow diagram illustrating an exemplary method for routing processing based on certainty threshold and/or challenge-based verification, according to an embodiment.

FIG. 24 is a flow diagram illustrating an exemplary method 2400 for routing processing based on certainty threshold and/or challenge-based verification, according to an embodiment. According to the embodiment, the process begins at step 2401 by defining a hierarchy of reasoning tasks and subtasks that break down decision-making processes into manageable steps. Examples of reasoning tasks could include "Gather relevant information," "Analyze data," "Generate potential solutions," "Evaluate alternatives," and "Select the best option." For each identified reasoning task, break it down further into smaller, more manageable subtasks. For example, the reasoning task "Gather relevant information" could be decomposed into subtasks such as "Identify information sources," "Extract relevant data," "Preprocess and clean data," and "Integrate data from multiple sources. Determine which tasks or subtasks need to be completed before others can be started (prerequisites) and establish the flow of information and outputs between tasks and subtasks, specifying how the results of one task feed into the inputs of another. This can be orchestrated by the DCG computing system. For each subtask, assign the appropriate AI models, algorithms, or knowledge sources that will be used to perform the required processing. This could include machine learning models, rule-based systems, knowledge bases, or external APIs.

At step 2402 platform 2120 orchestrates the execution of these tasks and routes data to the appropriate models or knowledge sources based on predefined rules or learned policies. Platform 2120 or an administrator can set certainty thresholds for each task to determine when the system should proceed to the next step or seek additional information/verification at step 2403. Certainty thresholds can be predetermined levels of confidence or probability that an AI system uses to make decisions or trigger specific actions. As a last step 2404, platform may use challenge-based verification mechanisms to test the robustness and reliability of a given AI system's decisions by subjecting the system to various challenges or adversarial scenarios. These mechanisms help identify potential weaknesses, biases, or failure points in the decision-making process. Some examples of challenge-based verification mechanisms can include, adversarial examples, edge case testing, counterfactual reasoning, stress testing, robustness to noise and outliers, and fairness and bias testing, to name a few.

Adversarial examples are carefully crafted inputs that are designed to fool or mislead the AI system into making incorrect predictions or decisions. For example, in an image classification system, an adversarial example could be an image that has been slightly perturbed or modified in a way that is imperceptible to humans but causes the system to misclassify the image. By testing the system's performance on a range of adversarial examples, platform 2120 can assess its robustness against manipulated or deceptive inputs.

Edge case testing involves evaluating the system's performance on rare, extreme, or unusual scenarios that may not be well-represented in the training data. For example, in a self-driving car system, an edge case could be a scenario where a pedestrian suddenly appears from behind a parked vehicle or a situation with complex road construction and detours. By subjecting the system to a variety of edge cases, platform 2120 can assess its ability to handle unexpected or challenging situations gracefully.

Counterfactual reasoning involves analyzing how the system's decisions would change if certain input features or conditions were different. As an example, in a loan approval system, counterfactual reasoning could involve examining how the system's decision would differ if an applicant's income or credit score were slightly modified. By exploring counterfactual scenarios, platform 2120 can identify the sensitivity of the system's decisions to specific input features and ensure that the decisions remain consistent and fair.

Robustness to noise and outliers tests the system's resilience to noisy or outlier data points that may be present in real-world scenarios. As an example, in a sentiment analysis system, robustness testing could involve evaluating the system's performance on reviews with spelling errors, grammatical mistakes, or unconventional language patterns. By assessing the system's performance on noisy and outlier data, platform 2120 can ensure that it remains reliable and accurate in the presence of imperfect or unexpected inputs.

Fairness and bias testing aim to identify and mitigate any biases or discriminatory behavior in the system's decision-making process. For example, in a hiring recommendation system, fairness testing could involve analyzing the system's predictions for any systematic biases based on protected attributes such as gender, race, or age. By conducting fairness and bias tests, you can ensure that the system's decisions are equitable and do not perpetuate or amplify societal biases.

These challenge-based verification mechanisms help assess the robustness, reliability, fairness, and transparency of an AI system's decisions. By subjecting the system to various challenges and adversarial scenarios, platform 2120 can identify potential weaknesses, biases, or failure modes and take appropriate measures to mitigate them. It's important to note that the specific challenges and verification mechanisms used will depend on the domain, the nature of the AI system, and the potential consequences of its decisions. A comprehensive verification strategy should encompass a diverse set of challenges to thoroughly test the system's performance and ensure its reliability in real-world deployment.

Figure 25:
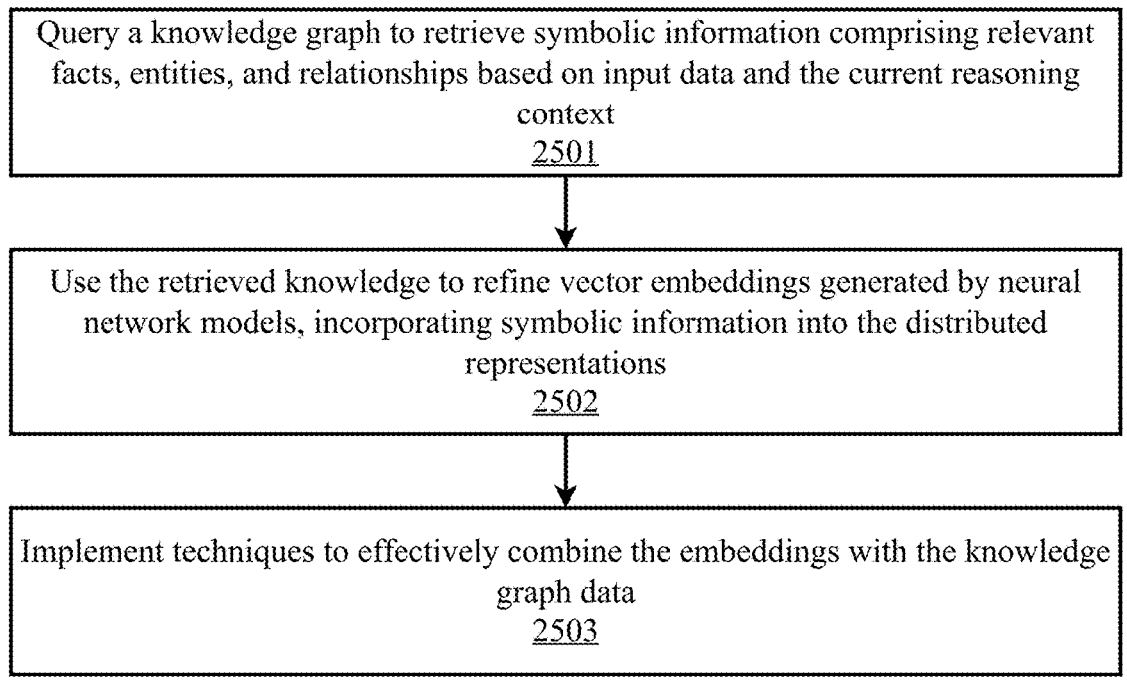
FIG. 25 is a flow diagram illustrating an exemplary method for retrieving relevant contextual data from a knowledge graph database and enriching vector embeddings with the contextual data, according to an embodiment.
Figure 25:

FIG. 25 is a flow diagram illustrating an exemplary method 2500 for retrieving relevant contextual data from a knowledge graph database and enriching vector embeddings with the contextual data, according to an embodiment. According to an aspect of an embodiment, this process may be conducted by embedding refinement computing system 2122. According to the embodiment, the process begins at step 2501 when platform 2120 queries a knowledge graph to retrieve symbolic information comprising relevant facts, entities, and relationships based on input data and the current reasoning context. At step 2502, the retrieved knowledge is used to refine vector embeddings generated by neural network models, incorporating symbolic information into the distributed representations (i.e., embeddings). As a last step 2503, the platform 2120 can implement techniques to effectively combine the embeddings with the knowledge graph data. One or more techniques may be used to combine the embeddings and the symbolic information. A first technique may leverage knowledge graph embedding alignment wherein platform 2120 generates vector embeddings for the entities and relationships in the knowledge graph using techniques such as TransE, TransR, or DistMult, for example, and aligning the vector embeddings generated by the neural network models with the knowledge graph embeddings using techniques such as embedding space transformation or joint embedding learning. Then the platform can update the neural network embeddings by incorporating the aligned knowledge graph embeddings, allowing the symbolic information to influence the distributed representations.

Another approach may utilize attention mechanisms to compute the relevance or importance of the retrieved knowledge for each input instance and then modify the neural network architecture to incorporate attention layers that take the retrieved knowledge as additional input. During the attention computation, higher weights may be assigned to the retrieved knowledge that is most relevant to the current input and task. Platform can update the vector embeddings generated by the neural network models by incorporating the attention-weighted knowledge representations.

Another technique may leverage knowledge-aware language models wherein the language model architecture is modified to incorporate knowledge-aware layers or components and the retrieved knowledge is injected into the language model during the encoding or decoding process. For example, platform 2120 can use techniques like knowledge-aware self-attention, where the attention computation is conditioned on the retrieved knowledge. Additional techniques can include the use of graph convolutional networks, and/or knowledge distillation.

It's important to note that the retrieved knowledge should be relevant and complementary to the input data and the task at hand. The symbolic information should provide additional context or constraints that can guide the refinement of the vector embeddings and improve the overall performance of the AI system.

Figure 26:
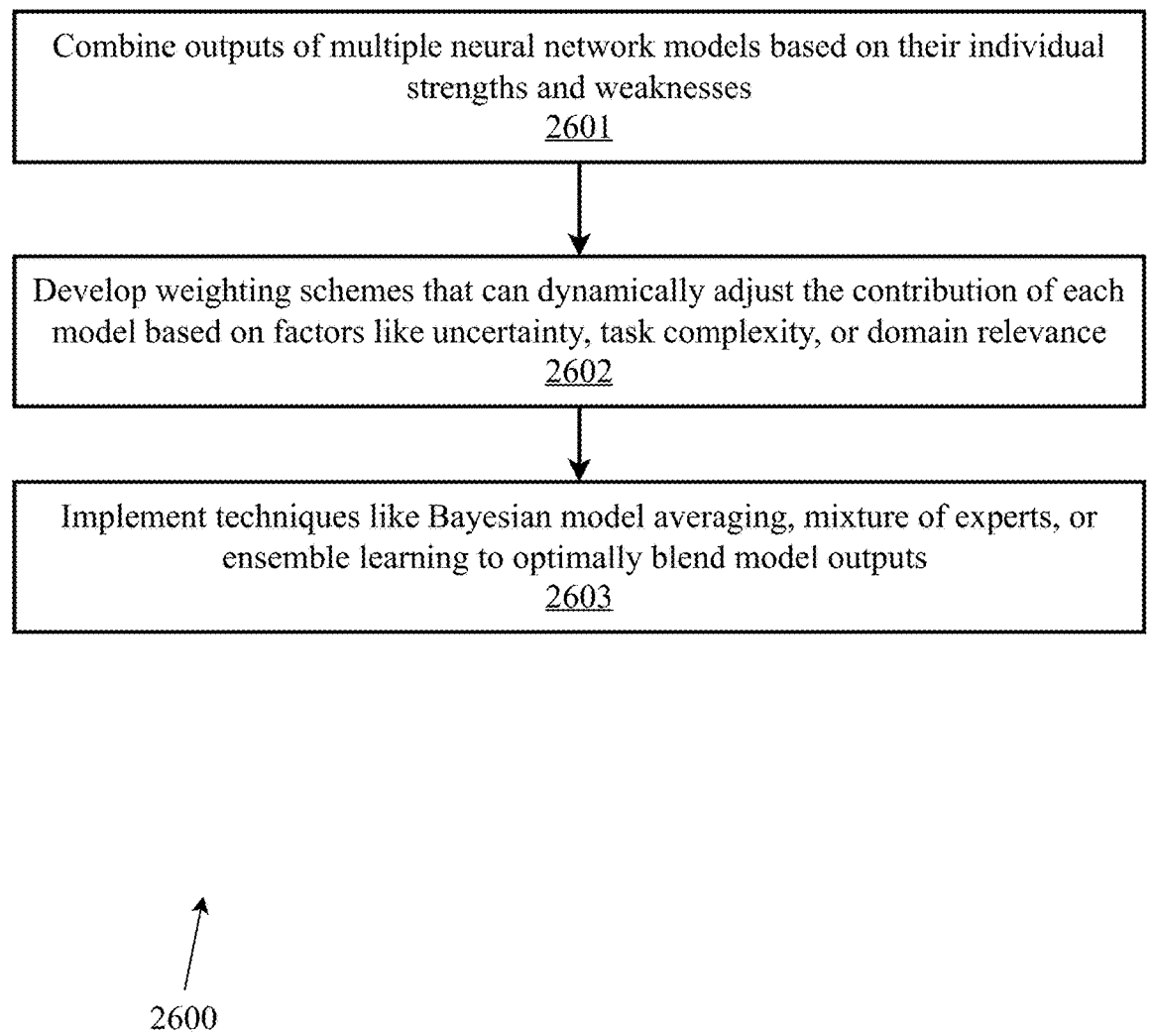
FIG. 26 is a flow diagram illustrating an exemplary method for applying expressive weighting schemes to model combinations, according to an embodiment.

FIG. 26 is a flow diagram illustrating an exemplary method 2600 for applying expressive weighting schemes to model combinations, according to an embodiment. According to an aspect of an embodiment, the process may be performed by model blending computing system 2125. According to the embodiment, the process begins at step 2601 by combining the outputs of multiple neural network models based on their individual strengths and weaknesses. This can include, for example, combining the output of two or more expert models within a larger model. At step 2602 weighting schemes dynamically adjust the contribution of each model based on factors such as uncertainty, task complexity, and domain relevance. As a last step 2603, platform 2120 may implement techniques like Bayesian model averaging, mixture of experts, and/or ensemble learning to optimally blend model outputs. When combining the outputs of multiple neural network models based on their individual strengths and weaknesses, and developing weighting schemes to dynamically adjust the contribution of each model, the goal is to create an ensemble of models that can leverage the diverse capabilities of each individual model to improve overall performance and robustness.

Multiple neural network models, each trained on the same task or dataset, can have different strengths and weaknesses. Some models may excel at capturing certain patterns or features, while others may be more robust to noise or better at handling specific types of inputs. By combining the outputs of these models, platform 2120 can harness their complementary strengths and mitigate their individual weaknesses. Common approaches for combining model outputs include (but are not limited to) averaging (e.g., taking the average of the outputs from all models), voting (e.g., assigning the final output based on the majority vote of the model), and weighted averaging (e.g., assigning different weights to the outputs of each model based on their perceived importance or performance).

Weighting schemes determine how much influence each individual model has on the final combined output. Instead of using fixed weights, platform 2120 can develop dynamic weighting schemes that adjust the contribution of each model based on various factors. A first such factor is uncertainty wherein models that exhibit higher uncertainty or lower confidence in their predictions can be given lower weights, while models with higher confidence can have higher weights. Another factor is task complexity wherein for tasks with varying levels of complexity, platform can assign higher weights to models that specialize in handling specific types of complexity. A domain relevance factor determines if the input data belongs to different domains or categories, wherein platform can assign higher weights to models that are more relevant or perform better in that particular domain.

Combining the outputs of multiple models and dynamically adjusting their contributions based on relevant factors allows for more robust, accurate, and adaptable AI systems. By leveraging the strengths of different models and adapting to the characteristics of the input data, the ensemble can provide improved performance and handle a wider range of scenarios compared to individual models.

Figure 27:
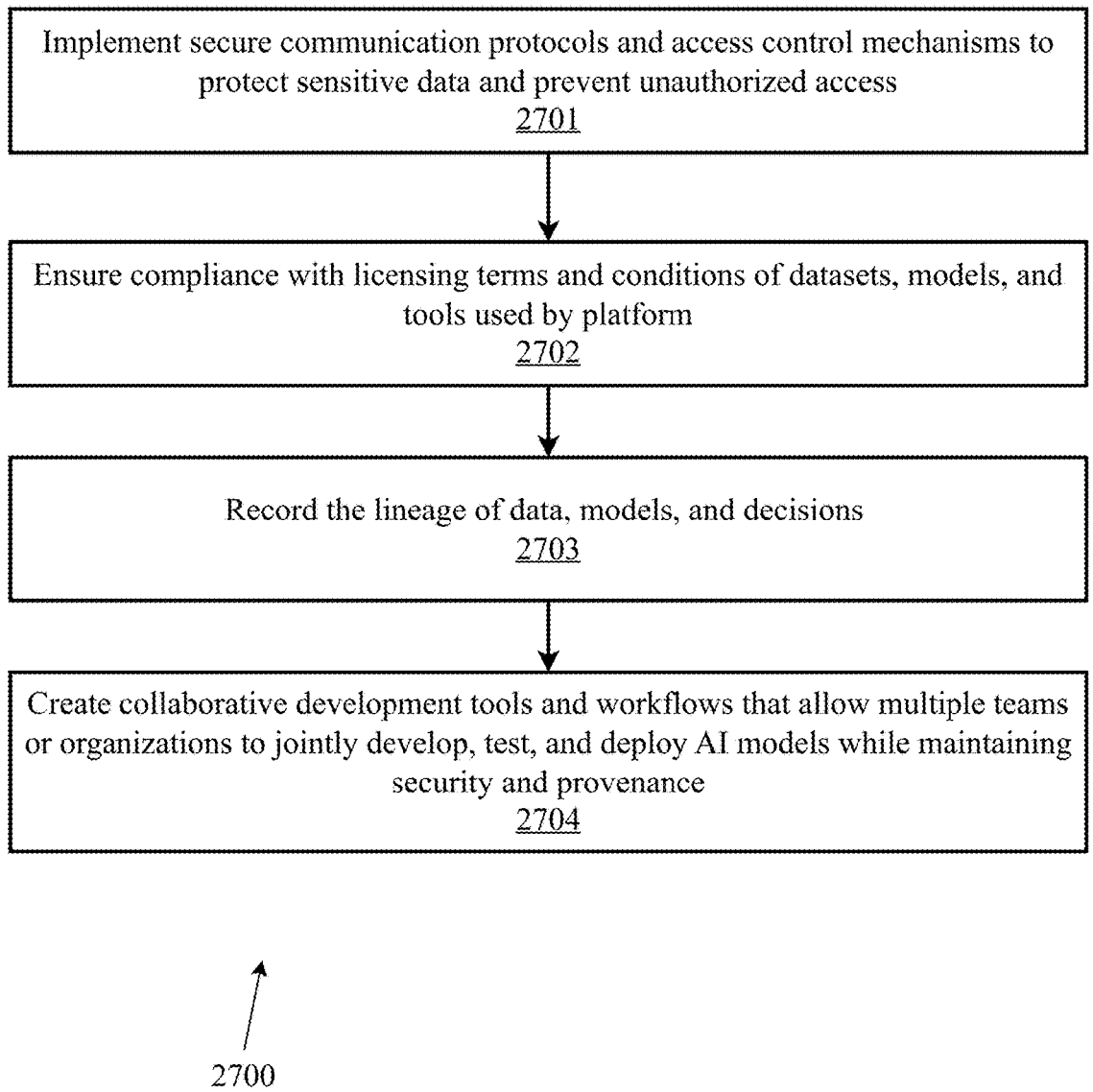
FIG. 27 is a flow diagram illustrating an exemplary method for using feedback loops considering security, licensing, provenance, and collaborative development, according to an embodiment.

FIG. 27 is a flow diagram illustrating an exemplary method 2700 for using feedback loops considering security, licensing, provenance, and collaborative development, according to an embodiment. According to the embodiment, the process begins at step 2701 by implementing secure communication protocols and access control mechanisms to protect sensitive data and prevent unauthorized access. Platform 2120 may be configured to ensure compliance with licensing terms and conditions of datasets, models, and tools used therein at step 2702. For example, platform 2120 may use governance frameworks and policies that define the roles, responsibilities, and processes for collaborative AI development and implement compliance checks and validation processes to ensure adherence to legal, ethical, and regulatory requirements. Furthermore, platform can record the lineage of data, models, and decisions made by the various AI systems through the lifecycle of said systems at step 2703. As a last step 2704, platform may create and use collaborative development tools and workflows that allow multiple teams or organizations to jointly develop, test, and deploy AI models while maintaining security and provenance.

To perform data lineage tracking platform 2120 can leverage a data versioning and tracking system that captures the source, transformations, and dependencies of the data used for training and inference. This may involve the use of metadata standards and schemas to describe properties, origins, and relationships of the data. Platform may maintain a historical record of data updates, modifications, and deletions to ensure traceability, as well as utilize data cataloging and discovery tools to facilitate easy searching and understanding of the data lineage.

To perform model lineage tracking platform 2120 can establish a model versioning and tracking system that captures the evolution of the AI models throughout their lifecycle. This may involve recording information such as model architectures, hyperparameters, training configurations, and performance metrics for each version of the model. Platform can maintain a repository of model artifacts, including trained weights, configuration files, and associated documentation to track the dependencies between models, including any transfer learning or fine-tuning relationships.

To perform decision lineage tracking platform 2120 can implement a decision tracking system that captures the inputs, outputs, and intermediate steps involved in each decision made by an AI system. This may involve recording the specific model versions, data inputs, and any external factors that influenced each decision and maintaining a log of decision outcomes, along with their associated confidence scores or uncertainty measures. This may further comprise a mechanism to link decisions back to the corresponding models and data used for inference. In some implementations, platform may leverage auditing and reporting capabilities to analyze decision patterns, identify anomalies, and support accountability.

Collaborative development tools can include version control systems (e.g., Git) to manage the codebase, models, and configurations collaboratively. Platform 2120 can use access control mechanisms to ensure that only authorized individuals or teams can contribute to the development process and establish code review workflows and pull request processes to maintain code quality and security standards. In some implementations, platform may leverage federated learning techniques to enable collaborative model training without directly sharing raw data.

Figure 28:
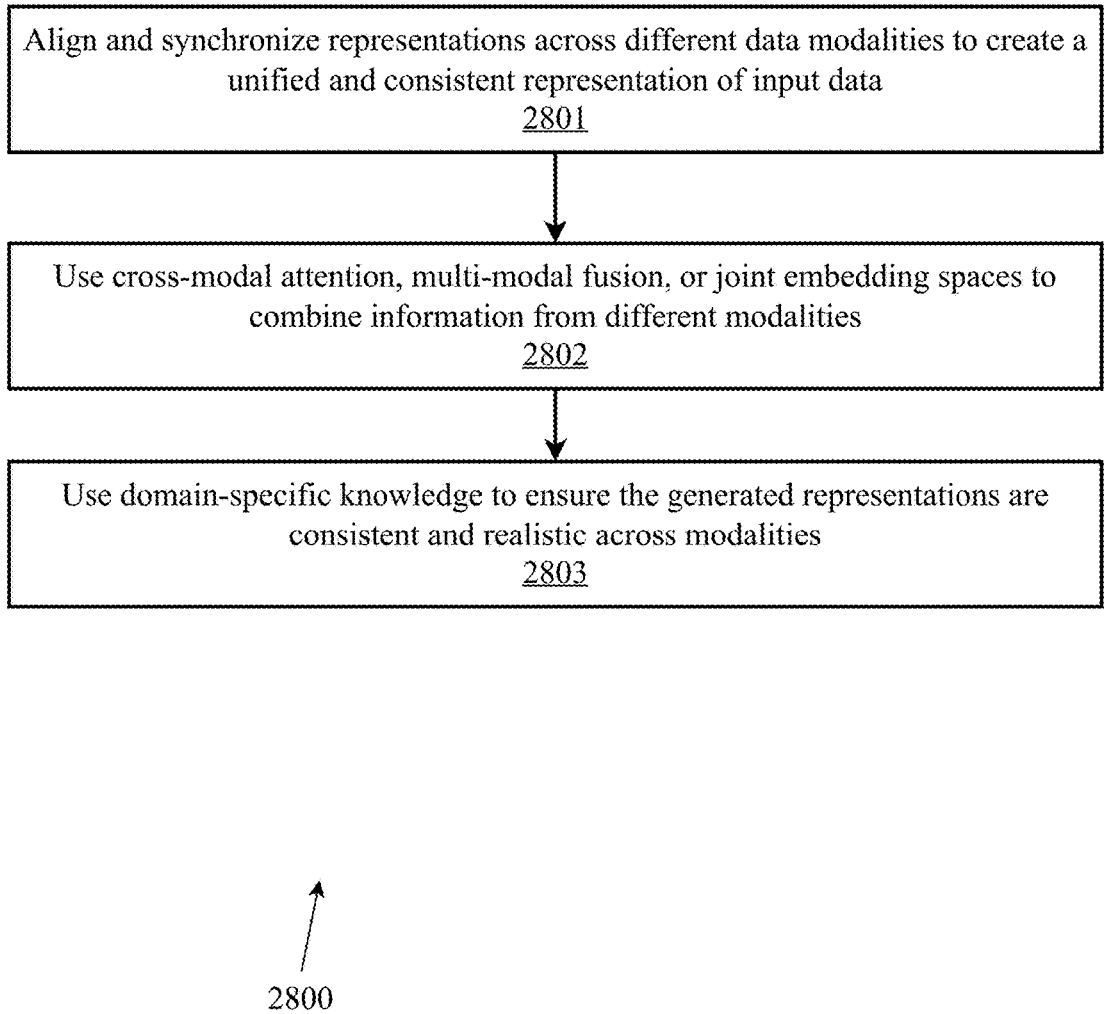
FIG. 28 is a flow diagram illustrating an exemplary method for multi-modal alignment for consistent representations across data types, according to an embodiment.

FIG. 28 is a flow diagram illustrating an exemplary method 2800 for multi-modal alignment for consistent representations across data types, according to an embodiment. According to an aspect of an embodiment, the process may be performed by multi-modal alignment computing system 2123. According to the embodiment, the process begins at step 2801 when platform 2120 aligns and synchronizes representations across different data modalities (e.g., text, images, audio, smell, etc.) to create a unified and consistent representation of input data. At step 2802 one or more techniques such cross-modal attention, multi-modal fusion, and/or joint embedding spaces are used to combine information from different modalities. At step 2803 platform uses domain-specific knowledge (e.g., knowledge graph) to ensure the generated representations (embeddings) are consistent and realistic across modalities.

Multimodal embedding space alignment is performed by learning a shared embedding space where representations from different modalities can be projected and aligned. This may utilize techniques like canonical correlation analysis (CCA) or adversarial learning to map the representations from each modality into a common space. Platform may then train the embedding space alignment model using paired or aligned data from different modalities. Once the alignment model is trained, it can be used to project the representations from each modality into the shared space, creating a unified representation.

Cross-modal attention mechanisms utilize attention mechanisms to attend to relevant information from one modality based on the representations from another modality. For example, in a visual-textual alignment task, use the textual representations to guide the attention over the visual features, or vice versa. Platform can train the attention mechanism to learn the cross-modal dependencies and alignments wherein the attended representations from different modalities can be combined or fused to create a unified representation.

In some implementations, platform can train a joint embedding model that learns to map the representations from different modalities into a shared embedding space. This may involve the use of techniques like contrastive loss or triplet loss to bring the representations of aligned or similar instances from different modalities closer together in the embedding space.

Figure 29:
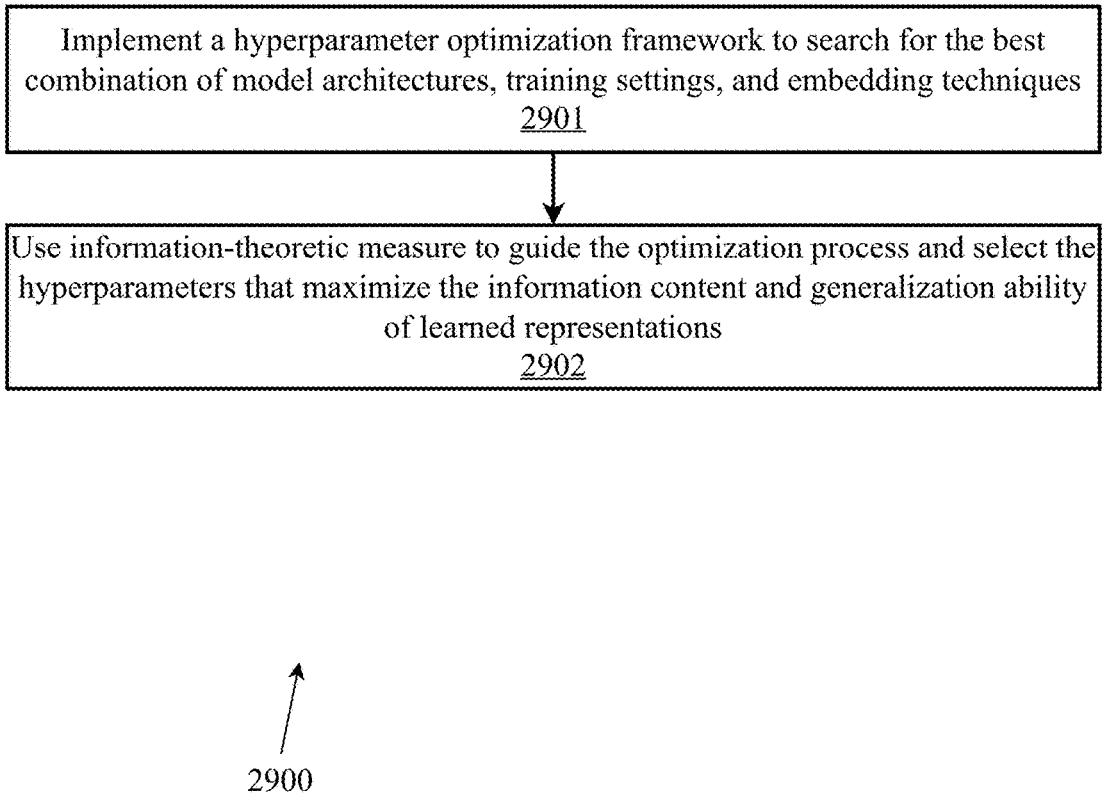
FIG. 29 is a flow diagram illustrating an exemplary method for hyperparameter optimization using information-theoretic guidance, according to an embodiment.

FIG. 29 is a flow diagram illustrating an exemplary method 2900 for hyperparameter optimization using information-theoretic guidance, according to an embodiment. According to an aspect of an embodiment, this process may be performed by hyperparameter optimization computing system 2126. According to the embodiment, the process begins at step 2901 with the implementation of a hyperparameter optimization framework which searches for the best combination of model architectures, training settings, and embedding techniques. Developing such a framework may begin by defining the hyperparameter search space. This can include identifying the hyperparameters to optimize, such as model architectures, learning rates, batch sizes, embedding dimensions, etc., and specifying the range or possible values for each hyperparameter, defining the search space. This may further involve using appropriate data types and ranges for each hyperparameter (e.g., categorical variables for model architectures, continuous variables for learning rates). Some exemplary hyperparameter optimization algorithms which may be implemented can include, but are not limited to, gird search, random search, Bayesian optimization, and evolutionary algorithms. Platform may create an optimization loop that iteratively generates hyperparameter configurations, evaluates them using the objective function, and updates the search process based on the results. For grid search or random search, platform can generate all the configurations upfront and evaluate them in parallel or sequentially. For Bayesian optimization or evolutionary algorithms, platform may need to implement the specific update rules and sampling strategies based on the chosen algorithm.

At step 2902 information-theoretic measures are incorporated into the hyperparameter optimization to guide the optimization process and select hyperparameters that maximize the information content and generalization ability of learned representations. Information content refers to the amount of meaningful or relevant information captured by the learned representations (embeddings). Representations with high information content are able to capture and encode the salient features, patterns, and relationships present in the input data. Maximizing the information content ensures that the learned representations are rich, expressive, and informative. Representations with good generalization ability can effectively capture the underlying patterns and structures in the data, rather than merely memorizing the training examples. Maximizing the generalization ability ensures that the learned representations are robust, transferable, and applicable to a wide range of tasks and datasets.

Information-theoretic measures quantify the information content and relationships between variables or representations. Common information-theoretic measures, which may be implemented in various aspects of platform 2120, can include: Shannon entropy which measures the average amount of information contained in a random variable or representation; mutual information which quantifies the amount of information shared between two variables or representations; or Kullback-Leibler (KL) divergence which measures the difference between two probability distributions, often used to assess the dissimilarity between learned representations and a reference distribution. During the hyperparameter optimization process, information-theoretic measures can be used as objective functions or regularization terms to guide the search towards hyperparameters that maximize the information content and generalization ability.

For example, platform 2120 or an administrator can define an objective function that combines the performance metric (e.g., accuracy) with an information-theoretic measure (e.g., mutual information between learned representations and class labels). By optimizing this objective function, the hyperparameter search will favor configurations that not only achieve high performance but also learn representations with high information content and generalization ability.

Information-theoretic measures can be used to evaluate and compare different hyperparameter configurations based on the quality of the learned representations. For each hyperparameter configuration, platform can compute the relevant information-theoretic measures on the learned representations and assess their information content and generalization ability. Hyperparameter configurations that yield representations with higher information content and better generalization ability are considered more desirable and are selected as the optimal choices.

Information-theoretic measures can also be used as regularization terms or constraints during the model training process itself. For example, platform can add a regularization term that encourages the learned representations to have high mutual information with the target variables or to minimize the KL divergence between the learned representations and a desired prior distribution. These regularization techniques help guide the model towards learning representations that are informative, generalize well, and align with the desired properties.

Hyperparameter optimization can be computationally expensive, especially when training and evaluating complex models. As such, platform may leverage parallel computing techniques to distribute the evaluation of hyperparameter configurations across multiple cores, machines, or clusters. Additionally, or alternatively, platform can incorporate early stopping mechanisms to terminate the evaluation of poorly performing hyperparameter configurations early, saving computational resources and allocate more resources (e.g., training iterations, computational budget) to promising configurations based on their intermediate performance. For example, techniques like successive halving or Hyperband can dynamically allocate resources based on the relative performance of configurations.

Figure 30:
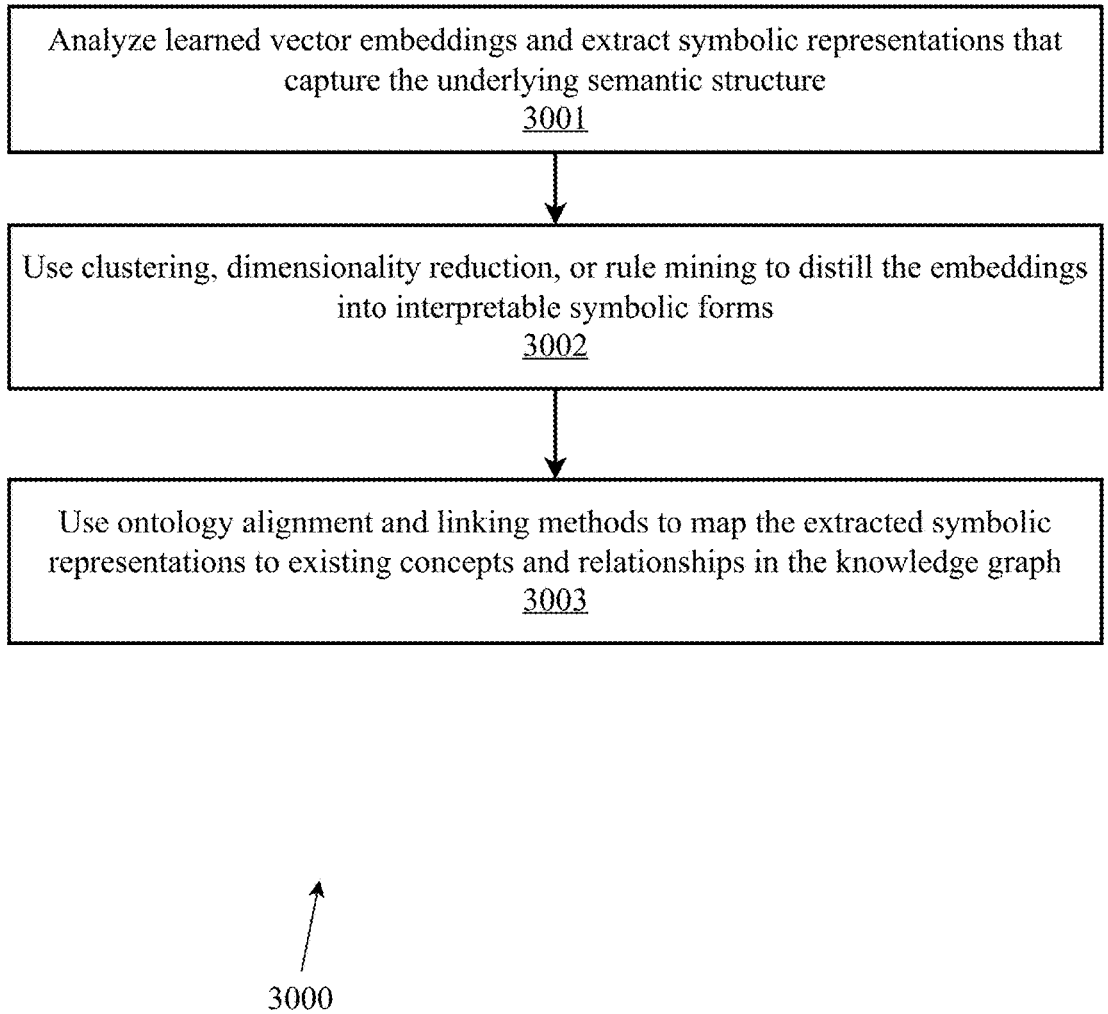
FIG. 30 is a flow diagram illustrating an exemplary method for linking embeddings to knowledge graphs, according to an embodiment.

FIG. 30 is a flow diagram illustrating an exemplary method 3000 for linking embeddings to knowledge graphs, according to an embodiment. According to an aspect of an embodiment, the process may be performed by ontology extraction computing system 2124. According to the embodiment, the process begins at step 3001 by analyzing learned vector embeddings (produced by one or more neural network models) and extracting symbolic representations that capture the underlying semantic structure. At step 3002 platform may use clustering, dimensionality reduction, and/or rule mining to distill the embeddings into interpretable symbolic forms.

Platform 2120 may apply clustering algorithms, such as k-means or hierarchical clustering, to group similar embeddings together based on their spatial proximity in the vector space. Each cluster can be considered as a symbolic representation or concept that captures a group of semantically related embeddings. Platform may analyze the clusters to identify common themes, attributes, or relationships among the embeddings within each cluster and then assign meaningful labels or descriptions to the clusters based on their content or representative embeddings.

In embodiments where dimension reduction techniques are used, platform 2120 may implement Principal Component Analysis (PCA) or t-SNE (t-Distributed Stochastic Neighbor Embedding), to reduce the high-dimensional embedding space to a lower-dimensional representation and then visualize the reduced-dimensional space to identify patterns, clusters, or separations among the embeddings. Platform can analyze the principal components or dimensions to understand the most significant factors contributing to the variance in the embedding space in order to interpret the dimensions or components in terms of their semantic meaning or the attributes they capture.

In other implementations, platform 2120 may use semantic similarity analysis to compute pairwise similarities or distances between embeddings using metrics such as cosine similarity, Euclidean distance, or dot product to identify pairs or groups of embeddings that have high semantic similarity, indicating their close relationship or shared attributes. The most similar embeddings may be analyzed to understand the semantic connections and relationships captured by the embedding space and to extract symbolic representations or rules based on the observed semantic similarities, such as synonyms, antonyms, or analogies.

At step 3002, platform may utilize ontology alignment techniques that align the learned embeddings with existing ontologies or knowledge bases (e.g., knowledge graphs) that provide a structured symbolic representation of the domain. This may involve the use of ontology matching techniques, such as string similarity, semantic similarity, or structural similarity, to establish correspondences between embeddings and ontology concepts. Leverage the aligned ontology to assign symbolic labels or categories to the embeddings based on their semantic similarity to ontology concepts and enrich the ontology with new concepts or relationships discovered from the embedding space.

Figure 31:
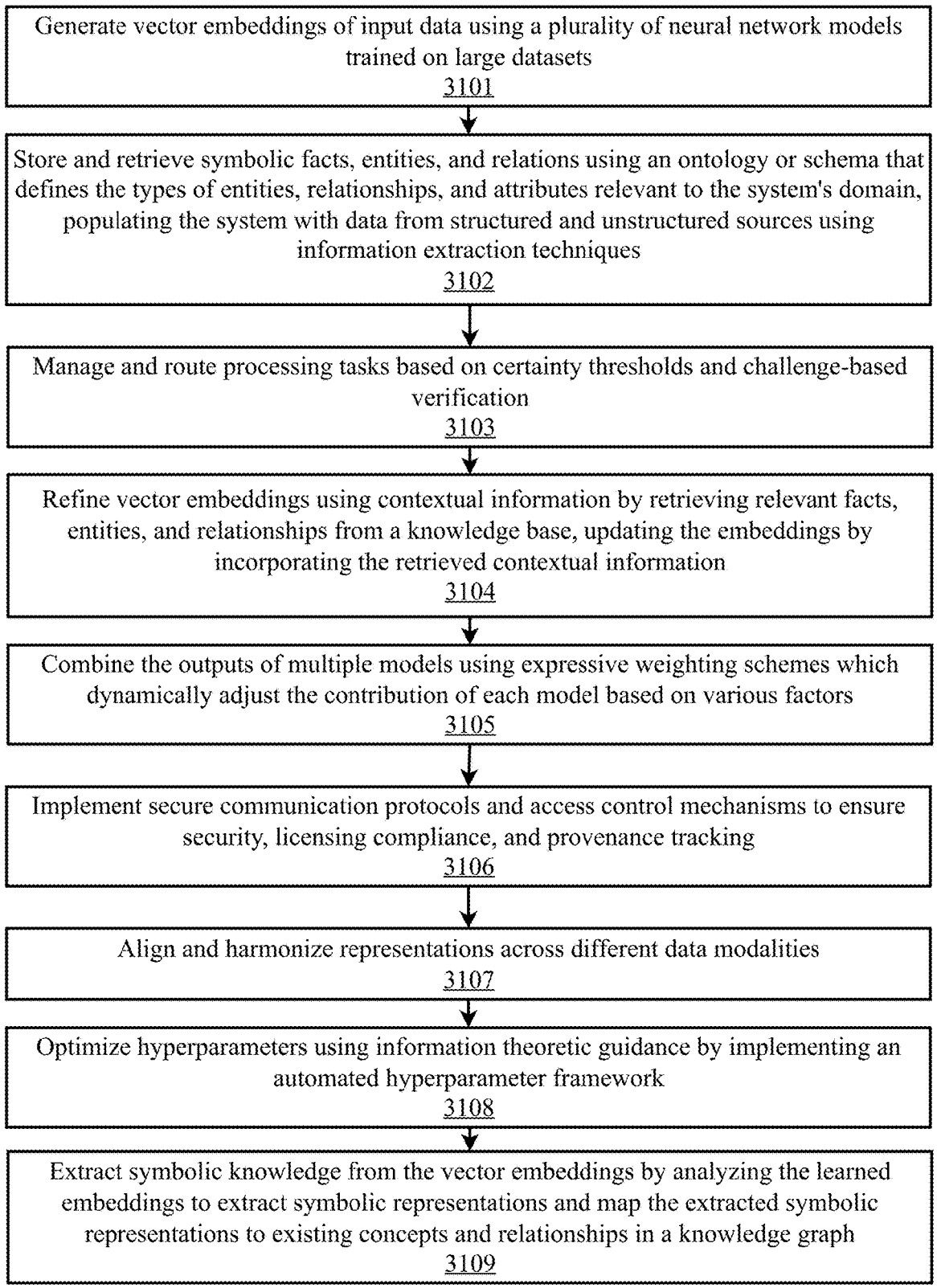
FIG. 31 is a flow diagram illustrating an exemplary method for advanced reasoning using a composite artificial intelligence platform, according to an embodiment.

FIG. 31 is a flow diagram illustrating an exemplary method for advanced reasoning using a composite artificial intelligence platform, according to an embodiment. According to the embodiment, the process begins at step 3101 by generating vector embeddings (i.e., learned representations) of input data using a plurality of neural network models trained on large datasets. This may be accomplished by applying transfer learning, fine-tuning, and/or multi-task learning techniques to improve the quality and generalizability of the embeddings. At step 3102 platform 2120 can store and retrieve symbolic facts, entities, and relations using an ontology or schema that defines the types of entities, relationships, and attributes relevant to a given system's (AI model) domain, populating the system with data from structured and unstructured sources using information extraction techniques. Symbolic information can be stored in one or more knowledge graph databases 2129. At step 3103 platform 2120, via DCG computing system 121 and hierarchical process system 2121 manages and routes processing tasks based on certainty thresholds and/or challenge based verification, selecting the appropriate models and data sources to complete the tasks.

As a next step 3104 platform can refine vector embeddings using contextual information by retrieving relevant facts, entities, and relationships from the knowledge base (e.g., knowledge graphs), updating the embeddings by incorporating the retrieved contextual information. At steep 3105 platform 2120 combines the outputs of multiple models using expressive weighting schemes which dynamically adjust the contribution of each model based on various factors. Platform can implement secure communication protocols and access control mechanisms to ensure security, licensing compliance, and provenance tracking with respect to models, data sources, and decision making in a collaborative development environment at step 3106.

At step 3107 platform 2120 may align and harmonize representations across different data modalities and then optimize hyperparameters using information theoretic guidance at step 3108. As a last step 3109, platform 2120 extracts symbolic knowledge from the vector embeddings by analyzing the learned embeddings to extract symbolic representations and map the extracted symbolic representations to existing concepts and relationships in a knowledge graph.

In this way, platform 2120 can provide an end-to-end process of advanced reasoning in an artificial intelligence system, starting from the generation of vector embeddings using neural network models, progressing through the storage and retrieval of symbolic knowledge, managing and routing processing tasks, refining embeddings with contextual information, combining outputs of multiple models, ensuring security and compliance, aligning representations across modalities, optimizing hyperparameters, and finally extracting symbolic knowledge from the learned embeddings.

FIG. 16 is a process flow diagram of a method 1600 for predictive analysis of very large data sets using the distributed computational graph. One or more streams of data from a plurality of sources, which includes, but is in no way not limited to, a number of physical sensors, web-based questionnaires and surveys, monitoring of electronic infrastructure, crowd sourcing campaigns, and direct human interaction, may be received by system 1601. The received stream is filtered 1602 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing 1600 while another substream may be formalized 1603 for transformation pipeline analysis 1604, 1500, and retraining 1605. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the aspect, individual transformations can receive input of expected form from more than one source or receive no input at all as would a transformation acting as a timestamp. According to the aspect, individual transformations, may not modify the data as would be encountered with a data store acting as a queue for downstream transformations. According to the aspect, individual transformations may provide output to more than one downstream transformations. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical, where the output of one of the internal transformations serves as the input of one of its antecedents allowing recursive analysis to be run. The result of transformation pipeline analysis may then be modified by results from batch analysis of the data stream and output 1606 in format predesigned by the authors of the analysis with could be human readable summary printout, human readable instruction printout, human-readable raw printout, data store, or machine encoded information of any format known to the art to be used in further automated analysis or action schema.

FIG. 17 is a process flow diagram of a method 1700 for an aspect of modeling the transformation pipeline module as a directed graph using graph theory. According to the aspect, the individual transformations 17102, 17104, 17106 of the transformation pipeline $t_1 \ldots t_n$ such that each $t_i$ T are represented as graph nodes. Transformations belonging to T are discrete transformations over individual datasets $d_i$, consistent with classical functions. As such, each individual transformation $t_j$, receives a set of inputs and produces a single output. The input of an individual transformation $t_i$ is defined with the function in: $t_i \, d_1 \ldots d_k$ such that $in(t_i) = \{d_1 \ldots d_k\}$ and describes a transformation with k inputs. Similarly, the output of an individual transformation is defined as the function out: $t_i[ld_1]$ to describe transformations that produce a single output (usable by other transformations). A dependency function can now be defined such that $dep(t_a, t_b)$ $out(t_a)in(t_b)$ The messages carrying the data stream through the transformation pipeline 1701, 1703, 1705 make up the graph edges. Using the above definitions, then, a transformation pipeline within the invention can be defined as G=(V,E) where message $(t_1, t_2 \ldots t_{(n-1)}, t_n)$V and all transformations $t_1.t_n$ and all dependencies $dep(t_i,t_j)$E 1707.

Figure 18:
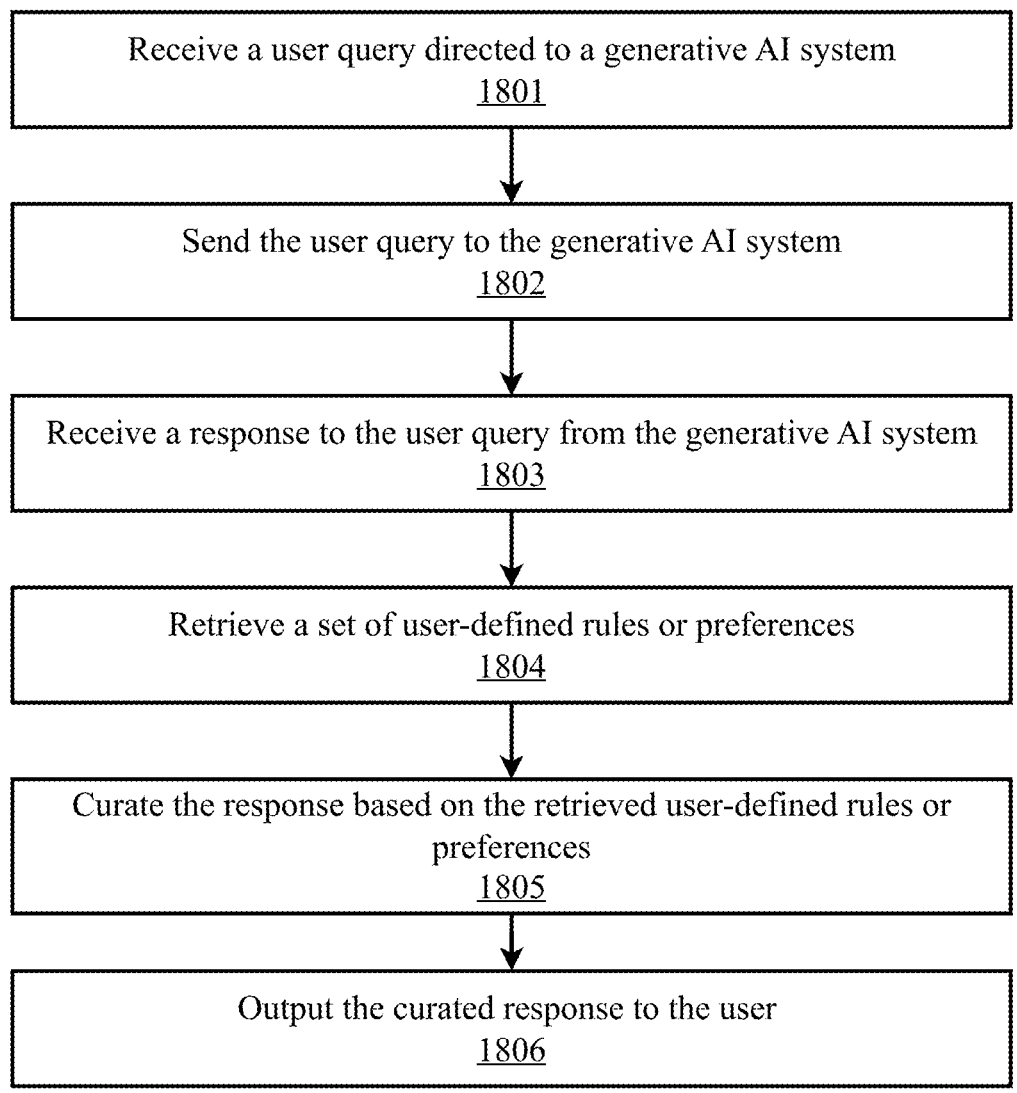
FIG. 18 is a flow diagram illustrating an exemplary method for providing experience curation, according to an aspect of an embodiment.

FIG. 18 is a flow diagram illustrating an exemplary method for providing experience curation, according to an aspect of an embodiment. According to the aspect, the process begins at step 1801 when a distributed generative AI reasoning and action platform receives a user query directed to a generative AI system. The query may comprise a request for information, a summary, a request for a document, or some other action. The user may submit their query to the platform via an experience curation portal such as through a webapp or website accessed via an Internet browser operating on a computer (e.g., personal computer, laptop), or through an associated curation application which can be operated on a mobile computing device (e.g., smart phone, tablet, smart wearable, IoT device, etc.). In some implementations, the received user query may be sent to a data embedding system which can vectorize the query and store it in a vector database where it may be retrieved to be used as contextual data included in a query/prompt sent to a generative AI system. At step 1802 the query is sent to the generative AI system which processes the query and returns a generated response which is received by the platform at step 1803. At step 1804 curation system locates and retrieves any available user-defined rules or preferences. In some embodiments, the user-defined rules/preferences may be defined by an entity (e.g., a company). Exemplary rules or preferences can include, but are not limited to, conditional generation preferences, formatting rules, language rules, style rules, geographic rules, environmental rules, and timing rules. With respect to conditional generation rules, the model can be conditioned on specific input data related to the individual, such as preferences, behavior, and characteristics. For example, in text generation, the model could be conditioned on a user's previous messages or writing style to generate more personalized responses. Formatting, style, and language rules are closely related and may be used to curate a response in a specific format (e.g., bullet points, paragraph, single sentence, numbered outline, CSV, etc.), response style (e.g., formal, informal, academic, accessible, abstract, casual, etc.), and the language in which a response is translated, respectively. At step 1805 curation system can curate the response based on the retrieved user-defined rules or preferences. For example, the system may filter out extraneous data, or personal information. As a last step 1806, curation system returns the curated response to the user, thereby providing experience curation to a platform user.

Figure 19:
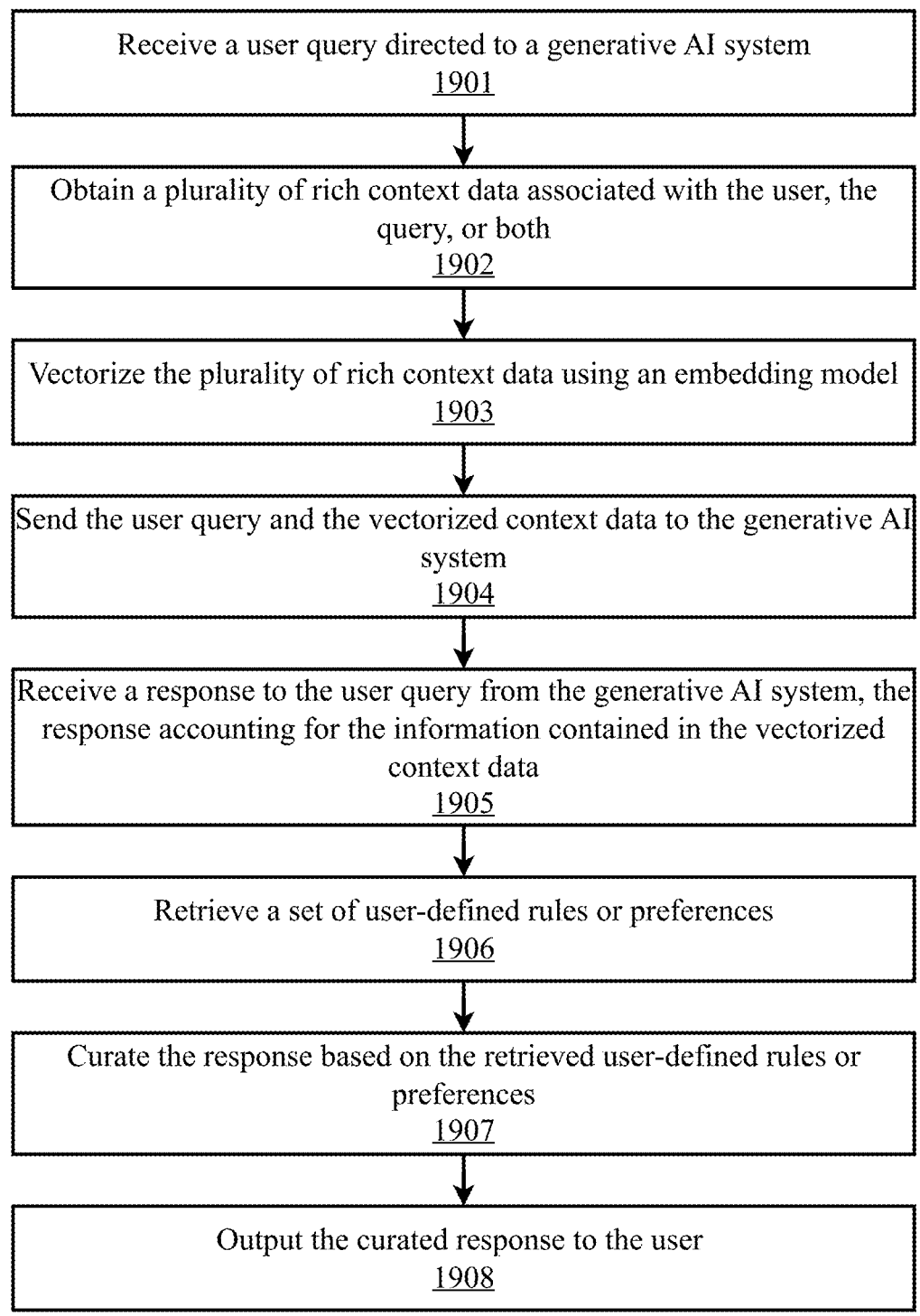
FIG. 19 is a flow diagram illustrating an exemplary method for providing experience curation with using rich contextual data, according to an aspect of an embodiment.

FIG. 19 is a flow diagram illustrating an exemplary method for providing experience curation with using rich contextual data, according to an aspect of an embodiment. According to the aspect, the process begins at step 1901 when a distributed generative AI reasoning and action platform receives a user query directed to a generative AI system. The query may comprise a request for information, a summary, a request for a document, or some other action. The user may submit their query to the platform via an experience curation portal such as through a webapp or website accessed via an Internet browser operating on a computer (e.g., personal computer, laptop), or through an associated curation application which can be operated on a mobile computing device (e.g., smart phone, tablet, smart wearable, IoT device, etc.). In some implementations, the received user query may be sent to a data embedding system which can vectorize the query and store it in a vector database where it may be retrieved to be used as contextual data included in a query/prompt sent to an ML, AI, generative AI, planning, or automation/action orchestration system.

A DCG orchestrated model which employs a hierarchical classification and model selection regime for content (either in whole or in part) can enable much more accurate ultimate semantic performance. For example, a query/prompt can be submitted to the generative AI system with additional metadata associated with the context of the prompt itself as well as additional broader information about the user and the user's ongoing behavior and/or activities. At step 1902 the system obtains a plurality of rich context data associated with the user, the query, or both. A subset of the plurality of context data information may be obtained from a vector database, the vector database comprising a plurality of embedded contextual data. Embedded contextual data can comprise (but is not limited to) information obtained from an enterprise knowledge base and embedded queries/prompts. Context data associated with the user may comprise information obtained from or related to one or more of a computing device on which the user is accessing the curation system/platform, the geographic location the user is located, an action the user is performing during interaction with the curation system/platform, and timing data associated with the user, and/or the like. A subset of the plurality of obtained context data may be obtained from one or more marketplaces such as a data marketplace and/or an expert judgment marketplace. In some embodiments, the selection of context data may be based on one or more expert judgment scores assigned to an information source, dataset, model, and/or hyperparameters.

As an example, if a user is asking a generative AI enhanced search engine for "the best pizza" on her cell phone while driving at 55 mph on the road and not near her home (e.g. on vacation) this is massively different from the user being at home, on her couch, connected on her laptop, from her normal IP address, having just ran a series of searches for airline tickets to Italy and Neapolitan Pizza recipes. The additional device, user, recent behavior, etc. content can be used by a classifier alongside a prompt to help focus results on things that are not only relevant (e.g. pizza places near the user that are open now) but likely to be consistent with her broader needs/persona (e.g. if available, the suggestions could be looked at based on other budget, dining, etc. preferences like outdoor seating and meals below $20 per person). The same principle applies to more complicated and complex topics like medicine or finance or law.

At step 1903 the obtained plurality of context data may be processed into vectors by an embedding model and stored in the vector database.

At step 1904 the user query and the vectorized context data is sent to the generative AI system which processes the query and returns a generated response which accounts for the information contained in the vectorized context data and which is received by the platform at step 1905. At step 1906 curation system locates and retrieves any available user-defined rules or preferences. In some embodiments, the user-defined rules/preferences may be defined by an entity (e.g., a company). Exemplary rules or preferences can include, but are not limited to, conditional generation preferences, formatting rules, language rules, style rules, geographic rules, environmental rules, and timing rules. With respect to conditional generation rules, the model can be conditioned on specific input data related to the individual, such as preferences, behavior, and characteristics. For example, in text generation, the model could be conditioned on a user's previous messages or writing style to generate more personalized responses. Formatting, style, and language rules are closely related and may be used to curate a response in a specific format (e.g., bullet points, paragraph, single sentence, numbered outline, CSV, etc.), response style (e.g., formal, informal, academic, accessible, abstract, casual, etc.), and the language in which a response is translated, respectively. At step 1907 curation system can curate the response based on the retrieved user-defined rules or preferences. For example, the system may filter out extraneous data, or personal information. As a last step 1908, curation system returns the curated response to the user, thereby providing experience curation to a platform user.

Figure 20:
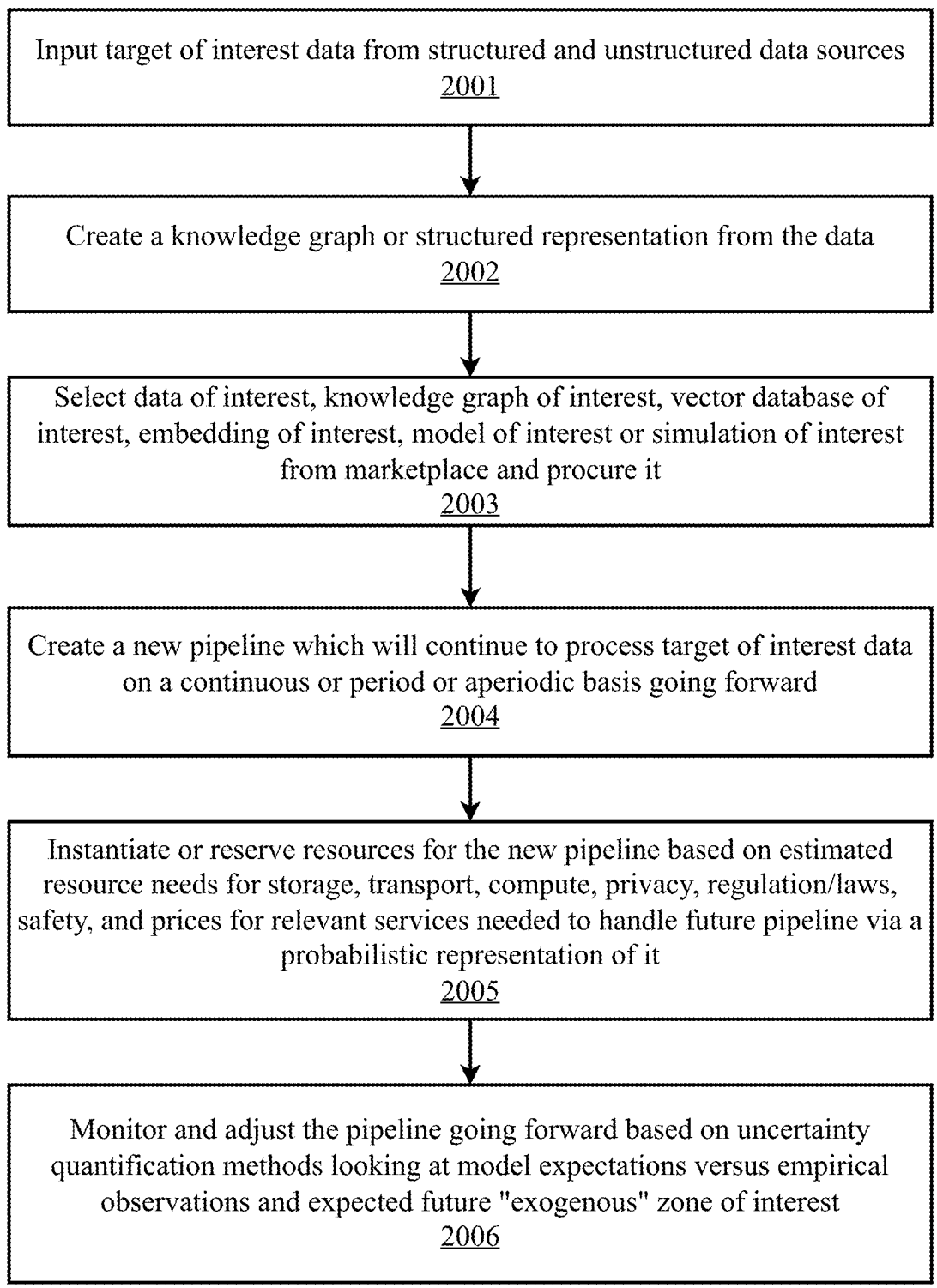
FIG. 20 is a flow diagram illustrating an exemplary method for using a distributed computation graph system for creating structured representations or knowledge graphs from various data sources and setting up a pipeline for continuous processing and monitoring of that data, according to an embodiment.

FIG. 20 is a flow diagram illustrating an exemplary method for providing distributed neuro-symbolic reasoning and action model, according to an aspect of an embodiment. A neuro-symbolic model combines neural network-based approaches with symbolic reasoning to enable a more flexible and powerful reasoning system. In neuro-symbolic reasoning, neural networks are used to learn representations of data, similar to how they are used in deep learning. These learned representations can then be combined with symbolic representations and rules to perform reasoning tasks. This combination allows for the strengths of both approaches to be leveraged: the ability of neural networks to learn complex patterns from data, and the ability of symbolic reasoning to represent and manipulate abstract concepts and rules.

According to the aspect, the process begins at step 2001*a-c* wherein a plurality of input data is obtained from various sources. Examples of input data can include entity knowledge 2001*a*, context data 2001*b*, and expert knowledge 2001*c*. Other types of data may be obtained and may be dependent upon the embodiment and the particular use case. Data may be obtained from third-party services, entity databases/data warehouses/knowledge base and/or the like, and various marketplaces for data, algorithms, RAGs, and/or expert judgment. At step 2002 the obtained plurality of input data is vectorized using an embedding model and stored in a vector database. Vectorizing the data allows it to be used as input for processing by a neural network. At step 2003 platform 120 can train the neural network using the input data to learn patterns and relationships in the data. In some embodiments, this step may involve the use of labeled examples and supervised learning. A recurrent neural network or some other transformer-based model may be used as the basis for the neural network. At step 2004 the system maps the learned representations to symbolic concepts or rules. At this step, the system learns to represent the learned features or representations from the neural network in symbolic form. At step 2005 the system applies reasoning techniques to the symbolic representations to perform reasoning tasks. Examples of reasoning techniques that may be implemented can include, but are not limited to, logic rules or inference engines. This step may involve combining the learned representations with existing knowledge or rules to derive new conclusions. At this point in the process a feedback loop is created wherein feedback from the symbolic reasoning step is incorporated back into the neural network to refine the learned representations. This feedback loop helps to improve the performance of the system over time. In some embodiments, the feedback loop may include functionality for evaluating generated outputs based on quality and/or relevance to the task. In such embodiments, users' positive and/or negative feedback may then be used to adjust the running model's parameters. In this way, user feedback can be used as a form of (positive or negative) reinforcement. In another embodiment, a panel of known experts (either human or AI or both) may be used to assess model outputs and/or performance and apply feedback based on the panel's assessment.

As a last step 2006, the trained, distributed GenAI reasoning and action model can generate output of the reasoning process, which could be a decision, a prediction, or an action based on the input data and the reasoning process. In some embodiment, the input data may further include a query/prompt and metadata comprising various contextual information about the user and/or prompt.

FIG. 20 is a flow diagram illustrating an exemplary method for using a distributed computation graph system for creating structured representations or knowledge graphs from various data sources, and setting up a pipeline for continuous processing and monitoring of that data, according to an embodiment. According to the embodiment, the process begins at step 2001 when the platform receives a plurality of input data of interest from structured (e.g., databases, spreadsheets, etc.) and unstructured (e.g., documents, websites, social media, etc.) data sources. Data may be obtained using data extraction techniques such as, for example, web scraping, APIs, natural language processing, etc.). Additionally, or alternatively, the data may be obtained from a data marketplace (e.g., expert judgment, RAGs, models, datasets, etc.). At step 2002 platform creates a knowledge graph or structured representation from data of interest. This may comprise applying information extraction methods (e.g., named entity recognition, relation extraction, etc.) to extract entities and relationships from unstructured data and integrating the extracted information with structed data sources. Further, a knowledge graph representation can be built by creating nodes for entities and edges for relationships. Optionally, platform can be configured to create vector representations of entities/relationships using techniques like word embeddings.

At step 2003, platform selects data of interest, knowledge graph of interest, vector database of interest, embedding of interest, model of interest or simulation of interest from marketplace and procures it. Platform can search/browse a marketplace or repository for relevant data sources, knowledge graphs, vector databases, models, simulations, etc., and evaluate the potential options based on factors like relevance, quality, and cost. This step may further include purchasing or licensing selected assets for use in a pipeline. As a next step 2004, platform creates a new pipeline which will continue to process target of interest data on a continuous or periodic or aperiodic basis going forward. The pipeline may be designed (e.g., batch, streaming, etc.) based on the processing needs and can integrate components for data ingestion, knowledge graph updates, model execution and/or the like.

At step 2005, platform can instantiate or reserve resources for the new pipeline based on estimated resource needs for storage, transport, compute, privacy, regulation/laws, safety, and prices for relevant services needed to handle future pipeline via a probabilistic representation of it. Platform may estimate pipeline resource requirements (storage, compute, networking, etc.) and also consider privacy, regulatory, and safety constraints that impact resource needs. Platform may use probabilistic modeling to forecast future resource demands. This step may further comprise provisioning cloud/on-premise resources (e.g., virtual machines, containers, databases, etc.) accordingly. As a last step 2006, platform monitors and adjusts the pipeline going forward based on uncertainty quantification methods looking at model expectations versus empirical observations and expected future "exogenous" zone of interest. A pipeline may be monitored for performance, data drift, model accuracy, etc. and by tracking metrics like data volumes, processing times, error rates, and model accuracies. Platform may use techniques such as, for example, Bayesian modeling to quantify uncertainties in model parameters and propagate input/parameter uncertainties through the model(s) to get prediction uncertainties. Techniques such as bootstrap, cross-validation can also quantify model uncertainties. Platform can identify external variables (e.g., new regulations, market shifts, technology changes, etc.) that may impact the "zone of interest" and quantify potential impacts on pipeline performance/relevance. As an example, platform could implement monitoring for these variables using web scraping, news feeds, etc.

Exemplary Computing Environment

Figure 32:
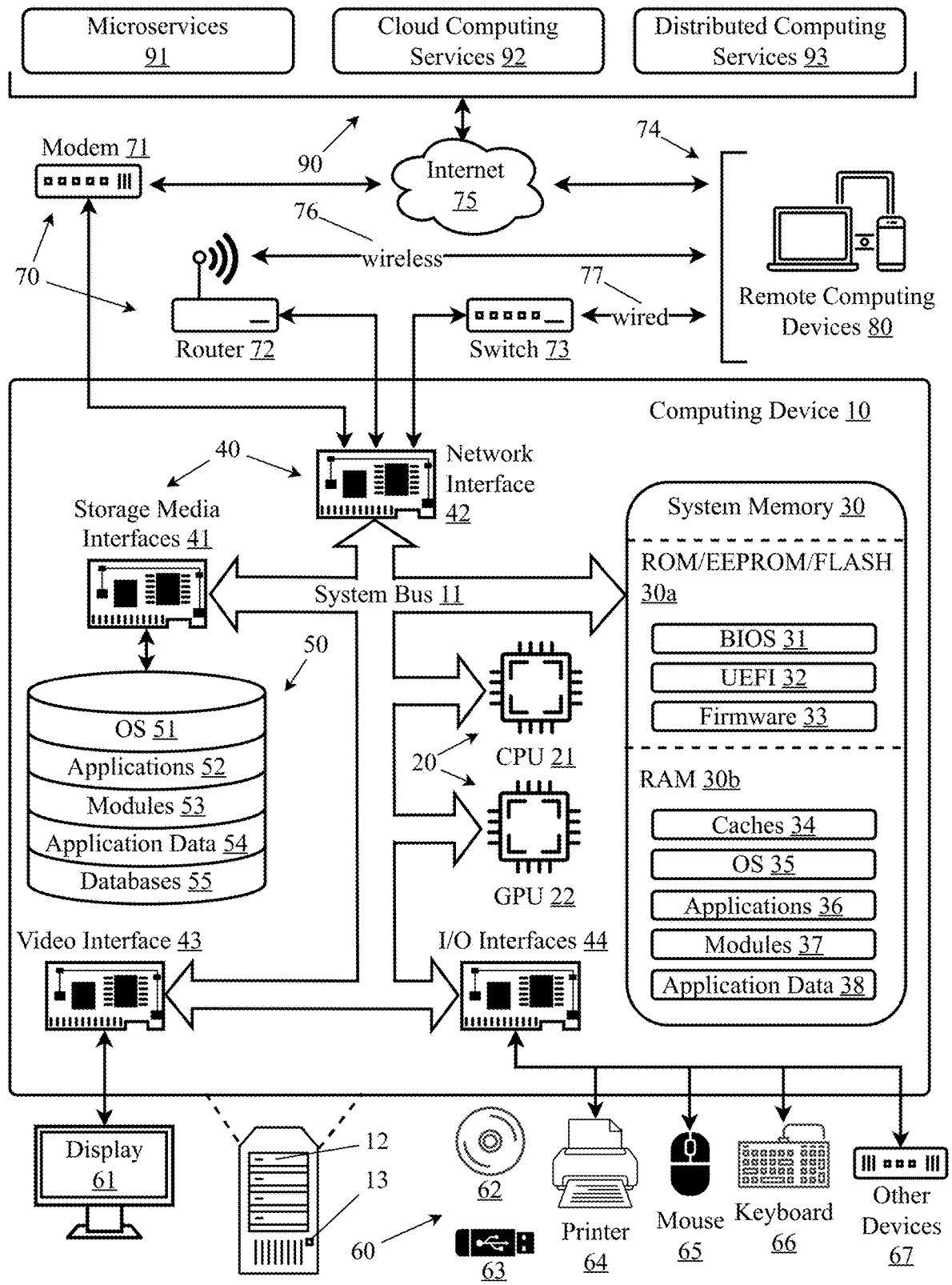
FIG. 32 illustrates an exemplary computing environment on which an embodiment described herein may be implemented.

FIG. 32 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computing system for composite artificial intelligence employing an advanced reasoning platform, the computing system comprising:
   one or more hardware processors configured for:
      generating vector embeddings or representations of input data using a plurality of neural network models trained on large datasets;
      storing and retrieving symbolic facts, entities, and relations into a hierarchical knowledge graph using an ontology or schema that defines the types of entities, relationships, and attributes relevant to each of the plurality of neural network models' respective domains;
      routing data to neural network models or knowledge sources based on predefined rules or learned policies derived from reinforcement learning;
      defining a hierarchy of reasoning tasks and subtasks;
      managing and routing processing of reasoning tasks and subtasks to a specific neural network model of the plurality of neural network models based on model-specific certainty thresholds that are set for each task or subtask and iterative verification mechanisms designed to test robustness and reliability of decisions by the specific neural network model for the reasoning tasks or subtasks;
      iteratively refining vector embeddings or representations through reinforcement learning by retrieving relevant facts, entities, and relationships from the hierarchical knowledge graph, thereby providing retrieved contextual information;
      updating the vector embeddings or representations by incorporating the retrieved contextual information through iterative feedback loops;
      combining outputs of the plurality of neural network models using dynamically learned or rule-based weighting schemes;
      aligning and harmonizing the vector embeddings or representations across different data modalities;
      optimizing hyperparameters of the plurality of neural network models during embedding generation and refinement using information-theoretic guidance principles;
      extracting symbolic knowledge from the vector embeddings or representations to generate extracted symbolic representations; and
      mapping the extracted symbolic representations to existing concepts and relationships in the hierarchical knowledge graph.

2. The computing system of claim 1, wherein updating the vector embeddings or representations comprises applying attention mechanisms, graph convolutions, or knowledge-aware language models to combine the embeddings with the contextual data through reinforcement learning optimization.

3. The computing system of claim 1, wherein the one or more hardware processors are further configured for:
   designing a composite model architecture that leverages the strengths of individual models from the plurality of neural network models;
   developing dynamic weighting schemes that adjust the contribution of each model based on various factors through reinforcement learning; and
   implementing techniques including Bayesian model averaging, mixture of experts, or ensemble learning to optimize the model combination architecture.

4. The computing system of claim 3, wherein the various factors comprise uncertainty, task complexity, or domain relevance.

5. The computing system of claim 1, wherein the one or more hardware processors are further configured for ensuring the security, licensing compliance, provenance tracking, and collaborative development of AI models by implementing secure communication protocols and access control mechanisms.

6. The computing system of claim 1, wherein aligning and harmonizing the vector embeddings or representations comprises:
   developing algorithms that can synchronize and align the representations of multiple input modalities through the hierarchical knowledge graph;
   applying techniques including cross-modal attention, multi-modal fusion, or joint embedding spaces with reinforcement learning optimization; and
   utilizing domain-specific knowledge from the hierarchical knowledge graph to ensure the generated representations are consistent and realistic across modalities.

7. The computing system of claim 1, wherein mapping the extracted symbolic representations comprises hierarchical ontology alignment and linking methods.

8. The computing system of claim 1, wherein the hierarchical knowledge graph comprises multiple interconnected knowledge graph layers with domain-specific organization.

9. A computer-implemented method executed on an advanced reasoning platform for composite artificial intelligence, the computer-implemented method comprising:
   generating vector embeddings or representations of input data using a plurality of neural network models trained on large datasets;
   storing and retrieving symbolic facts, entities, and relations into a hierarchical knowledge graph using an ontology or schema that defines the types of entities, relationships, and attributes relevant to each of the plurality of neural network models' respective domains;
   routing data to neural network models or knowledge sources based on predefined rules or learned policies derived from reinforcement learning;
   defining a hierarchy of reasoning tasks and subtasks;

managing and routing processing of reasoning tasks and subtasks to a specific neural network model of the plurality of neural network models based on model-specific certainty thresholds that are set for each task or subtask and iterative verification mechanisms designed to test robustness and reliability of decisions by the specific neural network model for the reasoning tasks or subtasks;

iteratively refining vector embeddings or representations through reinforcement learning by retrieving relevant facts, entities, and relationships from the hierarchical knowledge graph, thereby providing retrieved contextual information;

updating the vector embeddings or representations by incorporating the retrieved contextual information through iterative feedback loops;

combining outputs of the plurality of neural network models using dynamically learned or rule-based weighting schemes;

aligning and harmonizing the vector embeddings or representations across different data modalities;

optimizing hyperparameters of the plurality of neural network models during embedding generation and refinement using information-theoretic guidance principles;

extracting symbolic knowledge from the vector embeddings or representations to generate extracted symbolic representations; and mapping the extracted symbolic representations to existing concepts and relationships in the hierarchical knowledge graph.

10. The computer-implemented method of claim 9, wherein updating the vector embeddings or representations comprises applying attention mechanisms, graph convolutions, or knowledge-aware language models to combine the embeddings with the contextual data through reinforcement learning optimization.

11. The computer-implemented method of claim 9 further comprising:

designing a composite model combination architecture that leverages the strengths of individual models from the plurality of neural network models;

developing dynamic weighting schemes that adjust the contribution of each model based on various factors through reinforcement learning; and implementing techniques including Bayesian model averaging, mixture of experts, or ensemble learning to optimize the model combination architecture.

12. The computer-implemented method of claim 11, wherein the various factors comprise uncertainty, task complexity, or domain relevance.

13. The computer-implemented method of claim 9 further comprising ensuring the security, licensing compliance, provenance tracking, and collaborative development of AI models by implementing secure communication protocols and access control mechanisms.

14. The computer-implemented method of claim 9, wherein aligning and harmonizing the vector embeddings or representations comprises:

developing algorithms that can synchronize and align the representations of multiple input modalities through the hierarchical knowledge graph;

applying techniques including cross-modal attention, multi-modal fusion, or joint embedding spaces with reinforcement learning optimization; and utilizing domain-specific knowledge from the hierarchical knowledge graph to ensure the generated representations are consistent and realistic across modalities.

15. The computer-implemented method of claim 9, wherein mapping the extracted symbolic representations comprises hierarchical ontology alignment and linking methods.

16. The computer-implemented method of claim 9, wherein the knowledge base comprises multiple interconnected knowledge graph layers with domain-specific organization.

* * * * *